United States Patent [19]
Proctor

[11] Patent Number: 5,831,678
[45] Date of Patent: Nov. 3, 1998

[54] VIDEO ENCODER/DECODER SYSTEM

[75] Inventor: John J. Proctor, Nevada City, Calif.

[73] Assignee: U.S. Robotics Access Corp., Skokie, Ill.

[21] Appl. No.: 689,401

[22] Filed: Aug. 9, 1996

[51] Int. Cl.$^6$ ................................................ H04N 7/28
[52] U.S. Cl. .......................................... 348/422; 382/253
[58] Field of Search ................................. 348/417, 418, 348/699, 411, 412, 408, 414, 416, 422, 700; 382/240, 253; H04N 7/12, 7/133, 7/137, 7/30, 7/32

[56]             References Cited

U.S. PATENT DOCUMENTS 5,121,448  6/1992  Katayama et al. ........................ 382/57
5,444,489  8/1995  Truong .................................... 348/422
5,596,659  1/1997  Normile .................................. 348/422

OTHER PUBLICATIONS

"Video Demystified: A Handbook for The Digital Engineer"—Keith Jack–High Test Publications, Inc., 1993, Chapters 2 and 3.
"Adaptive hierarchical vector quantization for image coding: new results"—S. Zhong, F. Chin and Q.Y. Shi—Optical Engineering, Oct. 1995, vol. 34, pp. 2912–2917.
"Fast feature–based vector quantization algorithm of image coding"—Yih–Chuan Lin and Shen–Chuan Tai—Optical Engineering, Oct. 1995, vol. 34, pp. 2918–2926.
"Digital image Compression Techniques"—Majid Rabbani and Paul W. Jones (Eastman Kodak Company)—SPIE Optical Engineering Press, 1991—Tutorial Texts, TT7—Chapters 2,3,4,5,7,9,12 and 14.
"Image Coding Using Vector Quantization: A review"—Nasser M. Nasrabadi and Robert A. Kind—IEEE Transactions on Communications, vol. 36, No. 8, Aug. 1998.
"Two–Dimensional Signal and Image Processing"—jae S. Lim—Chapters 8,9 and 10, Prentice Hall, 1990.
"JPEG Still Image Data Compression Standard"—William B. Pennebaker—Chapters 5 and 11—Van Nostrand Reinhold, 1993.
"An Adaptive Vector Quantizer Based on the Gold–Washing Method for Image Compression"—Oscal T.–C. Chen, Bing J. Sheu and Zhen Zhang—IEEE Transactions on Circuits and Systems for Video Technology—vol. 4, No. 2, Apr., 1994.
"Dynamic Finite–State Vector Quantization of Digital images"—Nasser M. Nasrabadi, Chang Y. Choo and Yushu Feng—IEEE Transactions on Communications—vol. 42, No. 5, May 1994.

Primary Examiner—Howard Britton
Attorney, Agent, or Firm—McDonnell Boehnen; Hulbert & Berghoff

[57]             ABSTRACT

A method and an apparatus for encoding an image signal. The apparatus includes an acquisition module disposed to receive the image signal. A first processor is coupled to the acquisition module. At least one encoder processor is coupled to the first processor. The at least one encoder processor produces an encoded image signal under control of the first processor. The method includes the steps of converting an input image signal into a predetermined digital format and transferring the digital format image signal to at least one encoder processor. The method further includes the step of applying, at the at least one encoder processor, a hierarchical vector quantization compression algorithm to the digitized image signal. At the next step, a resultant encoded bit stream generated by the application of the algorithm is collected. The method and apparatus of the present invention may be used in conjunction with an ordinary modem to transmit and/or receive audio, video sequences or still images.

10 Claims, 38 Drawing Sheets

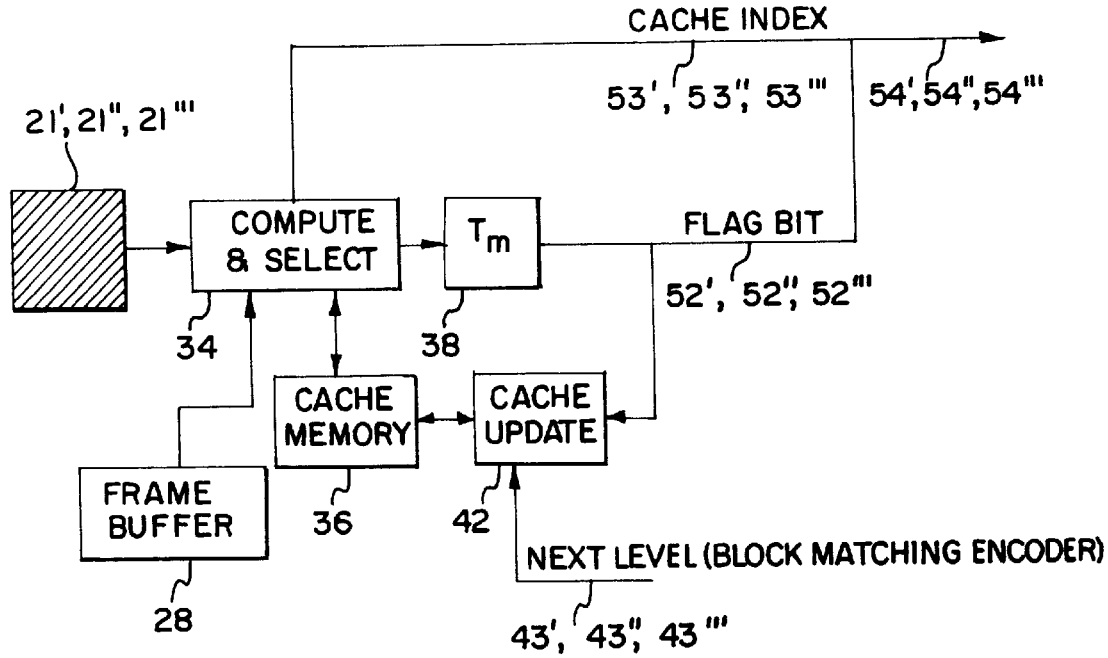
FIG. 4
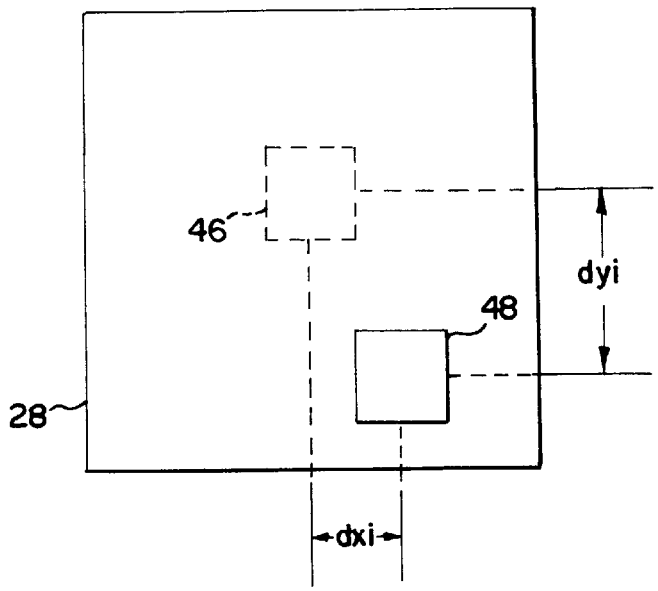
FIG. 5
FIG. 6

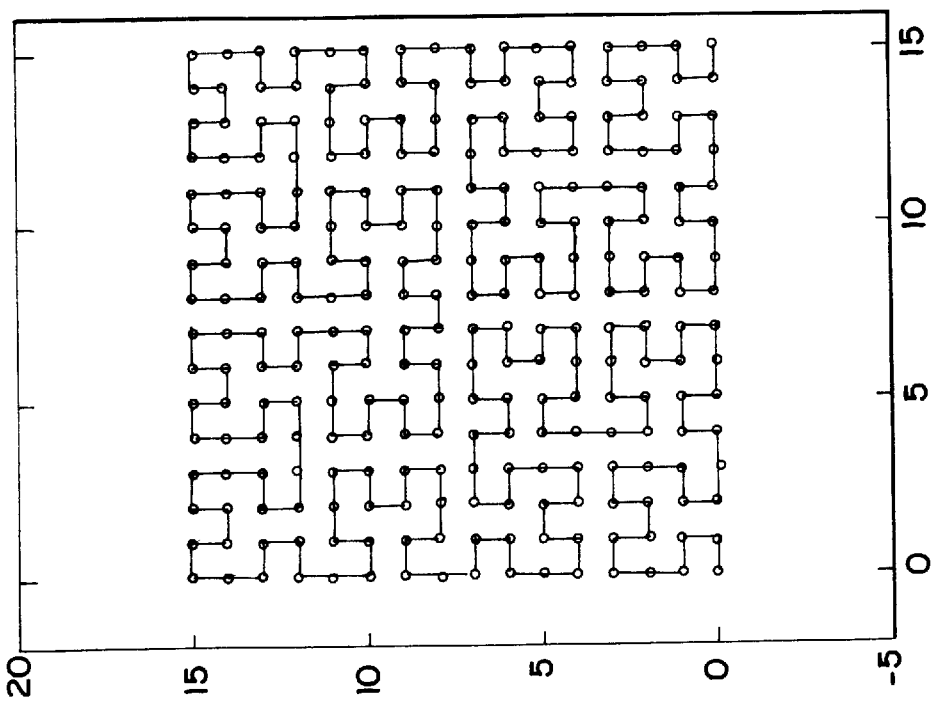
FIG. 13
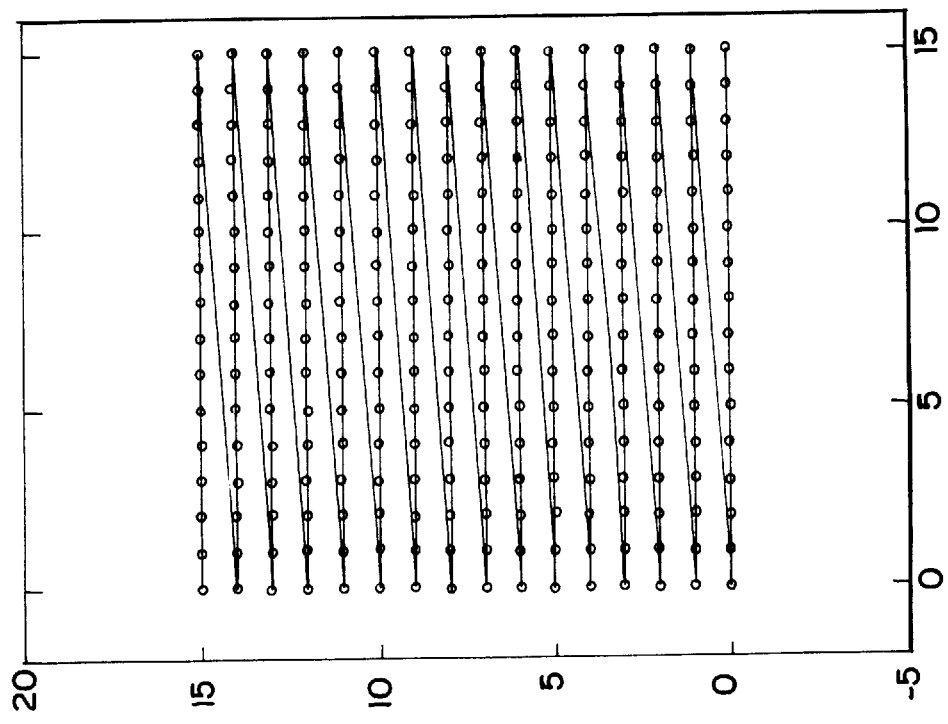
FIG. 12 RASTER SCANNING

FIG. 15

| 31    24 | 23    16 | 15    8 | 7    0 |
|---|---|---|---|
| YI | XXXX | Y0 | XXXX |

| 31    24 | 23    16 | 15    8 | 7    0 |
|---|---|---|---|
| V | XXXX | U | XXXX |

FIG. 16

| PHASE | 7-BIT DATA | 8-BIT DATA |
|---|---|---|
| INPUT DATA | 2.67 CYCLES/PIXEL | 2.67 CYCLES/PIXEL |
| ROW-WISE FILTER | 2 CYCLES/PIXEL | 2.5 CYCLES/PIXEL |
| RE-FORMAT | 2.25 CYCLES/PIXEL | 2.25 CYCLES/PIXEL |
| COLUMN-WISE FILTER | 2 CYCLES/PIXEL | 2.5 CYCLES/PIXEL |
| RE-FORMAT TO BYTE PACKED | 1 CYCLE/PIXEL | 1 CYCLE/PIXEL |
| OVERHEAD | 0.5 CYCLES/PIXEL | 0.5 CYCLES/PIXEL |

FIG. 17

| PHASE | 7-BIT DATA | 8-BIT DATA |
|---|---|---|
| RE-FORMAT FROM PACKED | 1.5 CYCLES/PIXEL | 1.75 CYCLES/PIXEL |
| ROW-WISE FILTER | 2 CYCLES/PIXEL | 2.5 CYCLES/PIXEL |
| RE-FORMAT | 2.25 CYCLES/PIXEL | 2.25 CYCLES/PIXEL |
| COLUMN-WISE FILTER | 2 CYCLES/PIXEL | 2.5 CYCLES/PIXEL |
| REFORMAT AND OUTPUT | 3 CYCLES/PIXEL | 3 CYCLES/PIXEL |
| OVERHEAD | 0.5 CYCLES/PIXEL | 0.5 CYCLES/PIXEL |

FIG. 18

| 31    24 | 23    16 | 15    8 | 7    0 |
|---|---|---|---|
| Y | XXXX | Y0 | XXXX |

| 31    24 | 23    16 | 15    8 | 7    0 |
|---|---|---|---|
| V | XXXX | U | XXXX |

FIG. 19

| | |
|---|---|
| GAMMA [VQ4] | NOT USED |
| GAMMA [STILL4] | USED WITH THE STILL IMAGE ENCODER, THIS VALUE IS NOT ADAPTED AND IS SET BY THE STILL IMAGE QUALITY VARIABLE |
| GAMMA [BG16] | USED AT THE BACKGROUND 16x16 LEVEL. ADAPTED AS DESCRIBED BELOW. |
| GAMMA [M16] | NOT USED |
| GAMMA [BG8] | NOT USED |
| GAMMA [M8] | NOT USED |
| GAMMA [M4] | NOT USED |
| GAMMA [SBG4] | USED AS A DIRECT COMPARISON WITH THE STANDARD DEVIATION OF A 4x4 BLOCK. ADAPTED SIMILARLY TO GAMMA [BG16] |

FIG. 20

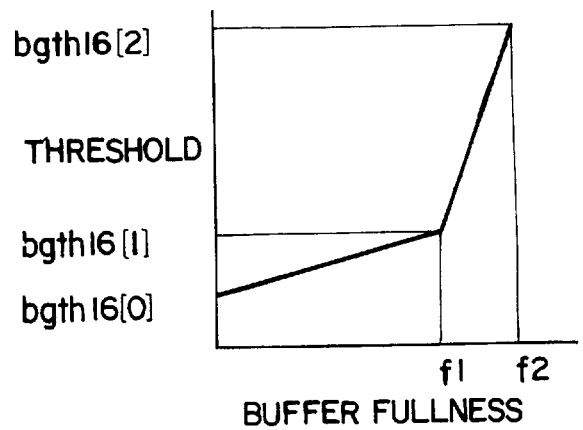

THRESHOLD vs BUFFER FULLNESS

FIG. 21

| 31 | 24 23 | 16 15 | 8 7 | 0 |
|---|---|---|---|---|
| DON'T CARE | ODD LINE PIXEL | 0 | EVEN LINE PIXEL | |

| 31 | 24 23 | 16 15 | 8 7 | 0 |
|---|---|---|---|---|
| PIXEL3 | PIXEL2 | PIXEL1 | PIXEL0 | |

FIG. 22

| MACRO ROW HEADER | STILL IMAGE DATA | MACRO ROW HEADER | STILL IMAGE DATA | ... | ... |
|---|---|---|---|---|---|

| MACRO ROW HEADER | VIDEO DATA | MACRO ROW HEADER | VIDEO DATA | ... | ... |
|---|---|---|---|---|---|

| MACRO ROW HEADER | VIDEO DATA | MACRO ROW HEADER | REFRESH DATA |
|---|---|---|---|

FIG. 23

| PSC VALUE | DESCRIPTION |
|---|---|
| 0 | THE PICTURE START CODE INFORMATION IS GENERATED BY THE SEI AND IS SENT TO THE MD, BUT IS NOT PUT INTO THE BIT STREAM. THE STANDARD 8-BIT MACRO ROW HEADERS ARE USED. |
| 1 | THE PICTURE START CODE INFORMATION IS GENERATED BY THE SEI AND IS SENT TO THE MD AND IS PUT INTO THE BIT STREAM. THE STANDARD 8-BIT MACRO ROW HEADERS ARE USED. |
| 3 | SAME AS PSC=1, BUT ALSO THE ENCODER POLICES THE BIT STREAM TO MAKE SURE A BIT PATTERN THAT LOOKS LIKE THE UNIQUE PICTURE START CODE (BUT IS NOT AN EXPECTED PICTURE START CODE) IS PRECEDED BY ANOTHER PICTURE START CODE THAT ACTS AS AN ESCAPE CODE. THE DECODER ALSO POLICES THE BIT STREAM TO REMOVE ESCAPE CODES. |
| 4 | SAME AS 0, EXCEPT THAT MACRO ROW ZERO OF VIDEO AND STILL ENCODED DATA CONTAINS THE TEMPORAL REFERENCE AND AND FRAME RATE. SEE SECTION 4.1.5. |

FIG. 24

| DATA TYPE | 2 BITS | DT |
|---|---|---|
| MACRO ROW ADDRESS | 4 BITS | MRA |
| HIERARCHY STRUCTURE | 1 BIT | HS |
| RELATIVE TEMPORAL REFERENCE | 1 BIT | RTR |
| TOTAL | 8 BITS | |

FIG. 25

| TEMPORAL REF | PEI | FRAME RATE | PEI | COMMAND | PEI... |
|---|---|---|---|---|---|
| 6 BITS | 1 BIT | 6 BITS | 1 BIT | 6 BITS | PEI... |

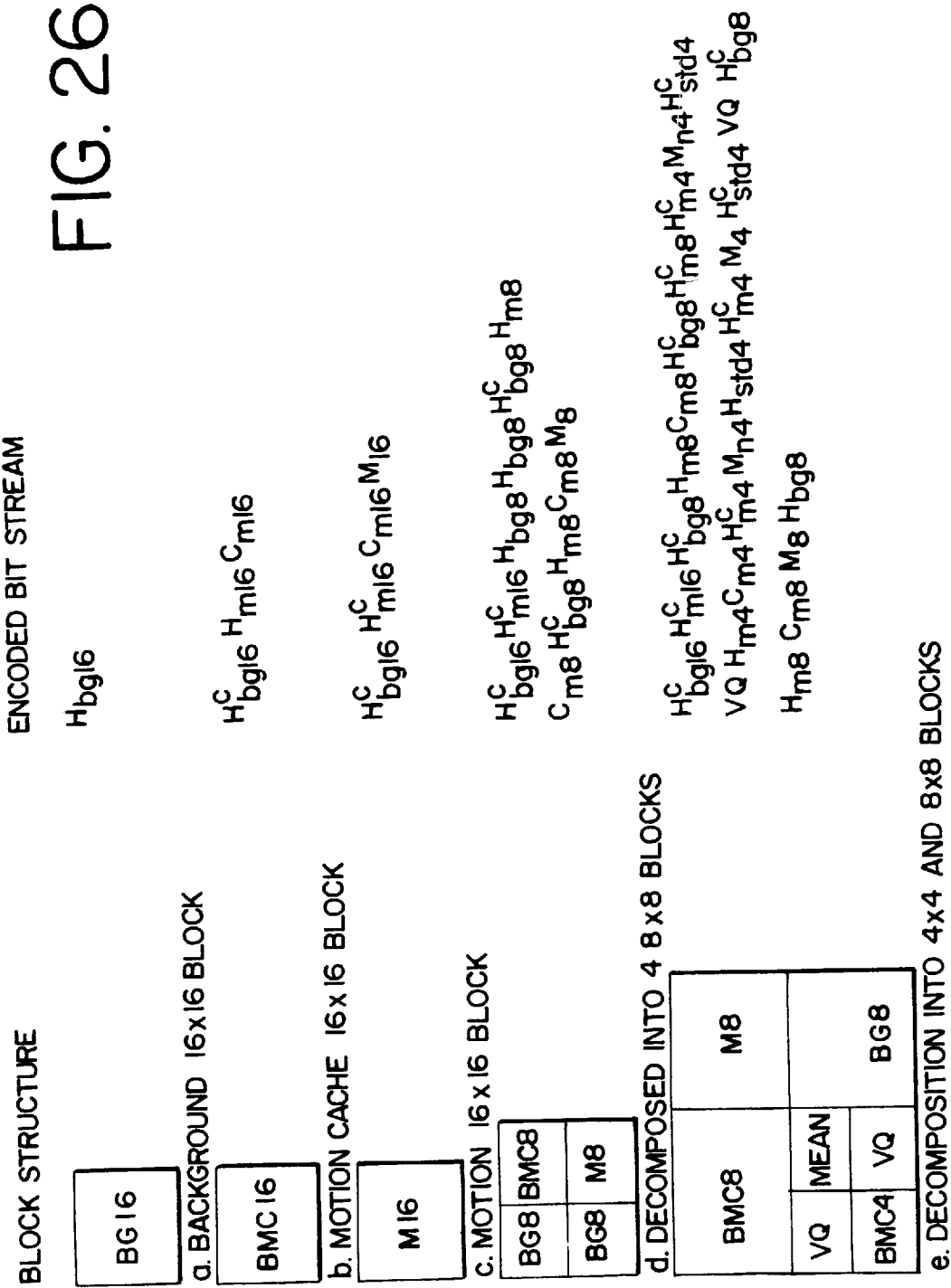

FIG. 27

| FLAG | NUMBER BITS. | DESCRIPTION |
|---|---|---|
| $H_{bg16}$ | 1 | BACKGROUND CODER 16 HIT |
| $H_{bg8}$ | 1 | BACKGROUND CODER 8 HIT |
| $H_{m16}$ | 1 | MOTION 16 HIT |
| $H_{m8}$ | 1 | MOTION 8 HIT |
| $C_{m16}$ | VARIABLE | CACHE POSITION OF MOTION 16×16 CACHE |
| $C_{m8}$ | VARIABLE | CACHE POSITION OF MOTION 8×8 CACHE |
| $C_{m4}$ | VARIABLE | CACHE POSITION OF THE MOTION 4×4 CACHE |
| $M_{16}$ | 8 | MOTION VECTOR OF 16×16 BLOCK (4 BITS EACH FOR ROW AND COLUMN) |
| $M_8$ | 8 | MOTION VECTOR OF 8×8 BLOCK (4 BITS EACH FOR ROW AND COLUMN) |
| $M_4$ | 8 | MOTION VECTOR OF 4×4 BLOCK (4 BITS EACH FOR ROW AND COLUMN) |
| $M_{n4}$ | VARIABLE | MEAN OF 4×4 BLOCK |
| $H_{std4}$ | 1 | LOW ACTIVITY 4×4 BLOCK THAT CAN BE CODED BY JUST THE MEAN |
| $H_{std4uv}$ | 1 | LOW ACTIVITY 4×4 uv BLOCK THAT CAN BE CODED BY JUST THE MEAN |
| VQMEANuv | 8 | ADDRESS OF A VQ ENTRY FOR 2-DIMENSIONAL MEAN FOR u AND v. |
| VQ | 8 | ADDRESS OF A VQ ENTRY |

FIG. 28

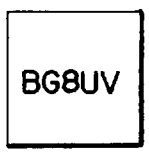

a. BACKGROUND 8×8 BLOCK FOR U AND V

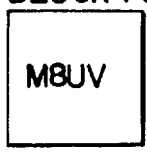

b. MOTION 8×8 BLOCK FOR U AND V. THIS CAN ONLY OCCUR IF THE LUMINANCE 16×16 BLOCK CAN BE CODED BY THE MOTION VECTOR (EITHER CACHE OR MOTION SEARCH), OTHERWISE THE 8×8 U AND V BLOCKS WILL BE DECOMPOSED INTO FOUR 4×4 BLOCKS.

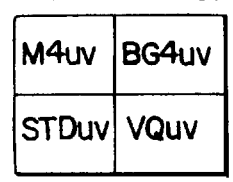

c. THE FIRST BLOCK IS ENCODED AS A MOTION 4 BLOCK, THE SECOND AS BACKGROUND 4, THE THIRD AS THE MEAN OF THE BLOCK, AND THE LAST AS A COLOR VQ.

NO BITS REQUIRED BECAUSE THIS CONDITION IS FORCED WHEN Y 16×16 BLOCK IS A BACKGROUND BLOCK.

TWO FLAG BITS AND THE FIXED LENGTH MOTION VECTORS AS NECESSARY. FLAG BITS ARE:

$$F_{M8UV} \begin{cases} 00 \ (MV_u \text{ AND } MV_v \text{ ARE FREE}) \\ 01 \ MV_v \ (MV_v \text{ IS FREE}) \\ 10 \ MV_u \ (MV_u \text{ IS FREE}) \\ 11 \ MV_u \text{ AND } MV_v \end{cases}$$

WHERE FREE IMPLIES THAT THE MOTION VECTOR IS HALF THE LUMINANCE VECTOR. FOR INSTANCE, $F_{M8UV}=10$ IMPLIES THAT $MV_u$ IS ENCODED WITH THREE BITS THAT ADDRESS THE 1 PIXEL OFFSET AROUND THE Y MOTION VECTOR, BUT $MV_v$ IS ASSUMED TO BE 1/2 OF THE Y MOTION VECTOR.

$$F_{M4uv} \begin{cases} 00 \ (MV_u \text{ AND } MV_v \text{ ARE FREE}) \\ 01 \ MV_v \ (MV_v \text{ IS FREE}) \\ 10 \ MV_u \ (MV_u \text{ IS FREE}) \\ 11 \ MV_u \text{ AND } MV_v \end{cases}$$

THE MOTION VECTORS ARE ENCODED WITH THREE BITS AS DESCRIBED ABOVE. THE BG4uv BLOCK DOES NOT REQUIRE ANY BITS BECAUSE THE ASSOCIATED 8×8 LUMINANCE BLOCK WAS ENCODED AS A BACKGROUND BLOCK. THE STDuv BLOCK REQUIRES THE BIT STREAM $H_{std4uv}$ $VQ_{MEANuv}$ WHERE MEANuv IS THE u AND v MEAN OF THE 4×4 BLOCKS. THE Vquv BLOCK IS SPECIFIED WITH $H^c_{std4uv}$ $VQ_u$ $VQ_v$ WHERE $VQ_u$ AND $VQ_v$ ARE 16-DIMENSIONAL 8-BIT VQ ADDRESSES.

$C_1\ Mn_1\ VQ_1$  $C_2$  $C_3$  $C_4\ Mn_4\ VQ_4$

| MACRO ROW HEADER | 8 BITS |
| --- | --- |
| REFRESH ADDRESS | 8 BITS |
| NUMBER OF 4×4 BLOCKS | 8 BITS |
| TOTAL | 24 BITS |

| FIELD | NUMBER BITS | NUMBER OF FIELDS | TOTAL BITS |
| --- | --- | --- | --- |
| MACRO ROW HEADER | 8 | 9 | 72 |
| REFRESH HEADER | 24 | 2 | 48 |
| TOTAL BITS | | | 120 BITS |

| PICTURE START CODE (16 BITS) | 16 BITS | PSC |
| --- | --- | --- |
| PICTURE TYPE (1 BIT) | 1 BIT | PTYPE |
| TEMPORAL REFERENCE (6 BITS) | 6 BITS | TR |
| TOTAL | 23 BITS | |

FIG. 33

| 15  12 | 11                        0 |
|---|---|
| PACKET TYPE | DATA SIZE IN BITS |
| <DATA> | |
| : | |

FIG. 34

| WORD | 31           24 | 23           16 | 15           8 | 7           0 |
|---|---|---|---|---|
| 0 | ENCODED BITS 0-7 | ENCODED BITS 8-15 | ENCODED BITS 16-23 | ENCODED BITS 24-31 |
| 1 | ENCODED BITS 32-39 | ENCODED BITS 40-47 | ENCODED BITS 48-55 | ENCODED BITS 56-63 |
| : | : | : | : | : |

FIG. 35

| BYTE | 7                         0 |
|---|---|
| 0 | ENCODED BITS 24-31 |
| 1 | ENCODED BITS 16-23 |
| 2 | ENCODED BITS 8-15 |
| 3 | ENCODED BITS 0-7 |
| 4 | ENCODED BITS 63-56 |
| 5 | ENCODED BITS 48-55 |
| 6 | ENCODED BITS 40-47 |
| : | : |

FIG. 36

| BYTE | 7                         0 |
|---|---|
| 0 | ENCODED BITS 0-7 |
| 1 | ENCODED BITS 8-15 |
| 2 | ENCODED BITS 16-23 |
| 3 | ENCODED BITS 24-31 |
| 4 | ENCODED BITS 32-39 |
| 5 | ENCODED BITS 40-47 |
| 6 | ENCODED BITS 48-55 |
| 7 | ENCODED BITS 63-56 |
| : | : |

FIG. 38

| 15 | 12 | 11 | | 0 |
|---|---|---|---|---|
| | 1 | | DATA SIZE IN BITS | |
| CONTROL TYPE | | | CONTROL PARAMETERS | |
| OPTIONAL CONTROL PARAMETERS ||||
| < : > ||||
| < : > ||||

FIG. 39

| 15 | 12 | 11 | 0 |
|---|---|---|---|
| | 2 | | 0 |

FIG. 40

| 15 | 12 | 11 | 0 |
|---|---|---|---|
| | 3 | | 16 |
| REQUESTED NUMBER OF BITS (MUST BE LESS THAN 4096 ||||

FIG. 41

| 15 | 12 | 11 | | 0 |
|---|---|---|---|---|
| | 4 | | NUMBER OF ENCODED BITS | |
| ENCODED BYTE 1 | | | ENCODED BYTE 0 | |
| ENCODED BYTE 3 | | | ENCODED BYTE 2 | |
| : ||||

FIG. 42

| 15 | 12 | 11 | | 0 |
|---|---|---|---|---|
| | 7 | | NUMBER OF ENCODED BITS | |
| ENCODED BYTE 1 | | | ENCODED BYTE 0 | |
| ENCODED BYTE 3 | | | ENCODED BYTE 2 | |
| : ||||

FIG. 43

| 15 | 12 | 11 | 0 |
|---|---|---|---|
| 5 | | NUMBER OF BITS OF PIXEL DATA + 16 | |
| Y COLUMNS | | DATA TYPE | |
| PIXEL 1 | | PIXEL 0 | |
| PIXEL 3 | | PIXEL 2 | |
| PIXEL 5 | | PIXEL 4 | |
| PIXEL 7 | | PIXEL 6 | |
| : | | | |

FIG. 44

| 15 | 12 | 11 | 0 |
|---|---|---|---|
| 6 | | 0 | |

FIG. 45

| 15 | 12 | 11 | 0 |
|---|---|---|---|
| 1 | | 144 | |
| STILL IMAGE QUALITY | | 14 | |
| ENCODER FRAME RATE | | ENCODER BIT RATE | |
| POST FILTER WEIGHT | | PRE FILTER WEIGHT | |
| VIDEO MODE | | TEMPORAL FILTER WEIGHT | |
| Y PAN VALUE | | X PAN VALUE | |
| CONTRAST | | BRIGHTNESS | |
| HUE | | SATURATION | |
| MICROCODE REVISION | | DECODER STATE   ENCODER STATE | |
| RESERVED | | MOTION TRACKING | |

FIG. 46

| 15 | 12 | 11 | 0 |
|---|---|---|---|
| 1 | | 16 | |
| ERROR LEVEL | | 0 | |

FIG. 47

| 15 | 12 | 11 | | 0 |
|---|---|---|---|---|
| | 2 | | 0 | |

FIG. 48

| 15 | 12 | 11 | | 0 |
|---|---|---|---|---|
| | 3 | | NUMBER OF ENCODED BITS | |
| ENCODED BYTE 1 | | | ENCODED BYTE 0 | |
| ENCODED BYTE 3 | | | ENCODED BYTE 2 | |
| | | ⋮ | | |

FIG. 49

| 15 | 12 | 11 | | 0 |
|---|---|---|---|---|
| | 3 | | NUMBER OF ENCODED BITS | |
| ENCODED BYTE 1 | | | ENCODED BYTE 0 | |
| ENCODED BYTE 3 | | | ENCODED BYTE 2 | |
| | | ⋮ | | |

FIG. 50

| 15 | 12 | 11 | | 0 |
|---|---|---|---|---|
| | 4 | | 16 | |
| | FRAME TYPE | | FRAME NUMBER | |

FIG. 51

| 15 | 12 | 11 | | 0 |
|---|---|---|---|---|
| | 5 | | 48 | |
| # OF LINES IN FIFO | FRAME TYPE | | FRAME NUMBER | |
| | # OF ROWS IN IMAGE | | | |
| | # OF COLUMNS IN IMAGE | | | |

FIG. 58

| 15 | 12 11 | | 0 |
|---|---|---|---|
| 1 | | 16 | |
| | FILTER WEIGHT PARAMETER (px 256) | | 5 |

FIG. 59

| 15 | 12 11 | | 0 |
|---|---|---|---|
| 1 | | 16 | |
| | FILTER WEIGHT PARAMETER (px 256) | | 6 |

FIG. 60

| 15 | 12 11 | | 0 |
|---|---|---|---|
| 1 | | 16 | |
| | QUALITY PARAMETER | | 7 |

FIG. 61

| 15 | 12 11 | | 0 |
|---|---|---|---|
| 1 | | 16 | |
| | VIDEO CONTROL PARAMETER | | 8 |

| 7 | 6 | 5 | 4 | 3 | 2 | 1 | 0 |
|---|---|---|---|---|---|---|---|
| VIDEO SOURCE | RESERVED | RESERVED | RESERVED | RESERVED | LARGE DECODED VIEW | SMALL SELF VIEW | LARGE SELF VIEW |

FIG. 62

| 15 | 12 11 | | 0 |
|---|---|---|---|
| 1 | | 32 | |
| | 0 | | 9 |
| | y | | x |

FIG. 63

| 15 | 12 11 | | 0 |
|---|---|---|---|
| 1 | | 16 | |
| | BRIGHTNESS VALUE | 10 | |

FIG. 64

| 15 | 12 11 | | 0 |
|---|---|---|---|
| 1 | | 16 | |
| | CONTRAST VALUE | 11 | |

FIG. 65

| 15 | 12 11 | | 0 |
|---|---|---|---|
| 1 | | 16 | |
| | SATURATION VALUE | 12 | |

FIG. 66

| 15 | 12 11 | | 0 |
|---|---|---|---|
| 1 | | 16 | |
| | HUE VALUE | 13 | |

FIG. 67

| 15 | 12 11 | 0 |
|---|---|---|
| 1 | | 144 |
| STILL IMAGE QUALITY | | 14 |
| ENCODER FRAME RATE | ENCODER RATE | |
| POST FILTER WEIGHT | PRE FILTER WEIGHT | |
| VIDEO MODE | TEMPORAL LITER WEIGHT | |
| Y PAN VALUE | X PAN VALUE | |
| CONTRAST | BRIGHTNESS | |
| HUE | SATURATION | |
| DON'T CARE | DECODER STATE | ENCODER STATE |
| RESERVED | MOTION TRACKING | |

FIG.68

| 15 | 12 | 11 | | 0 |
|---|---|---|---|---|
| 1 | | | 16 | |
| DECODER STATE | | DON'T CARE | 15 | |

FIG.69

| 15 | 12 | 11 | | 0 |
|---|---|---|---|---|
| 1 | | | 16 | |
| MOTION TRACKING PARAMETER | | | 17 | |

FIG.70

| 15 | 12 | 11 | | 0 |
|---|---|---|---|---|
| 1 | | | 16 | |
| CONTROL VALUE | | | 16 | |

FIG.71

| 15 | 12 | 11 | | 0 |
|---|---|---|---|---|
| 1 | | | 16 | |
| 2 | | | 16 | |

FIG.72

| 15 | 12 | 11 | | 0 |
|---|---|---|---|---|
| 1 | | | 16 | |
| CURRENT FRAME RATE DIVISOR VALUE | | | 2 | |

FIG.73

| 15 | 12 | 11 | | 0 |
|---|---|---|---|---|
| 1 | | | 16 | |
| INFORMATION TYPE | | | 16 | |

FIG. 74

| 15 | 12 | 11 | | 0 |
|---|---|---|---|---|
| 1 | \multicolumn{3}{c|}{80} | |
| \multicolumn{2}{|c|}{0} | \multicolumn{3}{c|}{0x81} |
| \multicolumn{5}{|c|}{SIZE OF DECODER BUFFER BITS} |
| \multicolumn{5}{|c|}{CURRENT AMOUNT OF DATA IN DECODER BUFFER IN BITS} |
| \multicolumn{5}{|c|}{SIZE OF ENCODER BUFFER} |
| \multicolumn{5}{|c|}{CURRENT AMOUNT OF DATA IN ENCODER BUFFER IN BITS} |

FIG. 75

| 15 | 12 | 11 | 0 |
|---|---|---|---|
| 1 | | 16 | |
| | 0 | | 0x82 |

FIG. 76

| 15 | 12 | 11 | 0 |
|---|---|---|---|
| 1 | | 2832 | |
| | 1 | | 0x82 |
| Y PIXEL 1 | | Y PIXEL 0 | |
| : | | : | |

FIG. 77

| 15 | 12 | 11 | 0 |
|---|---|---|---|
| 1 | | 1424 | |
| | 2 | | 0x82 |
| U PIXEL 1 | | U PIXEL 0 | |
| : | | : | |
| V PIXEL 1 | | V PIXEL 0 | |
| : | | : | |

FIG. 78

| 15 | 12 | 11 | 0 |
|---|---|---|---|
| 1 | | 16 | |
| | 3 | | 0x82 |

|           | WITHOUT MOTION | WITH MOTION |
|-----------|----------------|-------------|
| 4x4 BLOCK | 32/(9+Pd)      | 32/(13+Pd)  |
| 8x8 BLOCK | 128/(33+Pd)    | 128/(49+Pd) |

|           | WITHOUT MOTION           | WITH MOTION             |
|-----------|--------------------------|-------------------------|
| 4x4 BLOCK | 32/(9+3)=32/12=2.7       | 32/(13+3)=32/16=2       |
| 8x8 BLOCK | 128/(33+3)128/36=3.6     | 128/(49+3)=128/52=2.5   |

|           | DELAY=3 | DELAY=4 | DELAY=5 | DELAY=6 | DELAY=7 | DELAY=8 |
|-----------|---------|---------|---------|---------|---------|---------|
| 4x4 BLOCK | 2.167   | 2.027   | 1.905   | 1.796   | 1.700   | 1.613   |
| 8x8 BLOCK | 2.735   | 2.676   | 2.620   | 2.566   | 2.514   | 2.465   |
| OVERALL   | 2.593   | 2.514   | 2.441   | 2.374   | 2.311   | 2.252   |

FIG. 86

KARNAUGH
MAP
SUM $S_i$

|   | AB 00 | 01 | 10 | 11 |
|---|---|---|---|---|
| D 0 | 0 | 1 | 1 | 0 |
| 1 | 1 | 0 | 0 | 1 |

KARNAUGH
MAP
CARRY $C_i$

|   | AB 00 | 01 | 10 | 11 |
|---|---|---|---|---|
| D 0 | 0 | 0 | 0 | 1 |
| 1 | 0 | 1 | 1 | 1 |

$S_i = A_i \wedge B_i \wedge D_i = A_i \& B_i \& D_i \mid A_i \& !B_i \& !D_i \mid !A_i \& B_i \& !D_i \mid !A_i \& !B_i \& D_i$
$C_i = A_i \& B_i \mid A_i \& D_i \mid B_i \& D_i$ NOTE: THE $\wedge$ SYMBOL IS EQUIVALENT TO XOR.

YUV TO RGB MATRIX USING CARRY SAVE ADDERS

USING 10 BIT ADDERS IN ALL CASSES. U/V ARE PROCESSED BY SUBTRACTING 128, YUV ARE SIGN EXTENDED BY TWO BITS. EXCESS BITS ARE USED TO DETERMINE OVERFLOW OR UNDERFLOW STATE.

BITS 9 AND 8 ARE USED TO DETERMINE OVERFLOW OR UNDERFLOW STATE. 00=OK, 01=OVERFLOW, 11=UNDERFLOW, 10=INDETERMINANT.

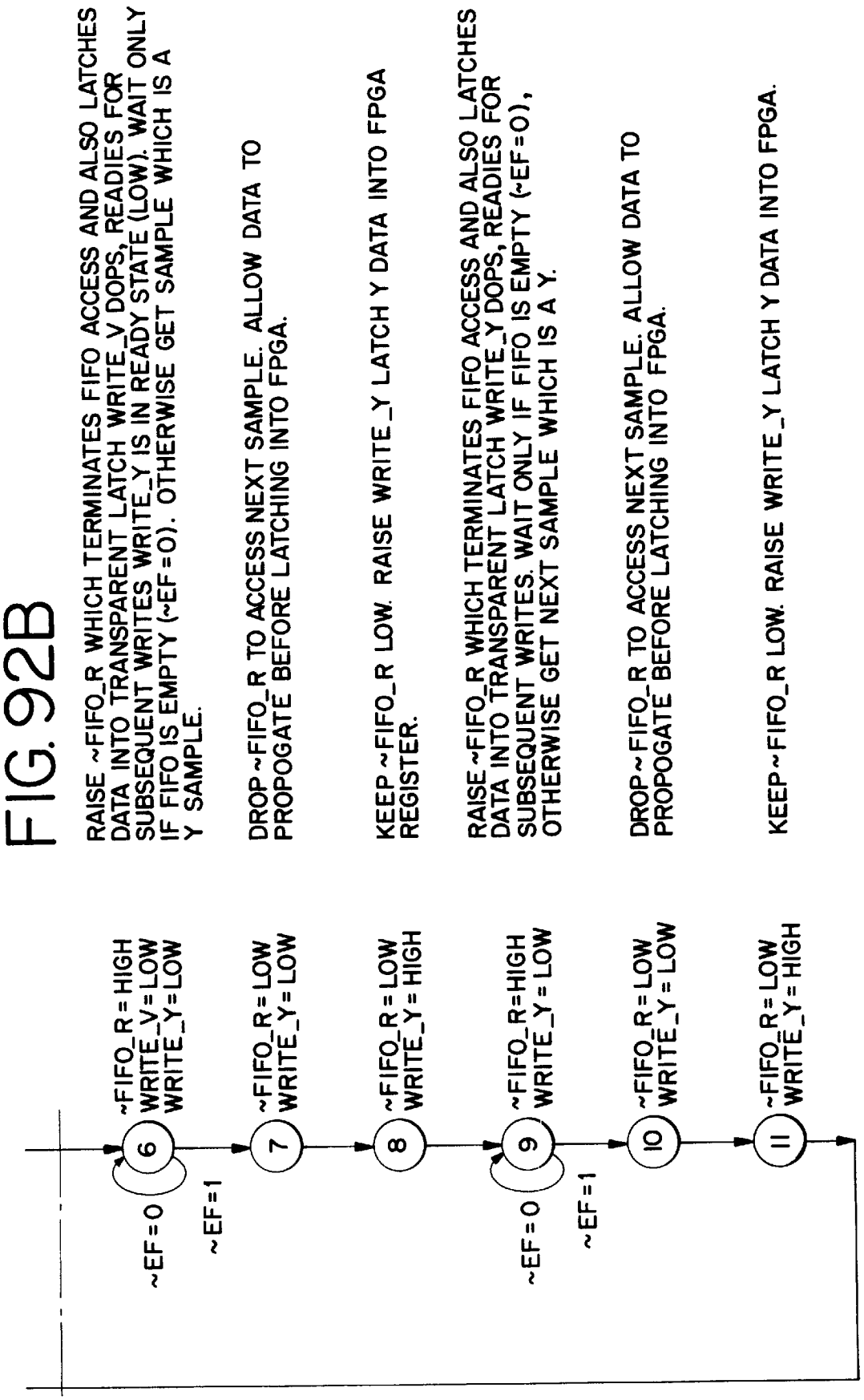

FIG. 93
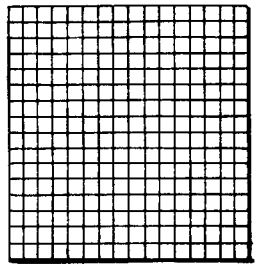
FIG. 94
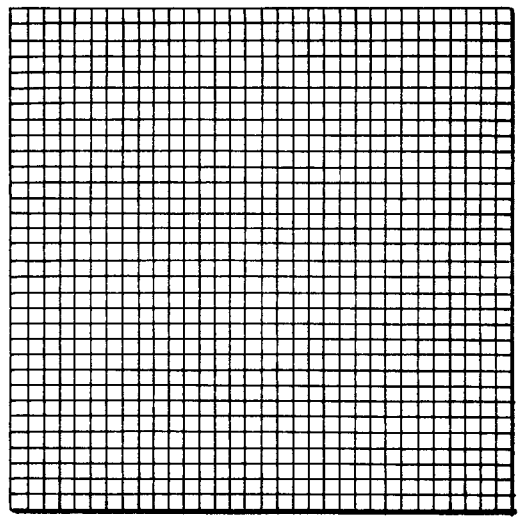
FIG. 95
| INTERPOLATED MACRO ROW 1 |
| --- |
| INTERPOLATED MACRO ROW 2 |
| INTERPOLATED MACRO ROW 3 |
FIG. 96
| INTERPOLATED MACRO ROW |
| --- |
| INTERPOLATED MACRO ROW 3 |
| INTERPOLATED MACRO ROW 4 |
FIG. 97
| 0 31 |
| --- |
| 32 63    X |
| 64 95 |
| 32 63 |
| --- |
| 64 95    X |
| 0 31 |
| 64 95 |
| --- |
| 0 31    X |
| 32 63 |

VIDEO ENCODER/DECODER SYSTEM

FIELD OF THE INVENTION

The present invention generally relates to digital data compression and encoding and decoding of signals. More particularly, the present invention relates to methods and apparatus for encoding and decoding digitized video signals.

BACKGROUND

The development of digital data compression techniques for compressing visual information is very significant due to the high demand for numerous new visual applications. These new visual applications include, for example, television transmission including high definition television transmission, facsimile transmission, teleconferencing and video conferencing, digital broadcasting, digital storage and recording, multimedia PC, and videophones.

Generally, digital channel capacity is the most important parameter in a digital transmission system because it limits the amount of data to be transmitted in a given time. In many applications, the transmission process requires a very effective source encoding technique to overcome this limitation. Moreover, the major issue in video source encoding is usually the tradeoff between encoder cost and the amount of compression that is required for a given channel capacity. The encoder cost usually relates directly to the computational complexity of the encoder. Another significant issue is whether the degradation of the reconstructed signal can be tolerated for a particular application.

As described in U.S. Pat. No. 5,444,489, a common objective of all source encoding techniques is to reduce the bit rate of some underlying source signal for more efficient transmission and/or storage. The source signals of interest are usually in digital form. Examples of these are digitized speech samples, image pixels, and a sequence of images. Source encoding techniques can be classified as either lossless or lossy. In lossless encoding techniques, the reconstructed signal is an exact replica of the original signal, whereas in lossy encoding techniques, some distortion is introduced into the reconstructed signal, which distortion can be tolerated in many applications.

Almost all the video source encoding techniques achieve compression by exploiting both the spatial and temporal redundancies (correlation) inherent in the visual source signals. Numerous source encoding techniques have been developed over the last few decades for encoding both speech waveforms and image sequences. Consider, for example, W. K. Pratt, *Digital Image Processing*, N.Y.: John Wiley & Sons, 1978; N. S. Jayant and P. Noll, *Digital Coding of Waveforms: Principles and Applications to Speech and Video*, Englewood Cliffs, N.J.: Prentice-Hall, 1984; A. N. Netravali and G. B. Haskell, *Digital pictures: Representation and compression*, N.Y.: Plenum Press, 1988. Pulse code modulation (PCM), differential PCM (DPCM), delta modulation, predictive encoding, and various hybrid as well as adaptive versions of these techniques are very cost-effective encoding schemes at bit rates above one bit per sample, which is considered to be a medium-to-high quality data rate. However, a deficiency of all the foregoing techniques is that the encoding process is performed on only individual samples of the source signal. According to the well known Shannon rate-distortion theory described in T. Berger, *Rate Distortion Theory*, Englewood Cliffs, N.J.: Prentice Hall, 1971, a better objective performance can always be achieved in principle by encoding vectors rather than scalars.

Scalar quantization involves basically two operations. First, the range of possible input values is partitioned into a finite collection of subranges. Second, for each subrange, a representative value is selected to be output when an input value is within the subrange.

Vector quantization (VQ) allows the same two operations to take place in multi-dimensional vector space. Vector space is partitioned into subranges each having a corresponding representative value or code vector. Vector quantization was introduced in the late 1970s as a source encoding technique to encode source vectors instead of scalars. VQ is described in A. Gersho, "Asymptotically optimal block quantization," *IEEE Trans. Information Theory*, vol. 25, pp. 373–380, July 1979; Y. Linde, A. Buzo, and R. Gray, "An algorithm for vector quantization design," *IEEE Trans. Commun.*, vol. 28, pp. 84–95, January, 1980; R. M. Gray, J. C. Kieffer, and Y. Linde, "Locally optimal quantizer design," *Information and Control*, vol. 45, pp. 178–198, 1980. An advantage of the VQ approach is that it can be combined with many hybrid and adaptive schemes to improve the overall encoding performance. Further, VQ-oriented encoding schemes are simple to implement and generally achieve higher compression than scalar quantization techniques. The receiver structure of VQ consists of a statistically generated codebook containing code vectors.

Most VQ-oriented encoding techniques, however, operate at a fixed rate/distortion tradeoff and thus provide very limited flexibility for practical implementation. Another practical limitation of VQ is that VQ performance depends on the particular image being encoded, especially at low-rate encoding. This quantization mismatch can degrade the performance substantially if the statistics of the image being encoded are not similar to those of the VQ.

Two other conventional block encoding techniques are transform encoding (e.g., discrete cosine transform (DCT) encoding) and subband encoding. In transform encoding, the image is decomposed into a set of nonoverlapping contiguous blocks and linear transformation is evaluated for each block. Transform encoding is described in the following publications: W. K. Pratt, *Digital Image Processing*, N.Y.: John Wiley & Sons, 1978; N. S. Jaynat and P. Noll, *Digital Coding of Waveforms; Principles and Applications to Speech and Video*, Englewood Cliffs, N.J.: Prentice-Hall, 1984; R. C. Gonzalez and P. Wintz, *Digital Image Processing*, Reading, Mass.; Addison-Wesley, 2nd ed., 1987. In transform encoding, transform coefficients are generated for each block, and these coefficients can be encoded by a number of conventional encoding techniques, including vector quantization. See N. M. Nasrabadi and R. A. King, "Image coding using vector quantization: a review," *IEEE Trans. Commun.*, vol. 36, pp. 957–971, August 1986. The transform coefficients in general are much less correlated than the original image pixels. This feature offers the possibility of modeling their statistics with well defined distribution functions. Furthermore, the image is considered to be more compact in the transform domain because not all coefficients are required to reconstruct the image with very good quality. Transform encoding is also considered to be a robust technique when compared to VQ because the transformation is fixed for all classes of images.

Although meritorious to an extent, the effectiveness of transform encoding is questionable. The effectiveness depends critically on how the bits are allocated in order to encode the individual transform coefficients. This bit rate allocations problem is documented in A. Gersho and R. M. Gray, *Vector Quantization and Signal Compression*, Mass.: Kluwer Academic, 1992. This bit rate allocation problem often results in a highly complex computational strategy, especially if it is adaptive, as suggested in N. S. Jayant and P. Noll, *Digital Coding of Waveforms: Principles and Applications to Speech and Video*, Englewood Cliffs, N.J.: Prentice-Hall, 1984. The numerous computations associated with the transformation and the bit rate allocation strategy can lead to a high-cost hardware implementation. Furthermore, most encoders using transform encoding operate on block sizes of at least 8×8 pixels in order to achieve reasonable encoding performance. These block sizes are very effective in encoding the low detail regions of the image, but can result in poor quality in the high detail regions, especially at low bit-rates. In this regard, see R. Clarke, *Transform Coding of Images*, N.Y.: Academic, 1985. Thus, VQ is still known to be a better technique for encoding high detail image blocks.

Finally, in subband encoding the image is represented as a number of subband (band pass) images that have been subsampled at their Nyquist rate. In this regard, see M. Vetterli, "Multi-dimensional sub-band coding: some theory and algorithms," *Signal Processing*, vol. 6, pp. 97–112, April, 1984; J. W. Woods and S. D. O'Neil, "Subband coding of images," *IEEE Trans. Acoust., Speech, Signal Processing*, vol. 34, pp. 1278–1288, October, 1986. These subband images are then separately encoded at different bit rates. This approach resembles the human visual system. Subband encoding is a very effective technique for high quality encoding of images and video sequences, such as high definition TV. Subband encoding is also effective for progressive transmission in which different bands are used to decode signals at different rate/distortion operating points.

However, a primary disadvantage of subband encoding is that the computational complexity of the bit rate allocations and the subband decomposition problem can lead to a high-cost hardware implementation. Furthermore, subband encoding is usually not very efficient in allocating bit rates to encode the subband images at low rates.

Hence, there is a heretofore unaddressed need in the art for a low bit rate source encoding system and method which are much simpler and inexpensive to implement and which exhibit better computational efficiency.

SUMMARY OF THE INVENTION

In accordance with a first aspect of the present invention, an apparatus for encoding an image signal is provided. The apparatus includes an acquisition module disposed to receive the image signal. A first processor is coupled to the acquisition module. At least one encoder processor is coupled to the first processor, and produces an encoded image signal under control of the first processor.

In accordance with a second aspect of the present invention, a method for generating a compressed video signal is provided. The method includes the steps of converting an input image signal into a predetermined digital format and transferring the digital format image signal to at least one encoder processor. The method further includes the step of applying, at the encoder processor, a hierarchical vector quantization compression algorithm to the digitized image signal. At the next step, a resultant encoded bit stream generated by the application of the algorithm is collected.

In accordance with a third aspect of the present invention, a method for compressing an image signal representing a series of image frames is provided. The method includes the step of analyzing a first image frame by computing a mean value for each of a plurality of image blocks within the first image frame, storing the computed mean values in a scalar cache, providing a mean value quantizer comprising a predetermined number of quantization levels arranged between a minimum mean value and a maximum mean value stored in the scalar cache, the mean value quantizer producing a quantized mean value, and identifying each image block from the plurality of image blocks that is a low activity image block. Next, each of the low activity image blocks is encoded with its corresponding quantized mean value. These steps are then repeated for a second frame of the image signal.

In accordance with a fourth aspect of the present invention, a method of periodically enhancing a video image with at least one processor, in which the video image includes a series of frames, each of the frames including at least one block, is provided. The method includes the steps of determining space availability of the processor, determining time availability of the processor, and determining the number of bits used to encode a frame. Then, a value is assigned to a first variable corresponding to the number of bits used to encode the frame. The first variable is compared to a predetermined refresh threshold. The method further includes the steps of scalar refreshing the video image if the first variable exceeds the predetermined refresh threshold, and block refreshing the video image if the first variable is less than or equal to the predetermined refresh threshold.

In accordance with a fifth aspect of the present invention, a method for transmitting data from an encoder to a decoder is provided. The method includes, in combination encoding the data into a plurality of macro rows, transmitting the macro rows from the encoder to the decoder, and decoding the macro rows at the decoder.

In accordance with a sixth aspect of the present invention, in a video conferencing system having a camera, an image processor and an image display, an apparatus for electronically panning an image scene is provided. The apparatus includes an image acquisition module disposed to receive an image signal from the camera. The image acquisition module produces a digital representation of the image signal. Means for transmitting a portion of the digital representation of the image signal to the image processor are provided. The transmitting means is coupled between the image acquisition module and the image processor. The apparatus also includes an image pan selection device coupled to the transmitting means. The image pan selection device is operable to change the portion of the digital representation of the image signal that is transmitted to the image processor.

An object of the present invention is a reduction of the number of bits required to encode an image. Specifically, an object of the invention is a reduction of the number of bits required to encode an image by using a scalar cache to encode the mean of the blocks in the different levels of the hierarchy. Yet another object of the present invention is a reduction of decoding errors caused by faulty motion cache updates in the presence of transmission errors.

A further object of the present invention is a reduction of the overall computational power required to implement the HVQC and possible reduction of the number of bits used to encode an image. Another object of the present invention is an improvement in the perceived image quality. It is further an object of the present invention to control how bits are allocated to encoding various portions of the image to improve the image quality.

Another object of the present invention is to reduce the probability of buffer overflow and control how bits are allocated to encoding various portions of the image to improve the image quality.

Furthermore, it is an object of the present invention to improve image quality and reduce artifacts caused by transmission errors. A further object of the present invention is to improve image quality by encoding the chrominance components independently of the luminance component. Still another object of the present invention is an improvement in overall image quality, particularly of the chrominance component.

It is also an object of the present invention to improve image quality by reducing encoder artifacts. Another object of the present invention is to provides a means to trade off encoder bit rate for image quality.

In addition, it is an object of the present invention to allow use of multiple processors to share in the computational load of implementing the video encoder/decoder system, sometimes referred to as a codec, which allows for greater flexibility and use of general purpose devices in the implementation of the encoder/decoder system. Another object of the present invention is implementation among several devices operating in parallel.

A further object of the present invention is to keep computational requirements of the system down through the use of load balancing techniques. Moreover, it is an object of the present invention to keep the computation load down by providing the processing devices with a history of the portion of the image they have just acquired and thus increase the precision of the motion vectors along the partition boundary.

Yet another object of the invention is a reduction of the bit rate and the computational complexity. An additional object of the invention is to allow computational needs to be balanced with image quality and bit rate constraints.

It is further an object of the invention to provide a method of keeping the image quality acceptable and the bit rate down. Additionally, it is an object of the invention to reduce the memory requirements and cost of the system. Another object of the invention is bit rate management determined by a single processing device that in turn controls the various encoder devices.

An additional object of the invention is to allow for maximum throughput of data to the transmission channel, immediate bit rate feedback control to all encoding processors, and, by the use of small packets of data, reduce image inaccuracies at the decoder due to channel errors. It is also an object of the invention to allow for efficient retransmission, if necessary.

A further object of the invention is to allow for a data channel to transmit various types of data in a multiplexed fashion. In addition, it is an object of the invention to reduce bit rate by allowing the caches to have independent initial conditions. Another object of the invention is low cost and low complexity implementation of YUV-to-RGB conversion.

Yet another object of the invention is a low cost, low complexity mechanism for controlling the data to undergo YUV-to-RGB conversion. An additional object of the invention is improved error detection and concealment. Another object of the invention is to reduce the amount of time between the viewer seeing a scene of high motion begin and subsequent scenes.

Furthermore, it is an object of the invention to transmit high quality still image frames. Another object of the invention is to improve the image quality by pre-determining which areas require the most bits for encoding.

It is also an object of the invention to provide a fast, efficient, and low cost method of calculating the distortion measure used in the hierarchical algorithm. Another object of the invention is a low cost means of panning an image scene and a low cost means of zooming in and out of an image scene.

An additional object of the invention is an elimination of the need for specialized ASICs and specialized board versions. Another object of the invention is to simplify video conferencing for the user. Moreover, it is an object of the invention to allow a user to have a visual representation of who the caller is and what they may want.

These and other objects, features, and advantages of the present invention are discussed or are apparent in the following description of the invention.

BRIEF DESCRIPTION OF THE DRAWINGS

In the detailed description that follows, reference will be made to the following figures:

FIG. 4 is a block diagram of a motion encoder of FIG. 1A;

FIG. 5 is a graphical illustration showing the functionality of the compute-and-select mechanism of FIG. 4;

FIG. 6 is a graphical illustration showing the encoding of motion vectors within a cache memory of FIG. 4;

FIG. 12 is a graphical illustration showing a raster scan technique for scanning the image blocks in one image frame;

FIG. 13 is a graphical illustration showing a localized scanning technique for scanning the image blocks in one image frame;

FIG. 15 is a bit map of the format of data for the YUV-to-RGB converter shown in FIG. 14A;

FIG. 16 shows the time for each phase of pre filtering assuming the encoders shown in FIGS. 14A and 14B will be operating on byte packed data;

FIG. 17 depicts processor utilization (minus overhead) for post processing;

FIG. 18 shows the format improving the efficiency of the YUV-to-RGB convertor shown in FIG. 14A;

FIG. 19 is a table of eight gamma elements;

FIG. 20 is a graph of threshold v. buffer fullness;

FIG. 21 depicts the Y data format and U&V data format in the master video input data buffer;

FIG. 22 is a high level example of a video bit stream;

FIG. 23 is a table relating to various values of the picture start code (PSC);

FIG. 24 is a table of the fields in a macro row header;

FIG. 25 shows the format of extended macro zero information;

FIG. 26 is a table showing various decompositions of luminance of 16×16 blocks and their resulting bit streams;

FIG. 27 is a table of the flags used to describe the video bit stream;

FIG. 28 is a table of the various decompositions of chrominance 8×8 blocks and their resulting bit streams;

FIG. 33 depicts a packet header;

FIG. 34 depicts encoded data in C31 memory in big endian format;

FIG. 35 depicts encoded data in PC memory for the original bit stream;

FIG. 36 depicts encoded data in PC memory for a bit stream of the system;

FIGS. 38–44 relate to packet definitions for packets sent to the VSA;

FIG. 38 depicts a control packet;

FIG. 39 depicts a status request packet;

FIG. 40 depicts an encoded bit stream request;

FIG. 41 depicts a decoder bits end packet;

FIG. 42 depicts a decoder bits start/continue packet;

FIG. 43 depicts a YUV data for encoder packet;

FIG. 44 depicts a drop current RGB frame packet;

FIGS. 45–53 relate to packet definitions for packets sent to the host (PC);

FIG. 45 depicts a status packet;

FIG. 46 depicts a decoder error packet;

FIG. 47 depicts a decoder acknowledgment packet;

FIG. 48 depicts an encoded bits from encoder end packet;

FIG. 49 depicts an encoded bits from encoder start/continue packet;

FIG. 50 depicts an encoded bits frame stamp;

FIG. 51 depicts a top of RGB frame packet;

FIG. 52 depicts a FIFO ready packet;

FIG. 53 depicts a YUV acknowledgment packet;

FIGS. 54–78 relate to control types and parameters for the control packet (host to VSA);

FIG. 54 depicts a control encoding packet;

FIG. 55 depicts a frame rate divisor packet;

FIG. 56 depicts an encoded bit rate packet;

FIG. 57 depicts a post spatial filter packet;

FIG. 58 depicts a pre spatial filter packet;

FIG. 59 depicts a temporal filter packet;

FIG. 60 depicts a sill image quality packet;

FIG. 61 depicts a video mode packet;

FIG. 62 depicts a video pan absolute packet;

FIG. 63 depicts a brightness packet;

FIG. 64 depicts a contrast packet;

FIG. 65 depicts a saturation packet;

FIG. 66 depicts a hue packet;

FIG. 67 depicts a super control packet;

FIG. 68 depicts a control decoding packet;

FIG. 69 depicts a motion tracking packet;

FIG. 70 depicts a request control setting packet;

FIG. 71 depicts an example of a request control setting packet;

FIG. 72 depicts a frame rate divisor packet;

FIG. 73 depicts a request special status information packet;

FIG. 74 depicts a buffer fullness information packet;

FIG. 75 depicts a YUV top of frame packet;

FIG. 76 depicts a Y data frame packet;

FIG. 77 depicts a UV data packet;

FIG. 78 depicts a YUV end of frame packet

FIG. 86 is a Karnaugh map for carry save adders in the YUV to RGB matrix;

FIG. 93 shows a 16×16 image block;

FIG. 94 shows an interpolated macro block;

FIG. 95 depicts memory space at the end of step 1 of the first iteration of a first motion estimation memory saving technique;

FIG. 96 depicts the memory space at the end of step 4 of the first iteration of the first motion estimation memory saving technique; and FIG. 97 depicts memory space addressing for three successive iterations of a second motion estimation memory saving technique.

DETAILED DESCRIPTION OF THE PREFERRED EMBODIMENT

Figure 1A:
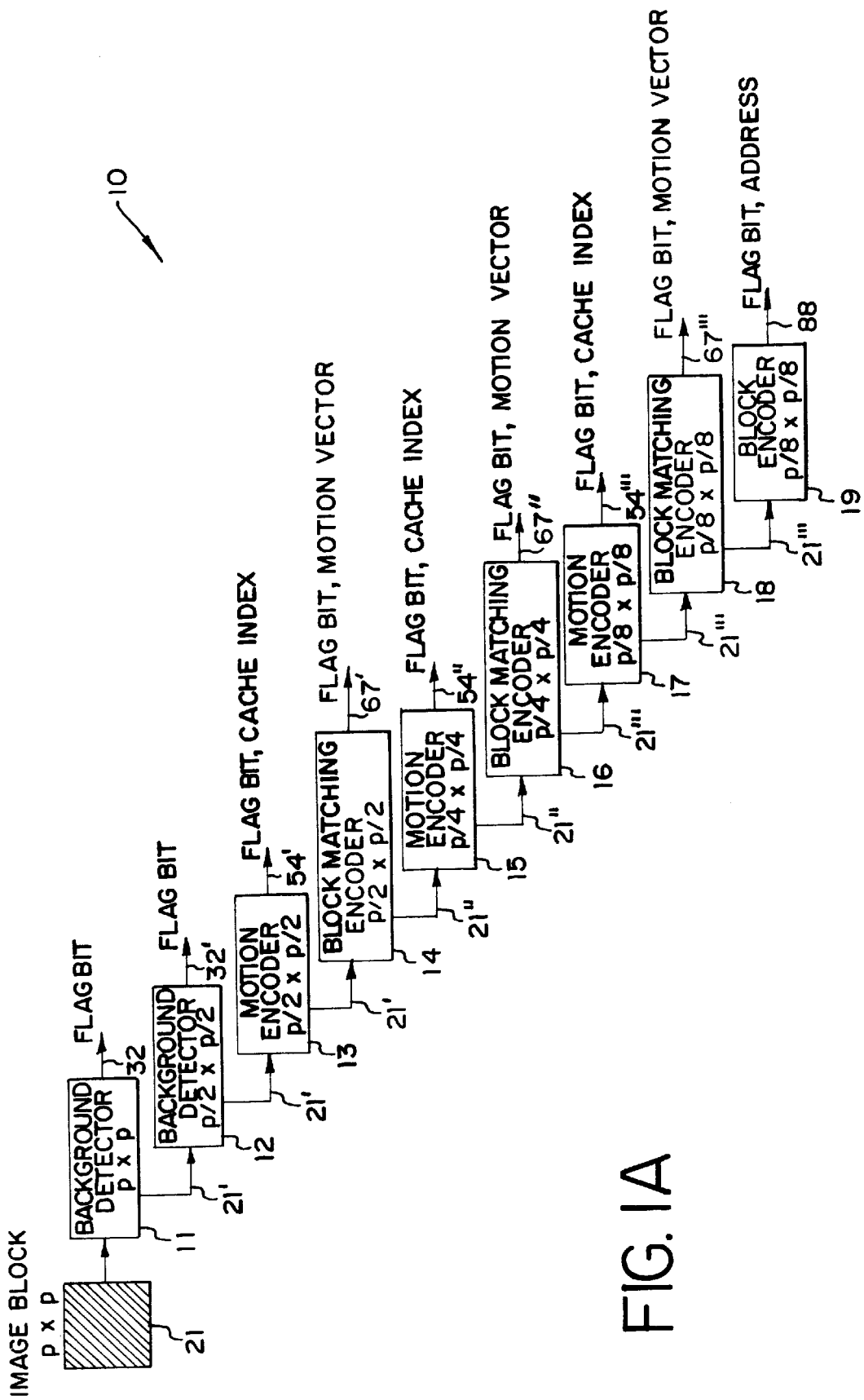
FIG. 1A is a block diagram of a hierarchical source encoding system in accordance with the present invention.

With reference now to the figures wherein like numerals designate corresponding parts throughout the several views, FIG. 1A shows a hierarchical source encoding system 10 having multiple successive stages 11–19 for encoding different parts of an image block 21. In essence, higher bit rates are allocated to those regions of the image block 21 where more motion occurs, while lower bit rates are allocated to those regions where less motion occurs. The hierarchical source encoding system 10 has a low computational complexity, is simple and inexpensive to implement, and is suited for implementation in hardware, software, or combinations thereof.

In accordance with a significant aspect of the present invention, the hierarchical encoding system 10 utilizes cache memories with stack replacement algorithms as a noiseless method to encode motion vectors. This approach has an advantage over entropy encoding because the statistics of the motion vectors are allowed to vary with time. Another major advantage of this approach is that the cache memories can substantially reduce the computation required for matching data blocks.

Figure 2:
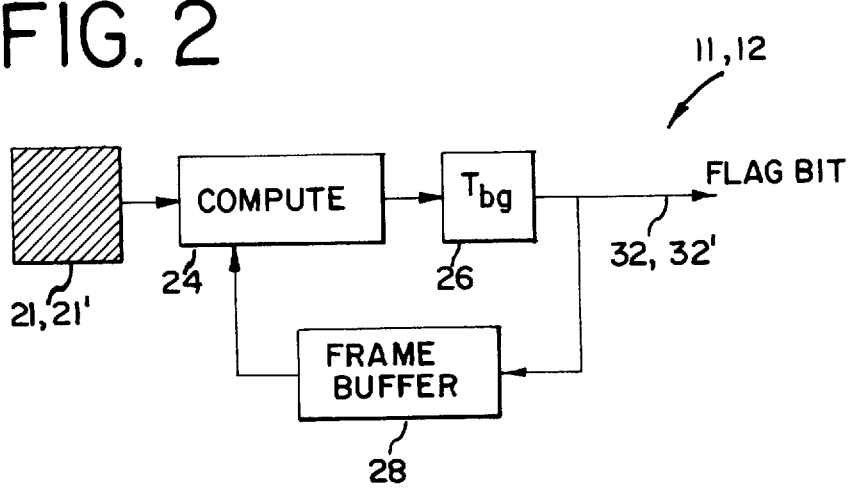
FIG. 2 is a block diagram of a background detector of FIG. 1A.

As shown in FIG. 1A, a background detector 11 initially receives an image block 21 of size p×p, for instance, 16×16 or 32×32 pixels. Generally, the background detector 11 determines whether the image block 21 is either a background block or a moving block. A block diagram of the background detector 11 is shown in FIG. 2. With reference to FIG. 2, the background detector 11 comprises a compute mechanism 24 in series with a $T_{bg}$ flag mechanism 26, and a frame buffer 28 for receiving data from the flag mechanism 26 and for writing data to the compute mechanism 24. The frame buffer 28 can be any memory which can be randomly accessed.

In the compute mechanism 24, the image block 21 is compared with a previously encoded p×p image block (not shown) which has been stored in the frame buffer 28 in order to generate a difference value, or a "distortion" value. The distortion value is generated by comparing the blocks on a pixel-by-pixel basis. The compute mechanism 24 may utilize any suitable distortion measurement algorithm for determining the distortion value, but preferably, it employs one of the following well known distortion measurement algorithms:

Mean Square Error (MSE)

$$MSE = \frac{1}{PxP} \sum_{i=1}^{P} \sum_{j=1}^{P} (x_{ij}(t) - x_{ij}(t-1))^2 \quad (1)$$

Mean Absolute Error (MAE)

$$MAE = \frac{1}{PxP} \sum_{i=1}^{P} \sum_{j=1}^{P} |x_{ij}(t) - x_{ij}(t-1)| \quad (2)$$

Number of Moving Pixels (NMP)

$$NMP = \sum_{i=1}^{P} \sum_{j=1}^{P} \left\{ \begin{array}{ll} 1 & \text{if } |(x)_{ij}(t) - x_{ij}(t-1)| > T \\ 0 & \text{otherwise} \end{array} \right\} \quad (3)$$

The image block 21 is classified as a background block if a distortion value is less than a predetermined threshold $T_{bg}$. The comparison to the threshold $T_{bg}$ is performed in the $T_{bg}$ flag mechanism 26. If the comparison results in a difference which is less than the threshold $T_{bg}$, then a flag bit 32 is set to a logic high ("1") to thereby indicate that the present image block 21 is substantially identical to the previously encoded p×p image block and then the system 10 will retrieve another image block 21 for encoding. In the foregoing scenario, the image block 21 is encoded with merely a single flat bit 32. In the alternative, that is, if the distortion is greater than or equal to the threshold $T_{bg}$, the flag bit 32 remains at a logic low ("0") and then the system 10 will pass the p×p image block 21 on to the next hierarchical stage, that is, to the p/2×p/2 (16×16 pixels in this example) background detector 12.

Figure 3:
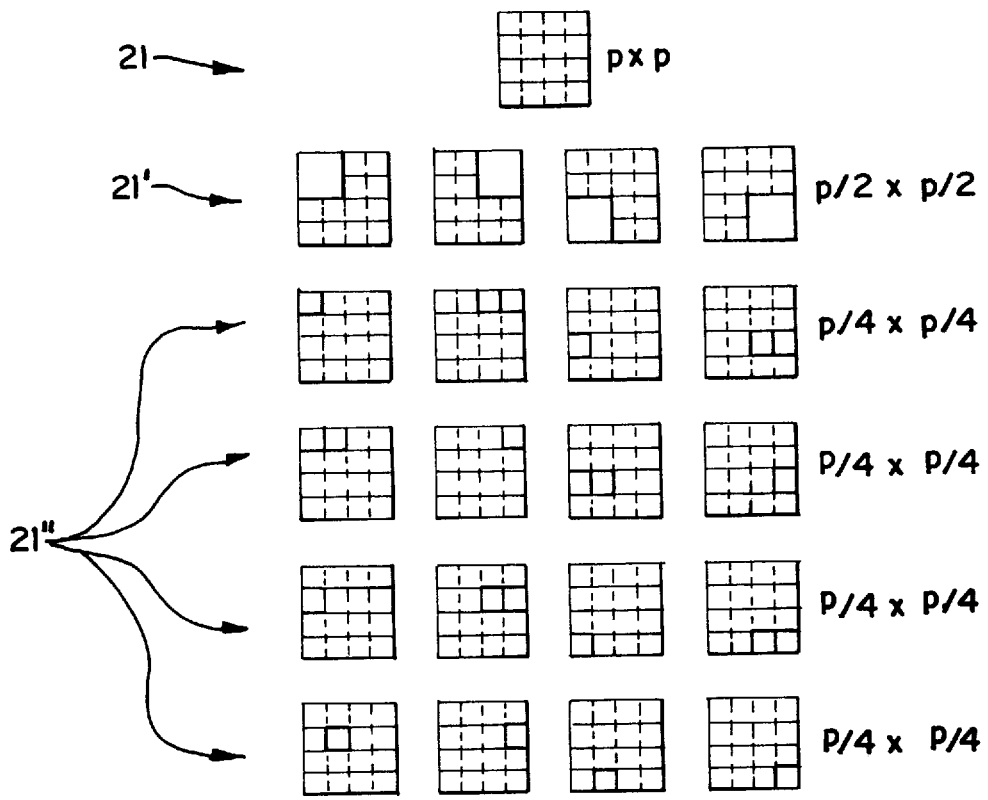
FIG. 3 is a graphical illustration showing conventional quadtree decomposition of image blocks performed by the hierarchical source encoding system of FIG. 1A.

The p/2×p/2 background detector 12 has essentially the same architecture and equivalent functionality as the p×p background detector 11, as shown in FIG. 2 or a similar equivalent thereof, but the p/2×p/2 background detector 12 decomposes the p×p image block 21 into preferably four p/2×p/2 image blocks 21' via a conventional quadtree technique, prior to image analysis. A conventional quadtree decomposition is illustrated graphically in FIG. 3. As shown in FIG. 3, in conventional quadtree decomposition, a p×p block is divided into four p/2×p/2 blocks, which are individually analyzed, and then each of the p/2×p/2 blocks are broken down further into p/4×p/4 blocks, which are individually analyzed, and so on.

Thus, in the present invention, the p/2×p/2 background detector 12 retrieves a p/2×p/2 image block 21' from the four possible image blocks 21' within the decomposed p×p image block 21 residing in the frame buffer 28 and subsequently analyzes it. Eventually, all of the p/2×p/2 image blocks 21' are individually processed by the background detector 12. If the retrieved p/2×p/2 image block 21' matches with the corresponding previously encoded p/2×p/2 image block (not shown) within the frame buffer 28, then the flag bit 32' is set at a logic high to thereby encode the p/2×p/2 image block 21', and then the background detector 12 will retrieve another p/2×p/2 image block 21' for analysis, until the four of the p×p image block are exhausted. Alternatively, if the particular p/2×p/2 image block 21' at issue does not match the corresponding previously encoded p/2×p/2 image block, then the p/2×p/2 image block 21' is forwarded to the next subsequent stage of the hierarchical source encoding system 10 for analysis, that is, to the motion encoder 13.

As shown in FIG. 4, in the motion encoder 13, the p/2×p/2 image block 21' is analyzed for motion. For this purpose, the p/2×p/2 motion encoder 13 comprises a compute-and-select mechanism 34 for initially receiving p/2×p/2 image block 21', a cache memory 36 having a modifiable set of motion vectors which are ultimately matched with the incoming image block 21', a $T_M$ threshold mechanism 38 for comparing the output of the compute-and-select mechanism 34 with a threshold $T_M$, and cache update mechanism 42 for updating the motion code vectors contained within the cache memory 36 based upon motion information received from the next subsequent hierarchical stage, or from a block matching encoder 14, as indicated by a reference arrow 43'.

The compute-and-select mechanism 34 attempts to match the incoming p/2×p/2 image block 21' with a previously stored image block which is displaced to an extent in the frame buffer 28. The displacement is determined by a motion vector corresponding to the matching previously stored image block. Generally, motion vectors are two-dimensional integer indices, having a horizontal displacement dx and a vertical displacement dy, and are expressed herein as coordinate pairs dx, dy. FIG. 5 graphically illustrates movement of the p/2×p/2 image block 33 within the frame buffer 28 from a previous position, indicated by dotted block 46, to a present position, denoted by dotted block 48. The displacement between positions 46 and 48 can be specified by a two-dimensional displacement vector $dx_i$, $dy_i$.

The compute-and-select mechanism 34 compares the current image block 21', which is displaced by $dx_i$, $dy_i$, with the set of previously stored image blocks having code vectors in the modifiable set $\{dx_0, dy_0, dx_1, dy_1; \ldots dx_n, dy_n\}$ within the cache memory 36. The code vectors have cache indices 0 through n corresponding with $dx_0$, $dy_0$, $dx_1$, $dy_1$; ... $dx_n$, $dy_n$. From the comparison between the current image block 21' and the previously stored image blocks, a minimum distortion code vector $d_{min}$ ($dx_i$, $dy_i$) is generated. The foregoing is accomplished by minimizing the following equation:

$$d(dx,dy) = \sum_{i=1}^{2} \sum_{j=1}^{2} [x_{ij}(t) - x_{ij}^{dx,dy}(t-1)]^2 \quad (4)$$

where x(t) is the current image block 21' corresponding to displacement vector $dx_i$, $dy_i$, where x(t−1) is the previously encoded block, and where d(dx,dy) is the distortion code vector.

Next, the minimum distortion code vector $d_{min}$($dx_i$, $dy_i$) is forwarded to the threshold mechanism 38, where the distortion of the minimum distortion motion vector $d_{min}$($dx_i$, $dy_i$) is compared with the threshold. If the distortion of the minimum distortion motion vector is less than the threshold, then the flag bit 52' is set at a logic high and the cache index 53', as seen in FIG. 6, associated with the minimum distortion motion vector $d_{min}$($dx_i$, $dy_i$) is output from the compute-and-select mechanism 34. Hence, the image block 21' is encoded by the flag bit 52' and the cache index 53'. Alternatively, if the distortion of the minimum distortion motion vector $d_{min}$($dx_i$, $dy_i$) is greater than or equal to the threshold, then the flag bit 52' is maintained at a logic low and the p/2×p/2 image block 21' is forwarded to the next stage, that is, to the p/2×p/2 block matching encoder 14 for further analysis.

Significantly, the cache update mechanism 42 updates the cache memory 36 based on cache hit and miss information, i.e., whether the flag bit 52' is set to a logic high or low. The cache update mechanism 42 may use any of a number of conventionally available cache stack replacement algorithms. In essence, when a hit occurs, the cache memory 36 is reordered, and when a miss occurs, a motion vector which is ultimately determined by the block matching encoder 14 in the next hierarchical stage is added to the cache memory 36. When the motion vector is added to the cache memory 36, one of the existing entries is deleted.

Figure 7:
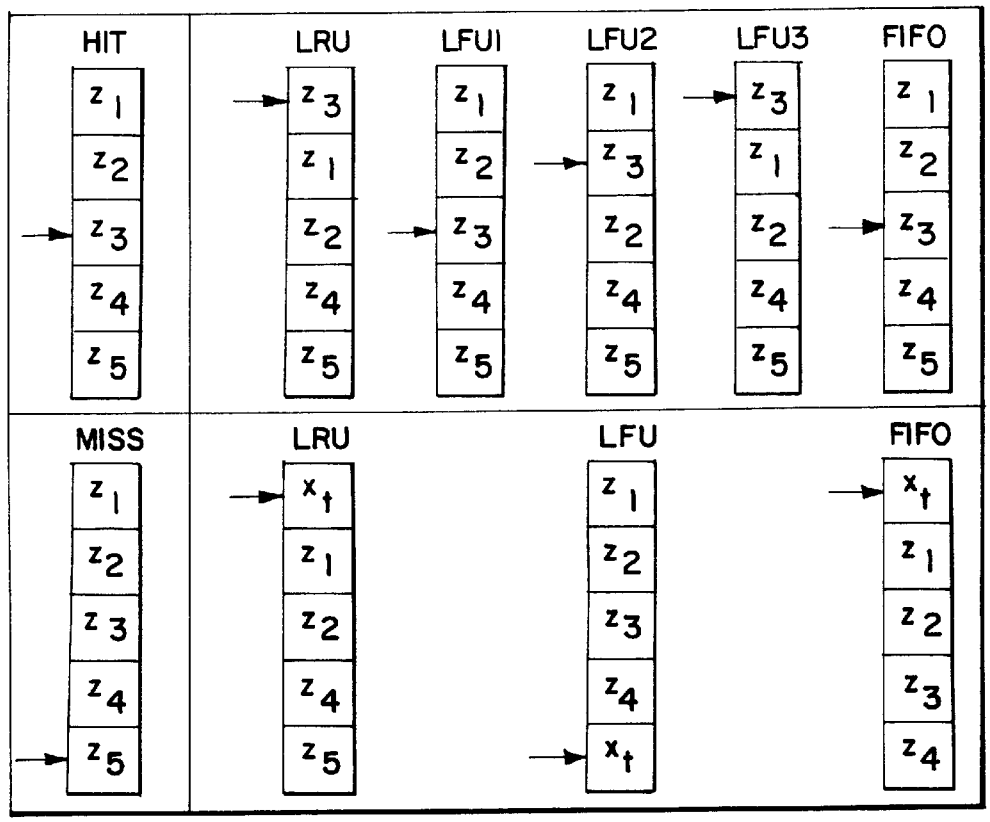
FIG. 7 is a graphical illustration showing updating processes of various cache stack replacement algorithms for the cache memory of FIG. 4.

One of the following cache stack replacement algorithms is preferably utilized: the least-recently-used (LRU) algorithm, the least frequently used (LFU) algorithm, or the first-in-first-out (FIFO) algorithm. In the LRU algorithm, the motion vector to be replaced is the one whose last reference is the oldest, or has the largest backward distance. In the LFU algorithm, the motion vector to be replaced is the one whose number of references up to that time is the smallest. Finally, the in the FIFO algorithm, the motion vector to be removed is the one which has been in the cache memory 36 the longest length of time. FIG. 7 illustrates and contrasts the foregoing cache update and replacement algorithms during both a cache hit and a cache miss. In accordance with the present invention, the stack replacement algorithm re-orders the index stack in the event of a cache hit, and in the event of a cache miss, an index is deleted and another index is inserted in its place.

Figure 8:
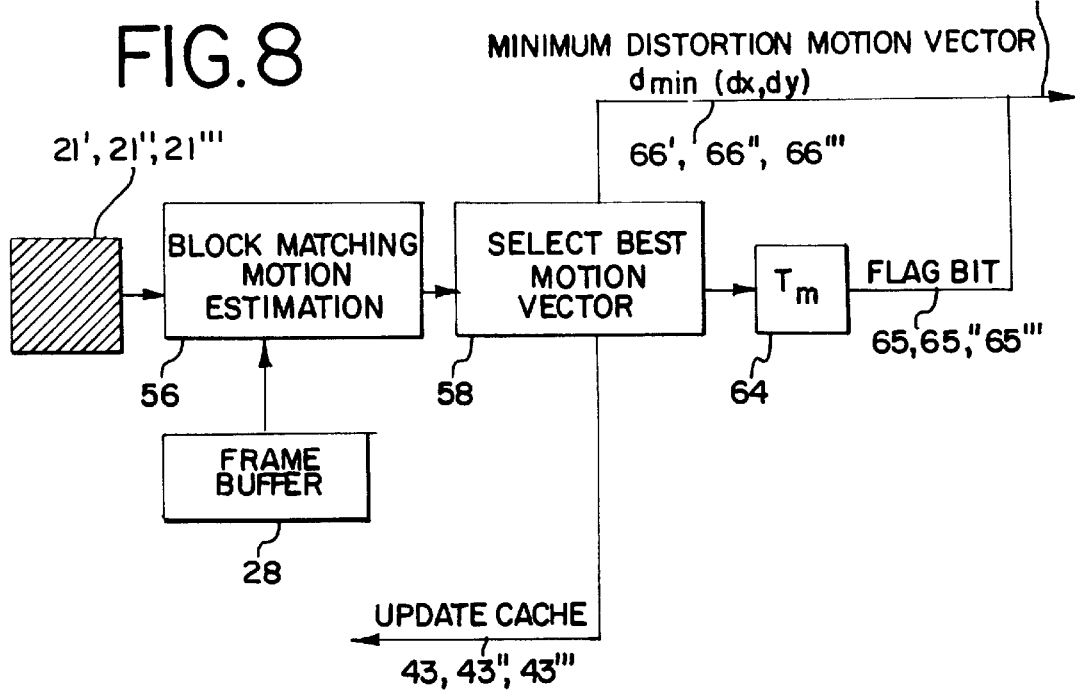
FIG. 8 is a block diagram for a block matching encoder of FIG. 1A.

As seen in FIG. 8, the block matching encoder 14, which subsequently receives the p/2×p/2 image block 21' in the event of cache miss, employs any conventional block matching encoding technique. Examples of suitable block matching encoding techniques are a full search and a more efficient log (logarithm) search, which are both well known in the art. For this purpose, the block matching encoder 14 comprises a block matching estimation mechanism 56 for comparing the incoming p/2×p/2 image block 21' with image blocks in the previously stored image frame of the frame buffer 28.

If a log search is employed, a three level approach is recommended. In other words, a predetermined set of blocks is first searched and analyzed. A best fit block is selected. Then, the neighborhood of the search is reduced, and another search of predetermined blocks ensues. In a three level search, the foregoing procedure is performed three times so that the reduction in neighborhood occurs three times.

Block comparison is performed preferably as indicated in equation (4) above, and the distortion vector d(dx,dy) that results in minimum distortion is selected. A select mechanism 58 selects the motion vector with minimum distortion, or $d_{min}$(dx,dy), from the distortion vectors generated by equation (4) and forwards the minimum distortion vector $d_{min}$(dx,dy) to the cache memory 36 (FIG. 5) of the motion encoder 13 (previous stage) for updating the cache memory 36.

The minimum distortion vector $d_{min}$(dx,dy) is then compared with a predetermined threshold $T_M$ in a $T_M$ threshold mechanism 64. If the minimum distortion vector $d_{min}$(dx,dy) is greater than the predetermined threshold $T_M$, then the flag bit 65' is maintained at a logic low, and the system 10 proceeds to the next hierarchical stage, that is, the p/4×p/4 (8× 8 pixels in this example) motion encoder 15 for further analysis. If, however, the minimum distortion vector $d_{min}$(dx,dy) is less than or equal to the predetermined threshold $T_M$, then the flag bit 65' is set at a logic high and is output along with the minimum distortion vector $d_{min}$(dx,dy), as indicated by reference arrow 66'. Thus, in this case, the p/2×p/2 image block 21' is encoded by a flag bit 65' and the minimum distortion vector $d_{min}$(dx,dy) 66' and the system 10 proceeds back to the background detector 12, where another p/2×p/2 image block 21' is retrieved, if available, and processed.

The image analyses which took place in the p/2×p/2 motion encoder 13 and then the p/2×p/2 motion encoder 13 and then the p/2×p/2 block matching encoder 14, is again repeated respectively in the p/4×p/4 motion encoder 15 and then the p/4×p/4 block matching encoder 16, except on a smaller image block size of p/4×p/4 pixels. The p/4×p/4 motion encoder 15 decomposes the p/2×p/2 image block 21' into preferably four p/4×p/4 image blocks 21" through selective scanning via the conventional quadtree technique, as illustrated and previously described relative to FIG. 3. To this end, the p/4×p/4 motion encoder 15 could encode the p/4×p/4 image block 21", as indicated by reference arrow 54", with a flag bit 52" set to a logic high and a cache index 53". Or, in the next stage, the p/4×p/4 block matching encoder 16 could encode the p/4×p/4 image block 21", as indicated by reference arrow 67", with a flag bit 65" set to a logic high and a minimum distortion motion vector 66".

The image analyses which took place in the p/4×p/4 motion encoder 15 and then the p/4×p/4 block matching encoder 16, is again repeated respectively in the p/8×p/8 (4×4 pixels in this example) motion encoder 17 and then the p/8×p/8 block matching encoder 18, except on a smaller image block size of p/8×p/8 pixels. The p/8×p/8 motion encoder 17 decomposes the p/4×p/4 image block 21" into preferably four p/8×p/8 image blocks 21''' through selective scanning via the conventional quadtree technique, as illustrated and previously described relative to FIG. 3. To this end, the p/8×p/8 motion encoder 17 could encode the p/8×p/8 image block 21''', as indicated by a reference arrow 54''', with a flag bit 52''' set to a logic high and a cache index 53'''. Or, in the next stage, the p/8×p/8 block matching encoder 18 could encode the p/8×p/8 image bock 21''', as indicated by reference arrow 67''' with a flag bit 65''' set to a logic high and a minimum distortion motion vector 66'''.

Figure 9:
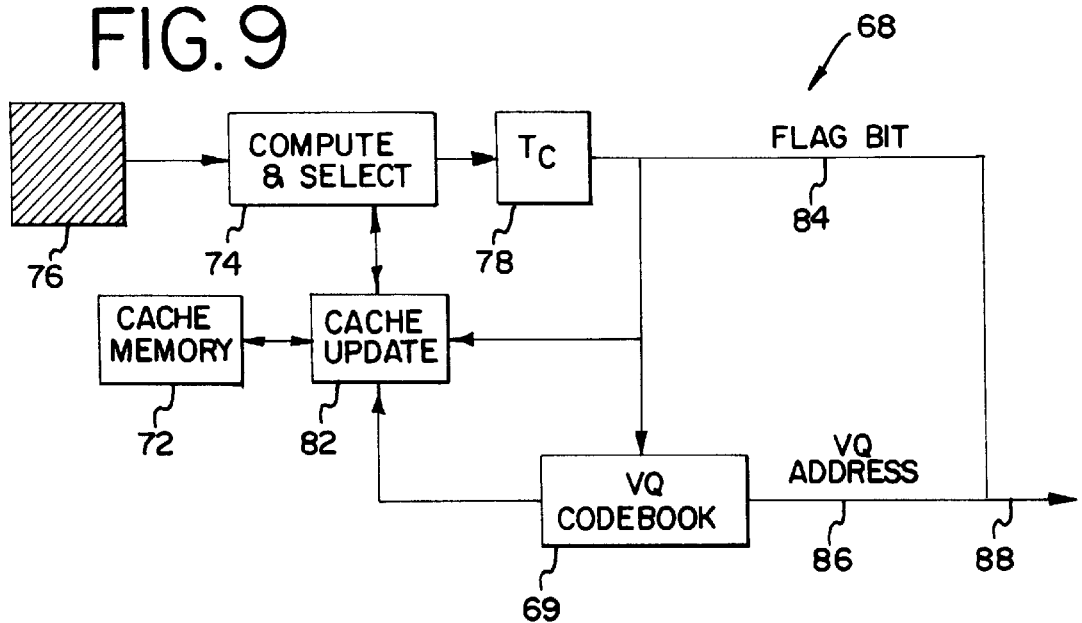
FIG. 9 is a block diagram of a cache vector quantizer for encoding a new frame of a video sequence in the frame buffer of the hierarchical source encoding system of FIG. 1A.

If the p/8×p/8 image block 21''' has not yet been encoded, then it is passed onto a block encoder 19 shown in FIG. 9. The block encoder may be a vector quantizer, a transform encoder, a subband encoder, or any other suitable block encoder. Transform encoding and subband encoding are described in the background section hereinbefore. Examples of vector quantizers which are suitable for the present invention are described in A. Gersho, "Asymptotically optimal block quantization," *IEEE Trans. Information Theory*, vol. 25, pp. 373–380, July, 1979; Y. Linde, A. Buzo, and R. Gray, "An algorithm for vector quantization design," *IEEE Trans. Commun.*, vol. 28, pp. 84–95, January, 1980; R. M. Gray, J. C. Kieffer, and Y. Linde, "Locally optimal quantizer design," *Information and Control*, vol. 45, pp. 178–198, 1980. All of the foregoing disclosures are incorporated herein by reference as if set forth in full hereinbelow. It should be further noted that entropy encoding may be employed in a vector quantizer 19 to further enhance data compression.

In regard to the well known entropy encoding, also known as variable length encoding, indices within the cache 36 may be entropy encoded in order to further enhance data compression. In entropy encoding, the statistics of an occurrence of each cache index are considered, and the number of bits for encoding each index may vary depending upon the probability of an occurrence of each index.

Figure 1B:
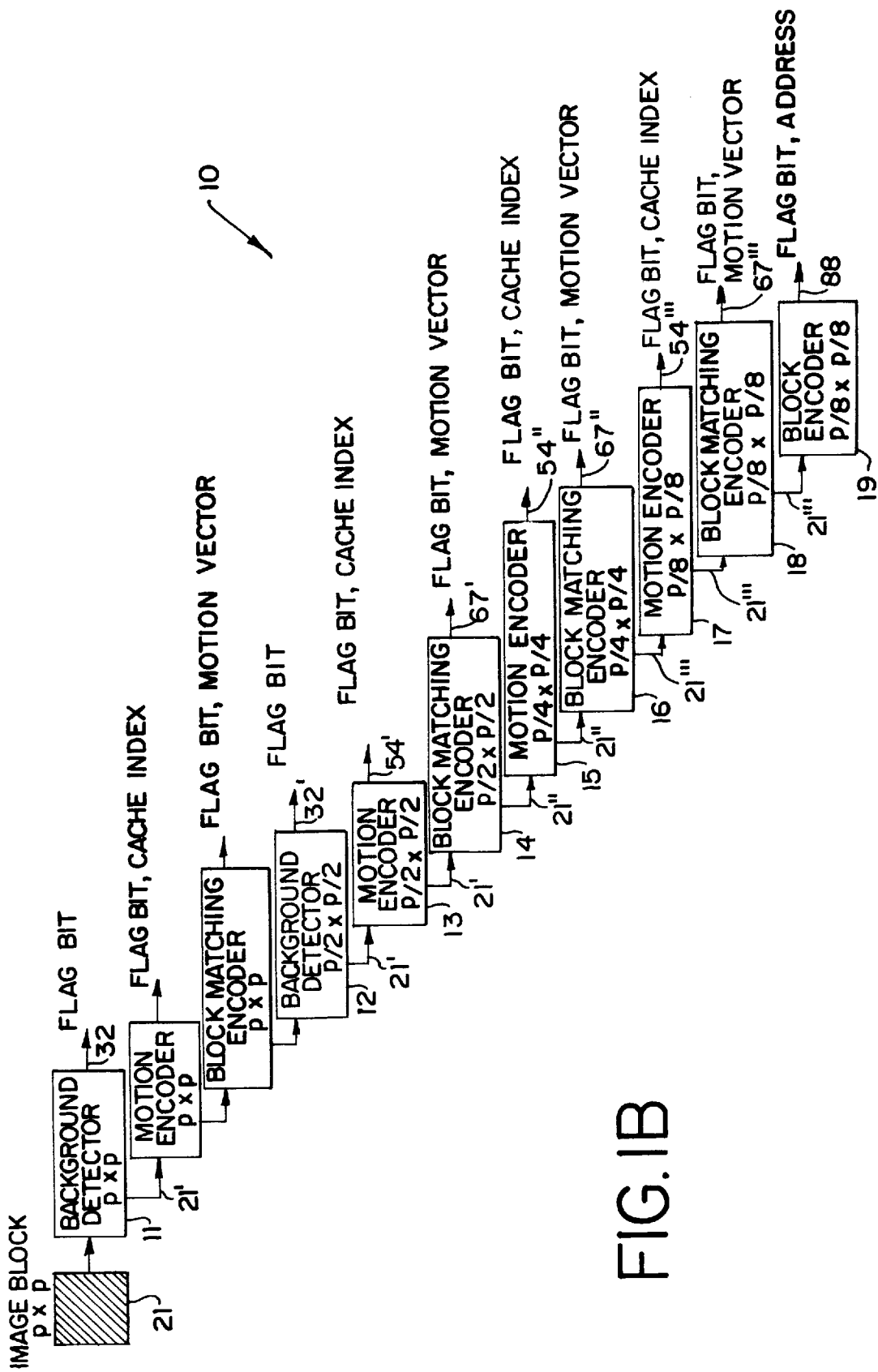
FIG. 1B is a block diagram of a hierarchical source encoding system in accordance with a preferred embodiment of the present invention.

Referring to FIG. 1B, in a preferred embodiment, prior to processing by the background detector 12, the p×p image block is analyzed for motion by a motion encoder as described above for a p/2×p/2 image block. Similarly, as described above, the p×p image block may be forwarded to a block matching encoder for further analysis.

Cache Vector Quantizer

During initialization of the hierarchical source encoding system 10, a new image frame must be created in the frame buffer 28 of the present invention. This situation can occur, for example, when the hierarchical source encoding system 10 is first activated or when there is a scene change in the video sequence.

For this purpose, a novel vector quantizer 68 shown in FIG. 9 has been developed using the novel cache memory principles. The cache vector quantizer 68 comprises a large main VQ codebook 69 which is designed off-line and a small codebook kept in a cache memory 72 whose entries are selected on-line based on the local statistics of the image being encoded. Similar to the cache memory 36 of the motion encoders 13, 15, 17, the cache memory 72 is replenished with preferably the stack algorithms LRU, LFU, FIFO, or a novel adaptive working set model algorithm, which will be discussed in further detail later in this document.

In architecture, the cache vector quantizer 68 includes the large VQ codebook 69, the cache memory 72, a compute-and-select mechanism 74 for receiving the incoming p×p image block 76 and for comparing the image block 76 to code vectors in the cache memory 72, a $T_c$ threshold mechanism 78 for determining whether the minimum distortion vector is below a predetermined threshold $T_c$, and a cache update mechanism 82 which utilizes a cache stack replacement algorithm for updating the cache memory 72. More specifically, the compute-and-select mechanism 74 performs the following equations:

$$d_k(x,z) = \sum_{i=1}^{P} \sum_{j=1}^{P} (x_{ij} - z_{ij}^k)^2 \qquad (5)$$

$$d_{k_c}(x,z) = \min\{d_k(x,z)\} \qquad (6)$$

where x is the input block 76, $z^1, Z^2, Z^3, \ldots Z^L$ are the code vectors in the cache memory 72, where $k_c$ is the selected cache index, and where 1<k<L.

The $T_c$ threshold mechanism 78 determines whether the minimum distortion motion vector $d_{k_c}$ is below the threshold $T_c$. If so, then a flag bit 84 is set at a logic high indicating a cache hit, and the flag bit 84 is output along with the VQ address 86, as indicated by a reference arrow 88. Alternatively, if the minimum distortion $d_{k_c}$ is greater than or equal to the threshold $T_c$, indicating a cache miss, then the main VQ code codebook 69 is consulted.

Preferably, the main VQ codebook 69 is set up similar to the small codebook within the cache memory 72, and compares entries to determine a minimum distortion as with the small codebook. It should be noted, however, that other well known VQ methods can be implemented in the main VQ codebook 69. As examples, the following architectures could be implemented: (1) mean removed VQ, (2) residual VQ, and (3) gain/shape VQ.

The cache update mechanism 82 implements a stack replacement algorithm for the cache memory 72. In addition to the LRU, LFU, and FIFO stack replacement algorithms discussed in detail previously, the cache update mechanism 82 can perform a novel adaptive working set model algorithm described hereafter.

It should be further noted that entropy, encoding, transform encoding, for example, discrete cosine transform (DCT) encoding, and subband encoding may be employed in the cache vector quantizer 68 to further enhance data compression.

Adaptive Working Set Model Technique

The cache size n discussed thus far relative to cache memory 36, 72 has been fixed throughout the process of encoding a particular image block. For most natural images, the rate of cache misses in the regions of low detail is much smaller than in high detail regions. Thus, more bit rate reduction could be achieved if the cache size n were allowed to vary according to the activity of the image blocks. In the adaptive working set model technique, an adaptive cache with a flexible cache size is efficiently implemented and results in a lower bit rate than is achievable using other conventional cache stack replacement algorithms, for example, LRU, LFU, and FIFO as discussed previously.

Figure 10:
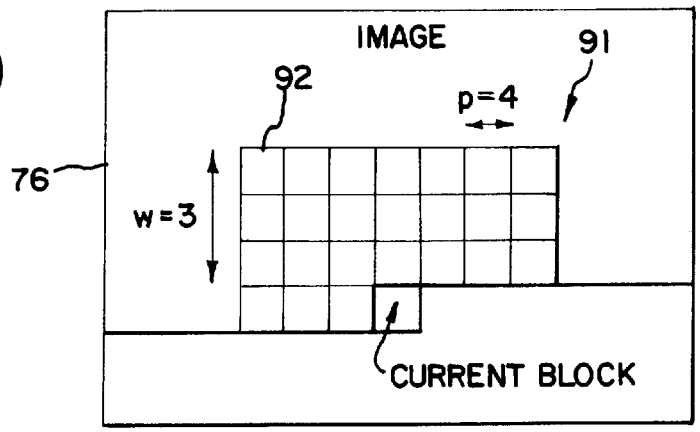
FIG. 10 is a graphical illustration showing a working set model for the cache memory of FIG. 9.

To understand the adaptive working set model technique, a brief discussion of the conventional working set model technique is warranted. In the conventional working set model technique, no particular cache stack replacement technique is utilized, and the cache memory is simply a list of the unique code vectors that occur during the near past [t−T+1,t], where parameter T is known as the window size. The parameter T can be a function of time. The ultimate cache size corresponds to the number of unique code vectors within the time interval. For an image source, a two-dimensional causal search window 91 can be defined, as illustrated in FIG. 10, which conceptually corresponds to the time interval of the working set model. In other words, as shown in FIG. 10, the memory space in the cache memory 72 (FIG. 9) is defined as all the blocks within the causal search window 91. As an example, the causal search window 91 is shown have a size W equal to three rows of blocks 92, each with a block size p×p of 4×4. The resulting code vector for encoding each image block x(t) is the previous block in the causal search window 91 that yields the minimum distortion, such as the minimum mean squared error ("MSE") distortion. For a given causal search window 91 having size W, the total number M of possible code vectors is given by the following equation:

$$M=(2W+1)W+W \qquad (7)$$

One of the major advantages of the working set model for computer memory design over other replacement algorithms is the ability to adapt the size of the causal search window 91 based on the average cache miss frequency, which is defined as the rate of misses over a short time interval. Different window sizes are used to execute different programs, and the working set model is able to allocate memory usage effectively in a multiprogramming environment.

The adaptive working set model of the present invention uses the foregoing ideas to implement variable-rate image encoding. Different regions of an image require different window sizes. For example, an edge region may require a much larger search window 91 than that of shaded regions. Accordingly, a cache-miss distance is defined based on the spatial coordinates of each previously-encoded miss-block in the causal window 91 relative to the present block being encoded.

Figure 11:
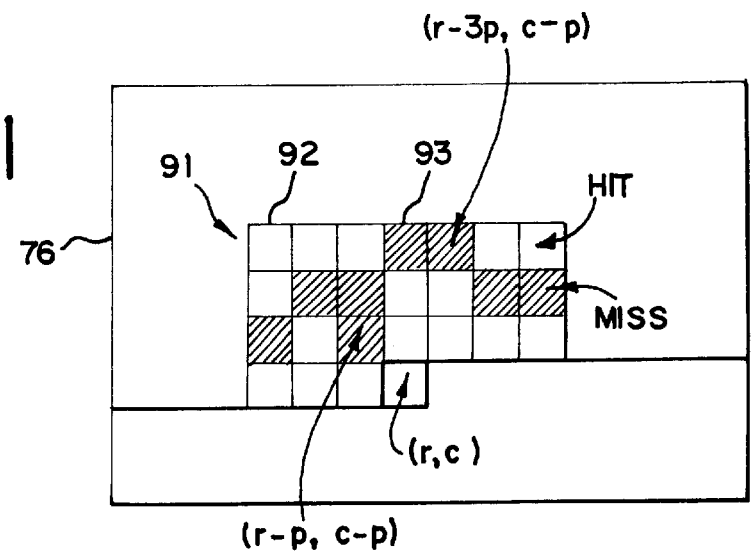
FIG. 11 is a graphical illustration showing a novel adaptive working set model for the cache memory of FIG. 9.

More specifically, let $N(W_f,r,c)$ be the set of indices of the miss-blocks where $W_f$ is the window size used to estimate the cache-miss distance. The spatial coordinates of the set $N((W_f,r,c)$ are illustrated in FIG. 11 as the shaded blocks 93. The average cache-miss frequency is defined as the summation of the reciprocal of each cache-miss distance within the search window:

$$fm = \sum_{(i,j)\in N(W_f,r,c)} \frac{1}{|i-r|+|j-c|} \qquad (8)$$

where r is the row index and c is the column index. This value provides a good enough estimate of the image locality at any given region without requiring a large amount of computation.

The window size W at a given time t is updated according to the following equation:

$$W(t) = \begin{cases} A2^{fmB} & \text{if } W(t) < W_{max} \\ W_{max} & \text{otherwise} \end{cases} \qquad (9)$$

where A and B are two pre-defined constants, and $W_{max}$ is the pre-defined maximum allowed window size.

Hence, in the adaptive working set model technique, the size of the causal search window 91 is manipulated depending upon the miss frequency. As misses increase or decrease, the window 91 respectively increases or decreases.

In accordance with another aspect of the present invention, redundant blocks within the causal search window 91 are preferably minimized or eliminated. More specifically, if a present block matches one or more previous blocks in the causal search window 91, then only a code vector representative of the offset to the most recent block is encoded for designating the present block. This aspect further enhances data compression.

Localized Scanning of Cache Indices

The method used to index the image blocks in a single image frame can also affect the average cache bit rate because the cache memory 72 updates its contents based entirely on the source vectors that have been encoded in the near past. The indexing of image blocks may be based on a raster scan, as illustrated in FIG. 12. FIG. 12 shows an example of a raster scan for scanning 256 image blocks. The major problem with this method is that each time a new row begins, the inter-block locality changes rapidly. Moreover, if the cache size is very small relative to the number of vectors in a row, many cache misses will occur whenever the cache starts to encode the source vectors in a new row.

In the preferred embodiment, the image blocks are indexed for higher performance by providing more inter-block locality. In this regard, a localized scanning technique, for example, the conventional Hilbert scanning technique, is utilized for indexing the image blocks of the image frame. FIG. 13 illustrates the Hilbert scanning technique as applied to the indexing of the image blocks of the image frame of the present invention for scanning 256 image blocks.

It will be obvious to those skilled in the art that many variations and modifications may be made to the above-described embodiments, which were chosen for the purpose of illustrating the present invention, without substantially departing from the spirit and scope of the present invention. For example, the hierarchical source encoding system 10 was specifically described relative to decomposition of square image blocks of particular sizes. Obviously, to one of skill in the art, any block configuration and size may be utilized to practice the present invention.

The number of encoders used during the encoding process may be adaptively changed to improve coding efficiency. The adaptation is based upon the statistical nature of the image sequence or the scene-change mean squared error ("MSE"). Coding efficiency is improved by assuring that every level of the hierarchy has a coding gain of greater than unity. Since there are overhead bits to address the hierarchical structure (the more levels the more bits required), it is possible to have a level that has coding gain less than unity. For example, in many experiments it was seen that during rapid moving scenes, the 4×4 motion coder has a coding gain less than unity and is thus replaced by spatial coders.

A scalar cache may be used to encode the mean of the blocks in the different levels of the hierarchy. After the video encoder/decoder, sometimes referred to as a "codec," has performed video compression through the reduction of temporal redundancy, further gains in compression can be made by reducing the spatial redundancy. Two such methods include: a.) A "working set model" which looks for similar areas (matching blocks) of video elsewhere in the same frame. The working set model looks in a small portion of the frame near the current area being encoded for a match since areas spatially close to one another tend to be similar. This relatively small search window can then be easily coded to provide a high compression ratio. The window size can also be varied according to the image statistics to provide additional compression. The technique of varying the window size according to the image statistics is referred to as an "adaptive working set model"; and b.) A scalar cache containing the mean of previously code areas can be used to encode the current area's mean value. Again, this takes advantage of areas spatially close to one another tending to be similar. If an area can be encoded with low enough distortion (below a threshold) by using it's mean value, then a scalar cache could save encoding bits.

Before an image undergoes encoding, an overall scene change MSE is performed. This is to determine how much motion may be present in an image. In a preferred embodiment, the coder reaches a level of 4×4 blocks, then if the MSE is below a threshold, the image is encoded with a structure that finds the 4×4 motion vectors from a search of the motion cache or through a three step motion search. On the other hand, if the MSE is above a threshold, the 4×4 motion vectors are found through one of the following:

1) Working set model: the motion vector is predicted from the currently-coded image rather than from the previously-coded image;
2) Each 4×4 block is coded by its mean only; or
3) Each 4×4 block is coded by its mean and a mean-removed VQ.

Thus the structure is adapted depending upon image content.

Pseudo code relating to the encoding and decoding processes is found at Appendix 2, Appendix 3 and Appendix 5. Appendix 2 contains high level pseudo code that describes the encoding and decoding algorithm. Appendix 3 contains pseudo code related to the encoding process and buffer management shown in Appendix 5. Appendix 5 contains pseudo code of the encoding and decoding algorithm in a C programming language style.

As described in U.S. Pat. No. 5,444,489, the HVQC algorithm had the cache-miss flag located in one particular position in the cache. The presently preferred embodiment, however, allows the cache-miss flag position to vary within the cache so that it may be more efficiently encoded through techniques such as entropy encoding.

U.S. Pat. No. 5,444,489 describes a hierarchical vector quantization compression ("HVQC") algorithm. In accordance with the present invention, the HVQC algorithm may be applied to an image signal using a parallel processing technique to take advantage of higher bit rate transmission channels.

One of the basic strengths of the HVQC algorithm is its adaptability to higher bit rate transmission channels. Users of these channels typically require higher performance in terms of image size, frame rate, and image quality. The HVQC algorithm may be adapted to these channels because the computational power required to implement the algorithm may be spread out among multiple processing devices.

Figure 14A:
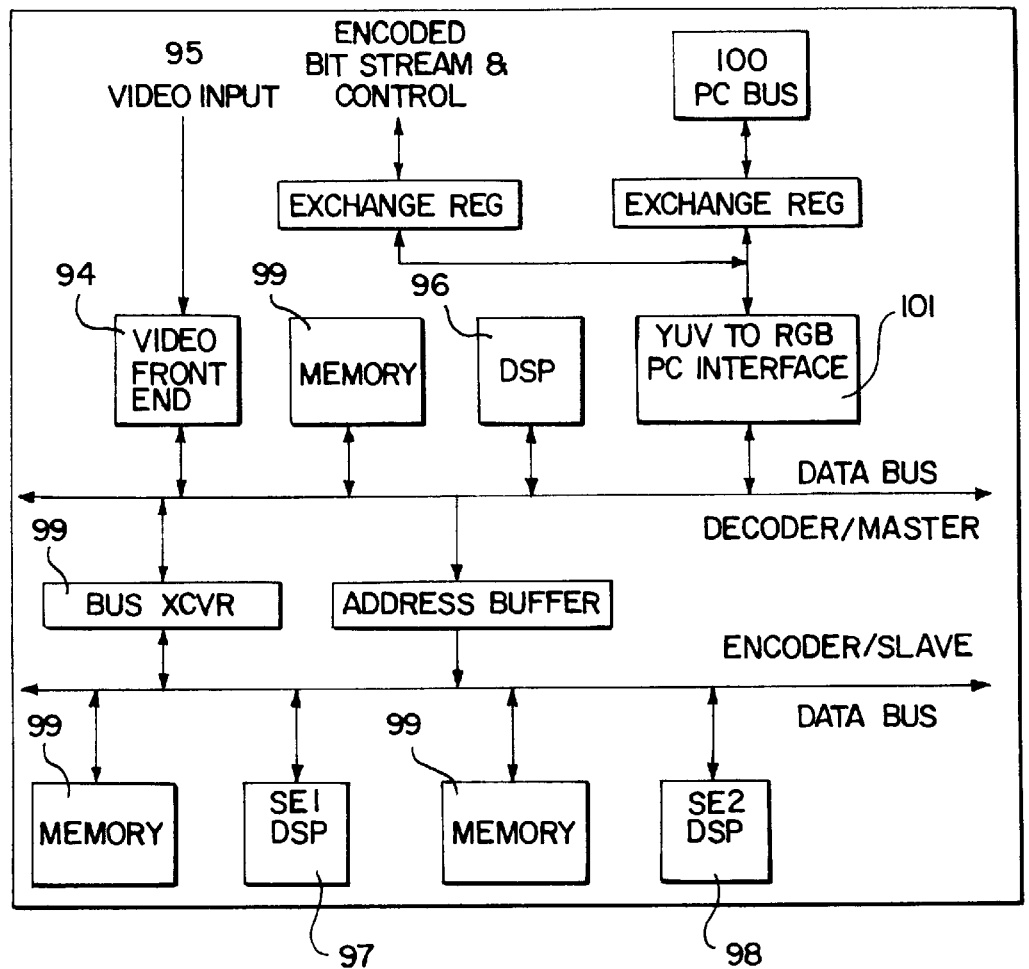
FIG. 14A is a schematic diagram of a preferred parallel processing architecture.

A preferred parallel processing architecture is shown schematically in FIG. 14A. A video front end 94, receives a video input signal 95. The video front end 94 may, for example, be a device that converts an analog signal, such as a video signal in NTSC, PAL, or S-VHS format, into a digital signal, such as a digital YUV signal. Alternatively, the video front end 94 may receive from a video source a digital signal, which the video front end may transform into another digital format. The video front end 94 may be implemented using a Philips SAA7110A and a Texas Instruments TPC 1020A.

The video front end 94 provides digitized video data to a first processor 96, where the digitized video data is preprocessed (i.e. pre-filtered). After or during pre-filtering the digitized video data, the first processor 96 transmits the data corresponding to an image frame to a second processor 97 and a third processor 98. The first processor 96 communicates with the second processor 97 and the third processor 98 through a direct memory access ("DMA") interface 99, shown in FIG. 14A as a memory and a bus transceiver.

The first processor 96 uses most of its available MIPs to perform, for example, pre and post filtering, data acquisition and host communication. The first processor 96 uses less than 30% of its available MIPs for decoding functions. The first processor 96, the second processor 97 and the third processor 98 may be off-the-shelf digital signal processors.

A commercially available digital signal processor that is suitable for this application is the Texas Instruments TMS320C31 ("C31") floating point digital signal processor. A fixed point digital signal processor may alternatively be used. As a further alternative, general purpose processors may be used, but at a higher dollar cost.

For the system architecture shown in FIG. 14A, the first processor 96 operates as a "master" and the second and third processors 97 and 98 operate as "slaves." Generally, the second and third processors 97 and 98 are dedicated to the function of encoding the image data under the control of the first processor 97.

The HVQC algorithm may be implemented with multiple processing devices, such as the processor architecture shown in FIG. 14A, by spatially dividing an image into several sub-images for coding. In addition, because of the multiple processor architecture, unequal partitioning of the image among the various processing devices may be used to share the computational load of encoding an image. The partitioning is preferably accomplished by dividing the image into several spatial segments. This process is known as boundary adaptation and allows the various processing devices to share the computational load instead of each having to be able to handle a seldom seen worst case computational burden. As an alternative to dividing up the image, the system may allocate more bits for encoding the image to the processor encoding the portion of the video with more activity. Therefore, this encoder may keep trying to encode at a high quality level since it would have more bits to encode with. This technique would not, however, reduce the computational requirements as does the preferred embodiment.

The DMA interface 99 is utilized to write image data to the second and third processors 97 and 98, exchange previously coded image data, and receive encoded bit streams from both the second and third processors 97 and 98. Data passing among the processors 96, 97 and 98 may be coordinated with a communication system residing on the master processor 96.

For example, there is an exchange of image information between the processors 97 and 98 when their respective regions of the image to be encoded change due to boundary adaptation. In addition, when a boundary adaptation occurs, the processor 97 or 98 that acquires more image area to encode must receive the previously coded image plane (y, u, & v) macro row data for the image area it is now to encode and the MSE data for those macro rows. There are 144/16=9 macro rows per frame. This information provides the necessary data to perform accurate motion estimation.

The first processor 96 is also coupled to a host processor (not shown), such as the CPU of a personal computer, via a PC bus 100, an exchange register and a converter 101. The converter 101 preferably includes a field programmable gate array ("FPGA"), which produce, in response to decoded data provided by the first processor 96, 16 bit video data in RGB format for the personal computer to display. Alternatively, the converter 101 may include an FPGA that produces an 8 bit video data signal with an EPROM for color look-up table. A commercially available FPGA that is suitable for this application is available from Xilinx, part no. XC3090A. FPGAs from other manufacturers, such as Texas Instruments, part no. TPC1020A, may alternatively be used.

Figure 14B:
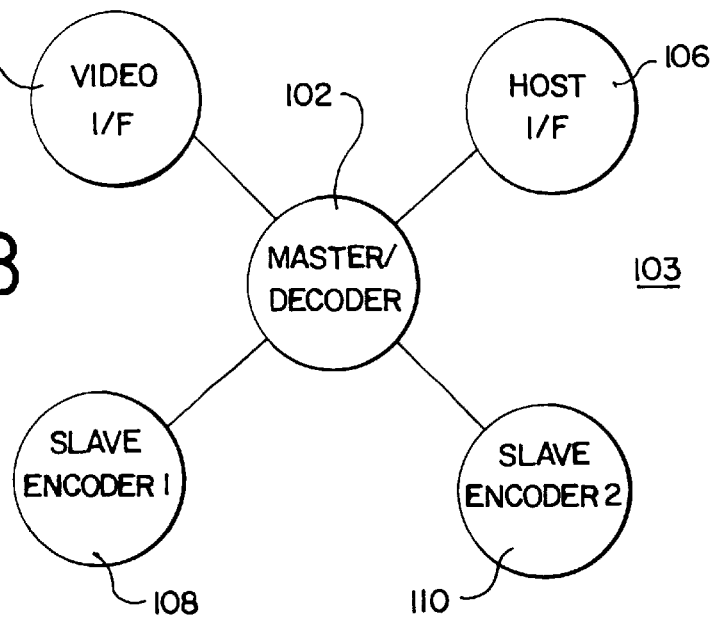
FIG. 14B is a high level diagram of the architecture of a video conferencing system.

Referring now to FIG. 14B, the operation of the parallel processing architecture, as shown in FIG. 14A, will be described for use in an environment in which the incoming signal is a NTSC signal and the output is in RGB format.

Video Conference System Overview

Architectural Overview

The architecture of a video encoder/decoder 103 preferably includes three digital signal processors, two for video encoding and one for video decoding, data acquisition, and control. A high level view of this parallel processing architecture is shown in FIG. 14B. Within this architecture, a master/decoder processor 102 acquires digitized video data from a video interface 104, performs the pre- and post-processing of the video data, provides a host interface 106 (for bit-stream, control, and image information), decodes the incoming video bit-stream, and controls two slave encoder processors 108 and 110. The interaction between the master processor 102 and the slave encoders, 108 and 110, is through a direct memory access interface, such as the DMA interface 99 shown in FIG. 14A. The master/decoder processor 102 corresponds to the first processor 96 shown in FIG. 14A. The two slave encoder processors 108 and 110 correspond to the second and third processors 97 and 98 shown in FIG. 14A.

To communicate with the slave encoder processors, 108 and 110 the master processor 102 puts the slave encoder processors 108 and 110 into hold and then reads/writes directly into their memory spaces. This interface is used for writing new video data directly to the slave encoder processors 108 and 110, exchanging previously coded image ("PCI") data, and accepting encoded bit streams from both slave encoder processors 108 and 110. When outputting the decoded YUV data, the master processor 102 uses the YUV-to-RGB converter FPGA, as shown in FIG. 14A, to produce an 8-bit (with separate eprom for color look-up table), a 15 bit RGB, or 16-bit RGB video data for the PC to display.

High Level Encoder/Decoder Description

This section prioritizes and describes the timing relationships of the various tasks that make up the video encoder/decoder 103 and also describes the communication requirements for mapping the video encoder/decoder 103 onto three processors. The tasks will be grouped according to the various software systems of the video encoder/decoder 103. These software systems are:

1. Video Input
2. Encoding
3. Decoding
4. Video Output
5. Communication and Control Each system is responsible for one or more distinct tasks and may reside on a single processor or, alternatively, may be spread over multiple processors. Data passing between processors is coordinated with a communication system residing on the master processor 102. The video input, video output, encoder, and decoder systems operate cyclically since they perform their task (or tasks) repeatedly.

Video Input System

The video input system has two aspects. First, a video image is collected. The video image is then processed (filtered) to spatially smooth the image and passed to the slave encoder processors 108 and 110. To maximize efficiency, the image may be transferred to the slave encoder processors 108 and 110 as it is filtered.

To collect the image, the master processor 102 receives data via the video interface 104. The video interface or video front end 104 includes an NTSC to digital YUV converter, for example. The chrominance components (UV) of the YUV data are preferably sub-sampled by a factor of two, horizontal and vertical, relative to the luminance component (Y), which is a 4:1:1 sampling scheme. NTSC provides video data at a rate of 60 fields per second. Two fields (and odd and even field) make up a single video frame. Therefore, the frame rate for NTSC is actually 30 frames per second. Two sampling rates seem to be prevalent for digitizing the pixels on a video scan line: 13.5 Mhz and 12.27 Mhz. The former gives 720 active pixels per line while the latter gives 640 active (and square) pixels per line.

The target display (VGA) uses a 640×480 format, therefore the 12.27 Mhz sampling rate is more appropriate and provides more time to collect data. The following assumes a sampling rate of 12.27 MHz and that one must collect 176 pixels on 144 or 146 lines of the image (QCIF format). The hardware and software described herein may be adapted to other input video formats and target display formats in a straightforward manner.

With the QCIF format, inter-field jitter may be avoided by collecting 176 samples on a line, skipping every other sample and every other line (i.e., taking every line in the given field and ignoring the lines of the other field). No noticeable aliasing effects have been detected with such a system, but anti-aliasing filters could be used to reduce aliasing.

Acquiring an image will take about 9.2 milliseconds (146 lines×1/15734 sec/line) using about 57% of the processor during those 9.2 milliseconds. While the image is being acquired, the master processor 102 collects and stores 176 video samples every 63.6 microseconds (1 line×1/15734 sec/line) at a rate of 6.14 MHz. Preferably, the front end video interface 104 interrupts the master processor 102 only at the beginning of every line to be collected. The video front end 104 will buffer 8 Ys and 4 Us and 4 Vs of video data at a time. Therefore, the master processor 102 preferably dedicates itself to video collection during the collection of the 176 samples that make up a line of video data. This may be accomplished using a high priority interrupt routine. The line collection interrupt routine is non-interruptable.

The time to collect the 176 samples of video data is 28.6 microseconds (1/(6.14 Mhz)×176 pixels). The video input software system copies a portion of the collected data out of internal memory after the line has been collected. This will add about 8.8 microseconds to the collection of the odd lines of video data. The average total time to collect a line of video data is therefore 33 microseconds plus interrupt overhead. Assuming an average of 3 microseconds for interrupt overhead, the average total time to collect a line of video data is 36 microseconds. Therefore, processor utilization during the image acquisition is 57% (36 microseconds/63.6 microseconds×100). This constitutes about 8% (@ 15 frames/second) of the processor. Using this approach, the maximum interrupt latency for all other interrupts will be about 40 microseconds.

Once the image has been collected, it is preferably spatially lowpass filtered to reduce image noise. In the preferred embodiment, only the Y component is filtered. Assuming that only the Y component is filtered, the input image filtering and transfer task will consume about 10.5 msec or 15.7% of a frame time. U and V transfer will consume 340 microseconds or about 0.4% of the frame time. During the transfer of the image, the slave encoder processors 108 and 110 are in hold for a total of about 4 msec or about 6% of a frame time.

The present invention provides methods to enhance the motion estimation process by means of pre-filtering where the pre-filtering is a variable filter whose strength is set at the outset of a set of coded images to reduce the number of bits spent on motion estimation. For example, a temporal and/or spatial filter may be used before encoding an image to reduce the high frequency components from being interpreted as motion which would require more bits to encode. Typically two, one-dimensional filters are used—one in the horizontal direction and one in the vertical direction. Alternatively, other filters may be used, such as a two-dimensional filter, a median filter, or a temporal filter (a temporal filter would filter between two image planes—the one to be encoded and the previous one). As a further alternative, a combination of these filters could also be used for pre-filtering. The filter strength is set at the outset of each image macro block depending upon how much motion is present in a given macroblock.

High frequency components in the video image may arise from random camera noise and sharp image transitions such as edges. By using filters, high frequency components related to random camera noise are reduced so that they do not appear to the motion estimators as motion. Other examples of noise might include subtle amounts of motion which are not normally noticeable. That is, the goal of pre-filtering is to reduce noise artifacts and to some extent minor motion artifacts.

In addition to pre-filtering the input image signal, the master processor 102 may post-filter the encoded image signal. A temporal and/or spatial filter may be used to reduce high frequency artifacts introduced during the encoding process. Preferably, a variable strength filter based upon the hit-ratio of the predictors in the working set model is used. Thus, the filter strength is variable across the whole image. Post-filtering may be implemented using two, one-dimensional filters—one in the horizontal direction and one in the vertical direction. A median, temporal, or combination of filter types could also be used.

Encoding System

The image is in a packed format in the slave encoder processors' memory and is unpacked by the slave encoder processor once it receives the image. The encoding system is distributed over the two slave encoder processors 108, 110 with the resulting encoded bit streams being merged on the master processor 102.

The encoding system described herein allows interprocessor communication to synchronize and coordinate the encoding of two portions of the same input image. Once both the slave encoder processors 108 and 110 are ready to encode a new image, they will receive the image from the master processor 102. The slave encoder processors 108 and 110 then determine whether a scene change has occurred in the new image or whether the boundary needs to be changed. This information is then communicated between the two slave encoder processors.

If the boundary is to be changed, previously coded image (pci or PCI) data must be transferred from one slave encoder processor to the other. Boundary change is limited to one macro row per frame time where a macro row contains 16 rows of the image (16 rows of Y and 8 rows of U and V). In addition to the boundary change, extra PCI data needs to be exchanged to eliminate edge effects at the boundary line. This involves sending at least four additional rows from each slave encoder processor to the other. Assuming a one-wait state read and zero-wait state write time for interprocessor communication, the exchange of PCI data for a boundary change will take a maximum of 0.3% ((4 cycles/4 pixels)×(16 rows Y×176 pixels+8 rows U×88 pixels+8 rows V×88 pixels)×0.05 microseconds/cycle)/(66666 microseconds/frame×100%) for packed data and 1.3% of a frame time for byte-wide data. Preferably, the slave encoder processors 108, 110 use the unpacked format.

After the exchange of PCI data, the slave encoder processors encode their respective pieces of the video image. This process is accomplished locally on each slave encoder processor with the master processor 102 removing the encoded bits from the slave encoder processors 108, 110 once per macro row. A ping-pong buffer arrangement allows the slave encoder processors 108, 110 to transfer the previously encoded macro row to the master while they are encoding the next macro row. The master processor 102 receives the bits, stores them in an encoder buffer and ultimately transfers the encoded bit stream data to the PC host processor. As previously noted, the control structure of the encoder is demonstrated in the pseudo code at Appendix 2, Appendix 3 and Appendix 5.

Since the HVQC algorithm is a lossy algorithm, image degradation occurs over time. Therefore, the image encoding must be periodically stopped and a high quality reference image (a still image) must be transmitted. A distortion measure for each image to be encoded may be used to determine whether or not an image is to be encoded as a still image (when the video encoder can no longer produce acceptable results) or with respect to the previously coded image (video encoder can still produce an acceptable image).

At the beginning of each image, the slave encoder processors 108, 110 calculate a MSE for each 8×8 luminance (i.e. Y component, no chroma calculation) block. The sum of these MSEs is compared to a threshold to determine if a scene change has occurred. The background detector takes the sum of four—8×8 MSE calculations from the scene change test and uses that to determine if a macroblock is a background macroblock or not. 8×8 background detection is done by looking up the appropriate blocks MSE determined during the scene change test. Since the lowest level of the hierarchy and the still image level of the algorithm produce identical results, the use of a common VQ code and codebook for the still image encoder and the lowest hierarchical level of the encoder can save system size, complexity, and cost.

Preferably, each slave encoder processor, e.g. 108 and 110, calculates a scene change distortion measure, in the form of a MSE calculation, for the portion of the image that it is responsible for encoding. The slave encoder processor 108 then sums up all of the scene change MSEs from each of the slave encoder processors 108 and 110 to generate a total scene change MSE. In accordance with the preferred embodiment slave encoder, the slave encoder processor 110 passes its MSE calculation to the slave encoder processor 108 where it is summed with the slave encoder processor 108 MSE calculation to generate the overall scene change MSE.

In accordance with a preferred embodiment of the present invention, the three-step or the motion cache search processes are allowed to break out of the search loop (although the search process is not yet completed) because a "just good enough" match has been found. In the three-step search the distortion of the best-match is compared with the threshold in each level (there are a total of three to four levels depending on the search window size).

The search process may be terminated if at any level there is a motion vector whose resulting distortion is less than the threshold. Similarly, in the motion cache search, the resulting distortion of the motion vector in each cache entry (starting from the first entry) is compared with the threshold.

The search process may be terminated if there is any entry whose resulting distortion is less than the threshold. The computational saving is significant in the motion cache search since the first entry is a most probable motion vector candidate and the method requires one MSE computation instead of L (L is the cache size) during a cache-hit. During a cache-miss, the computation increases slightly because more compares are required to implement the search process.

The bit-rate for a given frame may be reduced because the early cached motion vectors require fewer bits to encode, but this is sometimes offset by the bit-rate required by later frames because of the poorer previously coded image quality caused by the use of less precise motion vectors. Accordingly, the computational load of the encoder processors 108, 110 is reduced by thresholding each level of the three-step motion search and by thresholding each entry of the motion cache. This method may be applied to any block size at any level of the hierarchy.

In accordance with a preferred embodiment, the threshold to encode a given image block is limited to a pre-defined range, [min_t, max_t]. Min_t and max_t are therefore further adapted on either a macro row-by-macro row basis or a frame-by-frame basis to have an even finer control over the image quality as a function of the bit-rate. The adaptation can be based on the scene-change MSE or on the image statistics of the previously coded frame.

In addition, the threshold at which a given image block is encoded may be controlled based upon the buffer fullness. In a preferred embodiment, the video encoder/decoder 103 uses piece-wise linear functions whose threshold value increase linearly with the buffer fullness. In a preferred embodiment, a distortion measure obtained by encoding an image area at a given level of the hierarchy may be compared against an adaptable threshold to enable a tradeoff between image quality, bit rate, and computational complexity. Increasing the thresholds will, in general, reduce the amount of computation, the bit rate, and the image quality. Decreasing the thresholds will, in general, increase the amount of computation, the bit rate, and the image quality. Different threshold adaptation methods include: updating after each macro row, updating after each of the largest blocks in the hierarchy (such as 16×16 blocks), or updating after every block of any size.

Adaptation strategy can be based on a buffer fullness measure, elapsed time during the encoding process, or a combination of these. The buffer fullness measure tells the encoder how many bits it is using to encode the image. The encoder tries to limit itself to a certain number of bits per frame (channel bit rate/frame rate). The buffer fullness measure is used to adapt the thresholds to hold the number of bits used to encode an image to the desired set point. There is a timer on the DSP and the system checks the timer at the beginning and end of the encoding process. As an image is encoded, the number of bits used to encode it must be regulated. This can be done by adapting the hierarchical decision thresholds.

Sometimes an image area may be encoded at a lower level of the hierarchy, but the gain in image quality is not significant enough to justify the additional bits required to encode it. In these cases, the determination as to which level of the hierarchy to encode an image can be made by comparing the distortion resulting from encoding an image area at different levels of the hierarchy to the number of bits required to encode the image area at each of those levels. The hierarchical level with the better bit rate-to-distortion measure is then the level used to encode that image area.

Further, encoding of the chrominance (U and V) components of an image may be improved by encoding them independently of the luminance component. The U and V components may also be encoded independently of one another. This may be achieved, for example, by encoding the chrominance components by using separate VQ caches and by using two-dimensional mean VQ. The system can either share motion information between the luminance and chrominance components to save bits, but possibly at lower image quality, or use separate/independent components at the expense of more bits to achieve higher image quality. The system can even do a partial sharing of motion information by using the luminance motion information as a starting point for performing a chrominance motion search. The decision of whether or not to share is made at the outset by how much bandwidth (i.e., bit rate) is available. In addition, it may be less expensive to make a system that shares motion information since less memory and computation would be required than if the chrominance components had to be independently determined.

Since spatially close image areas tend to be similar, it is preferable in a bit rate sense to encode these areas with similar mean values. To do this, the encoder may use various methods to compute the current image minimum and maximum mean quantizer values and then use these values to select a set of quantization levels for encoding the mean values of the variable sized image blocks. Basically this sets how many bits would be used to quantize a block with its mean value instead of a VQ value. If the block is of low activity (i.e., low frequency content), then it may be better in a bit rate sense to encode it with its mean value rather than using a VQ entry. Each block's mean value is then entered into the scalar cache. Pseudo code relating to this process is found at Appendix 2, Appendix 3 and Appendix 5.

Decoding System

The master processor 102 acquires the encoded bit stream data from the PC host (or from the encoders directly when in a command mode) and decodes the bit stream into frames of YUV image data. Control of the encoder processors bit rate generation is preferably achieved by sending the encoded bit streams to a processor, such as the processor 108, which feeds back rate control information to the encoder processors 108 and 110.

Generally, the HVQC algorithm allocates bits on an as needed basis while it encodes an image. This can present some image quality problems since initially, the encoder has many bits to use and therefore its thresholds may be artificially low. As coding progresses and the allocation of bits is used up, areas that require more bits to encode are unduly constrained. Therefore, the HVQC algorithm preferably examines the entire image data before the encoding of an image is begun to make an estimate of how many bits are to be used to code each area of the image. Thresholds may be determined not only by looking at how much distortion is present in the overall image as compared to the previously coded image, but also on a block by block basis and then adjusting the thresholds for those areas accordingly.

Since the decoder processor must track the encoder processors, it is important that the decoder processor track even in the presence of channel errors. This can be done by initialization of the VQ and motion caches to set them to a set of most probable values and then to re-initialize these caches periodically to prevent the decoder from becoming lost due to transmission errors.

The master processor 102 (i.e. decoder) preferably uses a packed (4 pixels per 32-bit word) format to speed the decoding process. In a preferred embodiment, this process takes about 30% of a frame time (@ 15 frames/second) per decoded image frame.

Once the decoded image is formed, the Y component is filtered and sent to the YUV to RGB converter. The filter and transfer of the Y and the transfer of the U and V components takes 15 msec or 22.5% of the frame. Pseudo code for the decoding operations is found at Appendix 2 and Appendix 5.

The most computationally intensive portions of the HVQC algorithm are its block matching computations. These computations are used to determine whether a particular block of the current image frame is similar to a similarly sized image block in the previously coded frame. The speed with which these calculations can be performed dictates the quality with which these computations can be performed. The preferred architecture can calculate multiple pixel distortion values simultaneously and in a pipelined fashioned so that entire areas of the image may be calculated in very few clock cycles. Accelerator algorithms are employed to calculate the distortion measure used in the hierarchical algorithm.

Since the amount of computation and bits spent encoding and refreshing an area of the picture is dependent upon the amount of time left to encode the image and the number of bits left to encode the image with, the overall image quality may be improved by alternating the scanning pattern so that no image blocks receive preferential treatment. The scanning pattern may correspond to scanning from the top of the image to the bottom or from the bottom to top.

During image scenes with large amounts of motion, the encoder can generate far more bits per image frame than the channel can handle for a given image frame rate. When this occurs, there can be a large amount of delay between successive image frames at the decoder due to transmission delays.

This delay is distracting. Take the example of a first person listening to and viewing an image of a second person. The first person may hear the voice of the second person but, in the image of the second person, the second person's mouth does not move until later due to the delay created by a previous sequence. One way to overcome this is to not encode more image frames until the transmission channel has had a chance to clear up, allowing reduction of latency by skipping frames to clear out the transmission channel after sending a frame requiring more bits than the average allocated allotment.

The system does two types of frame skipping. First, immediately after encoding a still image it waits for the buffer to clear before getting a new image to encode, as shown in the pseudo code below:

Still_encode(&mac_hr);/* call subroutine to perform a still image encode */
/* Then wait until the buffer equals buffersize before encoding again */waitUntilBufferFullness(BufferSize+ (capacity*2));
/* Then skip two frames because the one old frame is already packed in the slave memory and the MD has a second old frame in its memory.
Dropping two will get us a new frame */
NumFrmesToSkip=2; /*set how many frames to skip before acquiring a new one */
Second, when encoding video, a different method is used that is a little more efficient in that the processor does not have to wait for communications, but instead generates an estimation of how many frames to skip (based on how many bits were used to encode the last image) and then starts encoding the next frame after that, on the assumption that the buffer will continue emptying while the image is being collected and initially analyzed for a scene change. For instance, the following pseudo code demonstrates this process:

/*
  now test to see if the previously coded image, pci, takes up too much channel capacity to be immediately followed by another image.
  The capacity or bits per frame is calculated from the bits/sec and frames/sec. In the capacity calculation there is a divide by 2 because there are two processors, each of which gets half the bits.
*/
/*calculate how many bits it took to encode the last image based upon the bits it took to encode it plus the number of bits used to refresh it.*/rd.yuv_rate+= requestCumulativeRefreshBits(rd.yuv_rate);
/*Skip is an integer. The −1.0 is to downward bias the number of frames to be skipped. */Skip=(rd.yuv_rate/ (2*capacity))−1.0
/*calculate the number of input frames to skip before encoding a new image frame */If (Skip>NumFramesToSkip)
NumFramesToSkip=Skip;

In addition, the software tells the video front end acquisition module when to capture an image for encoding by sending it a control signal telling it how may frames to skip (NumFramesToSkip).

The average allocated allotment of bits is determined by the channel bit rate divided by the target frame rate. It is calculated before each image is encoded so that it can be updated by the system.

Video Output System

The post decoder spatial filter is responsible for filtering the Y image plane and transferring the Y, U, and V image planes to the host. The filter operation preferably uses no external memory to perform the filter operations. This requires that the filter operation be done in blocks and the filtered data be directly transferred into a YUV to RGB FIFO. For this purpose, the block size is two lines. The filter uses a four line internal memory buffer to filter the data. The format of data for the YUV-to-RGB converter is shown in FIG. 15.

Task Prioritization and Timing Relationships

Task prioritization and timing are preferably handled by the master processor 102 since it controls data communication. Except where otherwise noted, task prioritization and timing will refer to the master processor 102.

The highest priority task in the system is the collection of input image data. Since there is little buffer memory associated with the video front end 104, the master processor 102 must be able to collect the video data as it becomes available. Forcing this function to have the highest priority causes the next lower priority task to have a maximum interrupt latency and degrades system performance of the lower priority task.

Slave processor communication is the next highest priority task. The slave processors 108, 110 have only one task to perform: encoding the video data. To accomplish this task, the slaves must communicate a small amount of data between themselves and the video image must be transferred to them by the master processor 102. This communication of data must take place in a timely fashion so as to not slow the slave processors 108, 110 down.

Next in the priority task list is the PC host communication. By far, the highest bandwidth data communicated between the master processor 102 and the PC host will be the RGB output data. Preferably, this data is double buffered through a FIFO. This allows the PC host the most flexibility to receive the data.

The remaining tasks (input image pre-processing and decoding) are background tasks. If one assumes that the master processor 102 is not over allocated (this must be true for the system to function) the background tasks will execute in a well-defined order. Once the input image is acquired, it will be filtered (pre-processed) and sent to the slave processors 108 and 110. The next background task will be to decode the bit stream coming from the PC host. Once this task is complete, the master processor 102 will post-process the image and transfer to the YUV-to-RGB FIFO as a foreground task.

Encoder Memory Organization

For the video encoder/decoder 103 described herein, the memory system has 128 kwords of 32-bit memory followed by 128 kwords of byte-wide memory that is zero filled between bits 9 to 23 bits and the remaining upper 8 bits float.

YUV-to-RGB Conversion

A FPGA has been designed that implements that RGB conversion using two-bit coefficients. The design requires nearly all of the logic units of a Texas Instruments TPC1020. The functions of this subsystem are to take data from an input FIFO and to convert this data to 15 or 16-bit RGB output. An interface is provided to an 8-bit EPROM to support 256 color VGA modes. Further details of this process are found below in the sections titled "YUV to RGB Conversion" and "Video Teleconferencing," and in Appendix 6.

Memory Requirements

This section summarizes the memory requirements of a preferred embodiment video algorithm. All multi-dimensional arrays are allocated as a matrix that allocates an array of pointers to point to each row of data. This requires an extra "num-rows" of data elements. For QCIF image planes this accounts for the extra 144 data words. This includes all of the large memory structures and most of the smaller structures. The process employed to derive memory requirements is found at Appendix 1.

Pre- and Post-Filtering

The pre- and post-filters are preferably row-column filters that filter the image in each dimension separately. The filter implementation may use internal memory for buffering. The internal memory is totally dynamic, i.e. it may be re-used by other routines. Less overhead will be incurred if the filter code is stored in internal memory (less than 100 words, statically allocated).

The pre-processing filter may be a five phase process. First, the data must be input from the video front end 104. Second, the row-wise filtering is performed. This filtering assumes a specific data format that contains two pixels per 32-bit word. The third phase re-formats the output of the row-wise filter. The fourth phase performs the column-wise filter and fifth phase re-formats the data into whatever format the encoder will use.

The fastest way of implementing this method is with 7-bit data. If 8-bit samples are used, the performance will be degraded slightly. FIG. 16 shows the time for each phase assuming the encoder will be operating on byte packed data. This also assumes zero overhead for calling the function and function setup. It should be much less than one cycle per pixel (0.5 will be used in this discussion). The last phase consumes time in both the master processor 102 and encoder processors 108, 110, which is where the actual data transfer from master to encoder takes place.

Total processor utilization for filtering, Y, U and V at 15 frames per second can be calculated as follows (if just Y is filtered, the total time is reduced by ⅓):

$$TotalTimeInMicroSeconds=(176\times144\times1.5)\times0.05\times cyclesPerPixel$$

$$PercentUtilization=TotalTimeInMicroSeconds/666.6666$$

Total master processor 102 utilization for 7-bit data is then 29.7%. For 8-bit data, the master processor 102 utilization is 32.5%. For both cases the encoder processor utilization is 3.5% (data transmission).

The post processing may also be accomplished using a five step process. The data must be reformatted from the packed pixel to a filter format. Step two filters the data column-wise. Step three reformats the data. Step four filters the data row-wise. Step five reformats and transmits the data to the YUV-to-RGB interface. FIG. 17 depicts the processor utilization (minus overhead) for these phases.

Total master processor 102 utilization for filtering 7-bit Y, U and V data is then 32.1%. For 8-Bit data the master processor 102 utilization is 35.7%. The output system is assumed to take data in the low byte at zero wait states.

Master processor 102 utilization may be decreased by more than 7% if the YUV-to-RGB interface could take two Ys at a time and both the U and V at a time in the format shown in FIG. 18. In addition, master processor 102 utilization may be decreased by at least 3% if the YUV interface could take the 8-bit data from either bits 8–15 or 24–31 of the data bus as specified by the address.

YUV-to-RGB Conversion

This section summarizes the YUV-to-RGB conversion of image data for Host display conversion. This section assumes the YUV components are 8-bit linearly quantized values. It should be noted that a Philips data book defines a slightly compressed range of values for the digital YUV representation.

Approximate coefficients may be implemented with only hardware adder/subtractors i.e., no multiplier, if the coefficients contain only two bits that were on (set to one). This effectively breaks the coefficient down in two one-bit coefficients with appropriate shifting. For lack of a better name, the rest of this section will call these coefficients "two-bit" coefficients. The two-bit coefficient method requires no multiplier arrays.

The actual coefficients are:

R=1.403×V+Y
G=Y−0.714×V−0.344×U
B=1.773×U+Y

Testing of the two-bit coefficients revealed no subjective difference when compared directly with the eight bit coefficients. The two-bit coefficient values are:

R=1.500×V+Y
G=Y−0.750×V−0.375×U
B=1.750×U+Y

Coefficient error ranges from 1.2% to 9%. The 9% error occurs in U coefficient of the G equation. This error is mooted by the other components of the equation. Shift operations do not involve logic. It is important to remember that the hardware must hard limit the RGB to 8-bits. Therefore, an overflow/underflow detector must be built into the hardware that implements this conversion.

Threshold Adaption

In a preferred embodiment, the video encoder system compares the mean squared error (MSE) between the current image and the last previously coded image to a threshold value. The video encoder looks at the ratio of buffer fullness to buffer size to determine how to set the g parameter for adjusting the threshold value. For a single encoder system, this is modified to be approximately:

(buffer fullness/buffer size)+(cumulative number of bits/expected number of bits)−0.4.

Both systems, single and dual encoder, perform their threshold adaptation strategy on a block-by-block basis, but do not take into account whether or not a particular block has a high MSE with respect to other blocks in the image. The following is a method for adapting thresholds in a way that will better allocate bits and computational power for single and multi-encoder systems.

As previously noted, the system does not compare the current block's MSE to the MSE of other blocks in the image, and therefore the system may spend a lot of time and bits trying to encode a given block when that time and those bits may have been better spent (proportionally) on other blocks with higher MSEs. This effect can be compensated for by using a block's MSE value to adjust its threshold level.

Since a scene change calculation is performed at the beginning of the encoding process for each frame, the MSEs for 8×8 blocks are readily available (stored in memory). In addition, the MSEs for 16×16 blocks are available from the 8×8 blocks by adding four localized 8×8 blocks together—this step is already done during the encoding process. By analyzing the MSE data before encoding, one can come up with any number of methods for partitioning the image blocks into various "bins" for allocating system resources so that the calculation time and encoding bits are efficiently distributed over the image. Each of these "bins" would specify a unique multiplicative constant to the threshold equation. This would allow more time and bits to be spent on the blocks that need it (those with a high MSE) and not waste those resources on blocks that do not.

Initially, the problem of how to classify image blocks can be addressed by having a fixed number of default MSE ranges (possibly derived from a series of test sequences) so that any given blocks' MSE value can be categorized with a lookup table. This could possibly be done at only the 16×16 block level so as to reduce the number of lookups to that required for the 99 blocks. The 16×16 block level category could then be extended down to the lower levels of the hierarchy. If calculation power permits, then the lower hierarchical levels could do their own categorization on a block-by-block basis. Ideally, this block-by-block categorization would occur at all levels of the hierarchy. Each of these categories would then be used to modify the threshold levels.

A fixed number of default MSE ranges could be extended to more ranges, or even turned into a function, such as a piece-wise linear curve. One could even base the ranges/function on the statistics of each individual image in a sequence (if one had the processing power). Any number of techniques could be employed.

The proposed enhancements should fit in with the buffer fullness constraint used by the preferred embodiment algorithm to adjust the thresholds by realizing that the ratio of bits calculated to bits expected can be re-calculated from the new distribution of expected bits for each block. That is, the bits expected calculation is no longer just a function of time, but instead is based upon both the elapsed time and the expected number of bits to encode each of the previously encoded blocks.

In addition, to adjust the number of expected bits used to encode a frame, the threshold for each block can be scaled by the following factor:

(allowed number of bits per frame)\(sum of expected bits for all the image blocks).

The above ratio could be modified by using (allowed number of bits per frame—refresh bits per frame) in the numerator to allow for some amount of refresh to be performed each frame.

The proposed video coder algorithm enhancements distribute the bits spent encoding an image to those areas that need them in a mean squared error sense. Additionally, it helps with the computational processing power spent in encoding an image by also concentrating that power in those areas that need it in a mean squared error sense. This not only better utilizes resources in a multi-encoder environment, but it also helps with the realization of a 15 frames per second, 19.2 KHz, single video encoder/decoder system.

Further details of the process for adjusting the quality of the video coder with adaptive threshold techniques are found in the following section.

The quality and the bit rate of the video algorithm are controlled by the levels of the hierarchy that are used to encode the image. While encoding all the blocks with the 4×4 VQ results in the highest quality, it also imposes the largest bit-rate penalty, requiring over 3000 bits per macro row (over 27000 bits per frame). The hierarchical structure of the video coder addresses this problem by providing a collection of video coders, ranging from a very high coding gain (1 bit per 256 pixels) down to more modest coding gains (14 bits per 16 pixels). Adjusting the quality is the same problem as selecting the levels of the hierarchy that are used to encode the image blocks.

The selection of the levels of the hierarchy that are used and the particular encoders within each level of the hierarchy are controlled by thresholds. A distortion measure is calculated and this value is compared to a threshold to see if the image block could be encoded at that level. If the distortion is less than the threshold, the image block is encoded with that encoder. The thresholds are preferably adjusted for every image block based upon a measure of the image block activity (defined as the standard deviation).

The dependence on the block activity follows a psycho-visual model that states that the visual system can tolerate a higher distortion with a high activity block than a low activity block. In other words, the eye is more sensitive to distortion in uniform areas than in non uniform areas.

The threshold value, T, that is used for any image block may be written as:

$$T=(N\times N)\gamma(\alpha\sigma+\beta)\times\mathrm{bias}[N]$$

where N is the dimension of the image block (typically 16, 8, or 4), σ is the standard deviation of the image block, α and β are weighing parameters, and γ is an overall scale parameter whose value preferably varies based on buffer fullness and the type of encoding. The bias term, bias[N], is used to compensate for the fact that at a given distortion value, a larger image block may appear to have lower quality than a smaller image block with the same distortion. The bias term, therefore, attempts to exploit this phenomena by biasing the smaller image block size with a larger threshold, i.e. larger bias[N]. In a preferred embodiment, the bias terms are: 1, 1.2, and 1.4 for 16×16, 8×8, and 4×4 image blocks, respectively.

In addition, there is a constraint that α and β must sum to 1. In a preferred embodiment, α=0.2 and β=0.8. A large value of α biases the encoder to put more emphasis on the variance of the image block so that higher variance blocks (i.e., higher activity blocks) are encoded at earlier levels of the hierarchy and at lower bit rates because there is a higher threshold associated with those blocks.

As noted above, the value of the scale parameter γ preferably varies as the HVQC algorithm is applied. A larger value of γ forces more image blocks to be encoded at the higher levels of the hierarchy because the threshold becomes much higher. On the other hand, when γ is assigned a smaller value, more image blocks may be encoded at the lower levels of the hierarchy.

There is a different value of γ for each of the individual encoders. In a preferred embodiment of the present invention, γ is an array of eight elements, three of which may be used. These elements are shown in FIG. 19 in which γ ranges from a low of 6 to a high of 80.

Gamma[BG16], appropriately scaled by the bias term for other image block sizes, is used for all the background and motion tests. The actual value of gamma[BG16] used within the coder is determined by the buffer fullness. Smaller thresholds are used when the buffer is nearly empty and larger thresholds are used when the buffer is almost full. As shown in FIG. 20, the values for bgth16[0], bgth16[1], bgth16[2], f1, and f2 used for a preferred embodiment are listed below. These values indicate that the system is operating with a set of relatively small thresholds (between bgth16[0] and bgth16[1]) until the buffer fills to 70 percent full. Above f2, the overflow value, bgth_overflow is used. The following variables correspond to FIG. 20:

bgth16[0](MSE per pixel) 6.0
bgth16[1](MSE per pixel) 20.0
bgth16[2](MSE per pixel) 50.0
f1(percent of buffer fullness) 0.70
f2(percent of buffer fullness) 0.95
bgth16_overflow 80
sgth4[0](MSE per pixel) 3.0
sgth4[1](MSE per pixel) 15.0
sgth4[2](MSE per pixel) 15.0

With respect to external controls, the channel capacity determines the bit rate that is available to the encoder. The bit rate, i.e. number of bits per second, is used in forming the encoder buffer size that is used in the ratio of the buffer fullness to buffer size. The buffer size is computed as 3.75×bits per frame. When used with the frame rate, the number of bits per frame can be determined. The bits per frame are used to determine if there are bits available for refreshing after the image has been coded.

Frame rate specifies what frame rate is used with the channel capacity to compute the number of bits per frame. The motion tracking number is used to scale the ratio of the buffer fullness to buffer size. A small number makes the buffer appear empty and hence more bits are generated.

Further details on threshold adjustment are found in Appendix 4, which contains code in the C programming language for computing thresholds.

System Software

The video encoder/decoder system 103 may be composed of three TMS320C31 DSP processors. Specifically, in the preferred embodiment, there is a master processor 102 and two slave processors 108, 110. Under this architecture, the master processor 102 is responsible for all data input and output, overall system control, coordinating interprocessor communication, decoding images and pre- and post-processing of the images, such as filtering. The slave processors 108, 110 are solely responsible for encoding the image.

The software system (micro-code) for the video encoder/decoder 103 is formed from three parts: the system software, encoding software and decoding software. The system software provides the real-time interface to the video source date, bit stream data, image transfer to the host and overall system control and coordination. This section is intended to give an overview perspective of the video encoder/decoder system software. The major data paths and data buffering will be described. Interrupt processing on the master processors is then discussed. A major portion of the section is dedicated to describing the system source code modules from an overview perspective.

There are two basic data paths in the video encoder/decoder 103. One is the encoder data path while the other is the decoder data path. For the encoder, the data path starts at a video source on the master processor 102, it is then filtered and transferred by the master to the slaves 108, 110. The slaves 108, 110 encode the data one macro row at a time sending the encoded bits back to the master processor 102. A macro row is a horizontal strip of the image containing 16 full rows of the image. The master processor 102 buffers these bits until the host requests them. The video source can be either the video front end 104 or the host depending on the video mode set in the video encoder/decoder 103 status. By default the video mode is set to the host as the source.

The decoder data path starts with encoded data flowing into the decoder buffer from either the host when in "Normal" or the encoder buffer when in "pass through" mode. The master processor 102 then decodes the encoded data into an image or frame. The frame is then filtered by the master processor 102 and transferred to the host through the YUV to RGB converter system two lines at a time. This converter system contains a FIFO so that up to five lines of RGB data can be buffered up in the FIFO at any given time. The data is synchronously transferred two lines at a time. In theory, the image can be filtered and transferred to the host in one long burst. In practice this is not completely true. For about 9 milliseconds of a frame time, interrupts from the video input line collection system can cause the video encoder/decoder 103 to not keep up with the host if the host is fast enough.

The decoded image that is to be filtered and passed to the host becomes the reference frame for the next decoded image. This provides a double buffer mechanism for both the filter/data transfer and the decoding process. No other buffers are required to provide a double buffer scheme.

Besides the major data paths, there is a small amount of data that must flow between the slave processors 108, 110 every frame. This data path is a result of splitting the encoding process between the two slave processors 108, 110. This data path is handled by the master processor 102.

The major data buffers for the video encoder/decoder 103 are the master video input data buffer, the master decoder image buffers, the master decoder encoded bit buffer, the master encoder encoded bit buffer, the slave encoded bit buffer, and the slave packed image buffers and the slave unpacked encoder image buffers.

The master video input data buffer consists of three buffers containing the Y, U & V image planes. The Y image is formatted with two pixels per word. The size of the Y buffer is 178×144/2 or 12,672 words. There are two extra lines to make the spatial filtering easier and more efficient. The Y data format and U & V data format are shown in FIG. 21.

The U & V images are packed four pixels per word in the format received from the video front end 104. The least significant byte of the word contains the left most pixel of the four pixels. The size of each U & V buffer is 89×72/4 or 1602 words. There is an extra line because the system is collecting two extra Y lines. The names of these buffers are inputY, inputU and inputV.

There are two master decoder image buffers. One is used to send a decoded image to the host and as a reference to decode the next image, while the other is used to build the next decoded image from the reference image. Because the reference image is undisturbed by the decoding process, it can also be transferred to the host. Once a newly decoded image has been formed, it is then used as the reference image for the next decode. This approach allows for concurrent decoding with image transfer.

The master decoder encoded bit buffer is used to store encoded bit data to be decoded by the decoder. The buffer is a circular buffer. The bits are stored in packets. Each packet has an integer number of macro rows associated with it. The first word in the packet contains the number of bits in the data portion of the packet. Each macro row within the packet starts on a byte boundary. Bits in between macro rows that make up the gap must be zero. These bits are referred to herein as filler bits. The last macro row may be filled out to the next byte boundary with filler bits (value zero).

The size of this buffer is set to 48 Kbits or 1536 words in a preferred embodiment. The size of this buffer could be reduced substantially. It is preferably large so that one can use different techniques for temporal synching. The decoder buffer is maintained through a structure known as MDecoder and reference by GlobalDecoder. MDecoder is of type ChannelState and GlobalDecoder is of type ChannelState.

The master encoder encoded bit buffer is used to combine and store encoded bit data from the slaves processors 108, 110. The buffer is a circular buffer. Each slave processor 108, 110 sends encoded bits to the master processor 102 one macro row at a time. As the master processor 102 receives macro rows from the slave processors 108, 110, it places them in the master encoded bit buffer in packet format. The lower 16 bits of the first word of each packet contain the number of encoded bits in the packet followed by the encoded bits. If the first word of the packet is negative it indicates that this packet contains what is known as a picture start code. The picture start coded packet delimits individual frames of encoded bits. Any unused bits in the last words of the packet are zero.

There are two slave encoded bit buffers, which are preferably "Ping-Pong" buffers. Each slave processor 108 or 110 contains a Ping-Pong buffer that is used to build and transfer encoded bits one macro row at a time. While one macro row is being encoded into one of the Ping-Pong buffers, the other is being transmitted to the master processor 102. Ping and pong may each have a size of 8192 bits. This restricts the maximum macro row size to 8192 bits.

The slave packed image buffer is used to receive the filtered video input image from the master processor 102. The Y, U & V image planes are packed 4 pixels per word. The sizes are preferably 176×144/4 (6336) words for y and 88×7/4 (1584) words for U & V. The encoder will unpack this buffer into an unpacked encoder image buffer at the start of an encoding cycle.

There are two slave unpacked encoder image buffers. One that is the current unpacked video image to be coded and one that is an unpacked reference image. At the beginning of a coding cycle the packed image buffer is unpacked into the current video image buffer. The reference image is the last encoded image. For still image encoding the reference image is not used. As the encoder encodes the current video image, the current video image is overwritten with coded image blocks. After the current image has been fully coded, it then becomes the reference image for the next encoding cycle.

The master processor 102 is responsible for video input collection and filtering, image decoding and post filtering, bit stream transfer both from the encoder to the host and from the host to the decoder, inter-slave communication and overall system control. The master processor 102 is the only processor of the three that has interrupt routines (other than debugger interrupts). The master has interrupt routines for the video frame clock, video line collection, RGB FIFO half full, exchange register in and out and the slave/debugger.

The highest priority interrupt is the video line collection interrupt. This is the only interrupt that is never turned off except to enter and exit a lower priority interrupt. Interrupt latency for this interrupt is kept to a minimum since the video line collection system has very little memory in it.

The next highest priority interrupt is the slave interrupt. This allows the slave processors 108, 110 to communicate between the slave and the master and also between slaves with the help of the master. Timely response to slave requests allows the slaves more time to do the encoding.

The next highest priority interrupts are the exchange register interrupts. There are two interrupts for each direction (four total) of the exchange register. Two are used to process CPU interrupts while the other two are used to process DMA interrupts (transfer). The CPU interrupt grants external bus access to the DMA that is a lower priority device on the bus thereby guarantying a reasonable DMA latency as seen from the host. When the master processor 102 turns off interrupts, the DMA can still proceed if it can gain access to the external bus. Normally, the only time the CPU interrupts are off is when the master is collecting a video input line or the master is trying to protect code from interrupts. In both cases, the code that is being executed should provide sufficient external bus access holes to allow for reasonable DMA latency times.

The next highest priority interrupt is the RGB FIFO half-full interrupt. This interrupt occurs any time the FIFO falls below half full. This allows the master processor 102 to continually keep ahead of the host in transferring RGB data assuming that the master is not busy collecting video line data.

The lowest priority interrupt is the frame clock that interrupts 30 times a second. This interrupt provides for a video frame temporal reference, frame rate enforcement and simulated limited channel capacity in "pass through" and "record" modes.

The software is structured to allow up to three levels of interrupt processing. The first level can process any of the interrupts. While the video line interrupt is being processed, no other interrupt can be processed. If the slave, frame or exchange register interrupt is being processed, the video line collection can cause a second level interrupt to occur. While the RGB interrupt is being processed, the slave, frame or exchange register can cause a second level interrupt to occur, and while that second level interrupt is being processed, the video collection interrupt could cause a third level interrupt.

The host communication interface is a software system that provides a system for communicating between the video encoder/decoder 103 and the host processor. There are two hardware interfaces to support this system. The former was designed for low bandwidth general purpose communication, while the later was designed to meet the specific need of transferring high bandwidth video data to be displayed by the host. Only the 16 bit exchange register can cause a host interrupt. Interrupts are provided for both the host buffer full and the from host buffer empty conditions.

As data is received from the host, it is processed by a protocol parsing system. This system is responsible for interpreting the header of the protocol packets and taking further action based on the command found in the header. For protocol packets that contain data, the parser will queue up a DMA request to get the data. The name of the protocol parser is HOST_in( ) and can be found in the file host_if.c.

Data to be sent to the host takes one of two forms. It is either general protocol data or YUV data to be converted to RGB. In either case the data is sent to the host through a queuing system. This allows for the master processor 102 to continue processing data (decoding) while the data transfer takes place. The system is set up to allow 20 outstanding messages to be sent to the host. In most cases, there will be no more than 2 or 3 outstanding messages to be sent to the host.

Although YUV data is sent through the YUV to RGB converter system, the associated message informing the host of data availability is sent through the exchange register. This system contains a FIFO that will buffer up to 5 full lines of YUV data. When YUV data is ready to be sent to the host, the master processor places the data into the YUV to RGB FIFO, either two or six lines at a time depending on the size of the image. Each time the two or six lines are placed into the FIFO, the master processor 102 also queues up a protocol message to the host indicating that it has placed data in the FIFO. The master processor 102 will place data in the FIFO any time the FIFO is less than half full (and there is data to be sent). This allows the master processor 102 to keep ahead of the host unless the master processor 102 is collecting a line of video data or moving PCI data from one slave processor to the other (i.e., has something of a higher priority to do).

YUV frames are queued up to be sent to the host with the RGB_queue( ) function. Packets of data to be sent to the host are queued up with the HOST_queue( ) and HOST_queueBitBuffer( ) functions. The HOST_queue( ) function issued to queue up standard protocol packets. The HOST_queueBitBuffer( ) is used to queue up a bit stream data buffer that may contain several protocol packets containing bit stream information (macro rows). The HOST_vsaRespond ( ) function issued to send status information to the host. Further details of the video encoder/decoder host software interface are provided below.

The video front end interface is responsible for collecting and formatting video data from the video capture board. From the application level view, the video front end system collects one frame at a time. Each frame is collected by calling the VIDEO_start( ) function. The video start function performs several tasks. First, it looks at the video encoder/decoder status and sets the pan, pre-filter coefficients, frame rate, brightness, contrast, hue and saturation. Then it either arms the video front end 104 to collect the next frame or defers that to the frame interrupt routine depending on the state of the frame sampling system.

The frame sampling system is responsible for enforcing a given frame rate. If the application code requests a frame faster than the specified frame rate, the sampling waits an appropriate time before arming the video collection system. This system is implemented through the frame clock interrupt function FRAME_interrupt( ). The FRAME_interrupt( ) function is also responsible for coordinating the simulated limited channel capacity in "record" and "pass-through" modes. It may do this by requesting that encoded bits be moved from the encoder buffer to their destination on every frame clock. The amount of data moved is dependent on the specified channel capacity.

Once the video front end system has been armed, it will collect the next frame under interrupt control. The video lines are collected by two interrupt routines. One interrupt routine collects the even video lines and the other interrupt routine collects the odd lines. This is necessary to save time since it is necessary to decimate the U&V components in the vertical direction. The even line collection interrupt routine collects and places the Y component for that line into an internal memory buffer. The U&V components are stored directly to external memory. The odd line collection interrupt routine discards the U&V components and combines the Y components from last even line with the Y components from the current line and places these in external memory. The format of the Y image is compatible with the spatial filter routine that will be used to condition the Y image plane.

Since the video line collection interrupts could interrupt code that has the slave processors 108, 110 in hold (master processor 102 accessing slave memory), the interrupt code releases the hold on the slave processors 108, 110 before collecting the video line. Just before the interrupt routine returns, it restores the previous state of the slave hold.

The front end spatial filter is responsible for filtering and transferring the Y image plane to the slave processors 108, 110. The image is transferred in packed format (four pixel per word). The slave processors 108, 110 are put into hold only when the data transfer part of the process is taking place. Two lines of data are filtered and transferred at a time. The function InputFilterY( ) is used to filter and transfer one Y image plane.

The U&V image planes are transferred to the slave using the moveImageToSlave( ) function. This function moves the data in blocks from the master to the slave. The block is first copied into internal memory, then the slave is placed into hold and the data is copied from internal memory to the slave memory. The slave is then released and the next block is copied. This repeats until the entire image is moved. The internal memory buffer is used because this is the fastest way to move data around in the C31 processor.

The post decoder spatial filter is responsible for filtering the Y image plane and transferring the Y,U&V image planes to the host. The filter operation uses no external memory to perform the filter operations. This requires that the filter operation be done in blocks and the filtered data be directly transferred into the YUV to RGB FIFO. For this purpose, the block size is two lines.

The filter uses a four line internal memory buffer to filter the data. To get things started (i.e., put two lines into the internal memory buffer and initialize the filter system) the function OutputFilterYinit( ) is used. Each time the system wishes to place two more lines of data into the FIFO it calls the OutputFilterY( ) function. These two functions are used exclusively to filter and transfer an image to the FIFO. They do not coordinate the transfer with the host. Coordination is performed by the RGB back end interface described next.

The RGB back end is responsible for coordinating the transfer of selfview and decoded images to the host. In the case of the decoded image, the Y plane is also spatially filtered. There are three types of images that can be transferred. They are a decoded image of size 176×144, a selfview image of size 176×144 and a selfview image of size 44×36. The video encoder/decoder system is capable of transferring both a selfview and a decoded image each frame time. The smaller selfview image is a decimated version of the larger selfview image.

Whenever the application code wants to send an image to the host it calls the RGB_queue( ) function passing it the starting address of the Y,U&V image planes and what type of image is being transferred. The queuing system is then responsible for filtering if it is a decoded image and transferring the image to the host. Selfview images are not filtered. The queuing system can queue up to two images. This allows both a selfview and a decoded image to be simultaneously queued for transfer.

The images are transferred to the host in blocks. For the large images, the transfer block size is two lines. For the small image, the transfer block size is six lines. This makes the most effective use of the FIFO buffer in the YUV to RGB converter while allowing the host to extract data while the C31 is filling the FIFO.

The mechanisms used to trigger the filtering/transfer or transfer of the image block is the FIFO half full interrupt. When the FIFO goes from half full to less than half full it generates an interrupt to the C31. This interrupt is processed by the RGB_interrupt( ) function. The interrupt function filters and transfers a block of data using the OutputFilterY( ) function in the case of a decoded image. In the case of a selfview image, the interrupt function copies the image block using the OutputY( ) function for a large selfview image or the OutputYsmall( ) function for the small selfview image. The OutputFilterY( ) and OutputYsmall( ) functions also transfer the U&V image planes.

The RGB_dropCurrent( ) function is called whenever the video encoder/decoder 103 wants to stop sending the current image to the host and start processing the next image in the queue. This function is called by the host interface when the host sends the drop frame protocol packet.

The slave communication interface is used to coordinate the transfer of video images to the slaves, transfer encoded bit stream data from the slave processors 108, 110 to the master processor 102, transfer data between the slaves and transfer data from the slaves to the host. The latter provides a way to get statistical data out of the slave processors 108, 110 and is used for debugging only. When a slave needs service it interrupts the master processor 102. The interrupt is processed by the SLAVE_request( ) function. The types of slave requests that can be processed are:

The request "Request New Frame" is made right after the encoder unpacks the packed video image at the beginning of an encoding cycle. SLAVE_request( ) simply records that the slave wants a new frame and returns from the interrupt. The main processing loop is then responsible for filtering and transferring the new image to the slave. Once the main processing loop has transmitted a new image to the slave the newFrameAvailable flag in the communication area is set to TRUE.

The request "Request Scene Change Information" is used to exchange information about the complexity of the image for each slave. If the value exchanged is above some threshold, both slaves will encode the frame as a still image. The slaves transmit their local scene change information to the master as part of this request. Once both slaves have requested this information, the master exchanges the sceneValue in the respective communication areas of the slave processors 108, 110 with the other slave's scene change information.

The request "Request Refresh Bits" is similar to the scene change information request. The difference is that it is requesting a different type of information. However, this information is exchanged just like the scene change information.

There are two types of buffer fullness requests. In one case the master responds instantly with the size of the master's encoder encoded bit buffer. In the other case, the slave is wanting to wait until the master encoder buffer is below a specified size and for the other slave to request this information.

The request "Request PCI" is used to send or receive previously coded image data to or from the other slave processor. This is used when the adaptive boundary is changed. There are two forms of this request. One for sending PCI data and one for receiving PCI. After one slave sends a receive request and the other sends a send request, the master processor 102 then copies the PCI data from the sender to the receiver.

The request "Send Encoded Bits" is used to transfer a macro row of data to the master to be placed in the master's encoder encoded bit buffer. There are two forms of this request. One to send a picture start code and one to send a macro row. The picture start code is sent before any macro rows from either processor are sent.

The request "Acknowledge Slave Encoder Buffer Cleared" is used to acknowledge the master's request for the slaves to clear their buffers. This allows the master processor 102 to synchronously clear its encoder bits buffer with the slave clearing its buffer.

The request "Send Data to Host" is used to transmit a data array to the host processor. This is used to send statistical data to the host about the performance of the encoder.

The master processor 102 can send messages to the slave through the SLAVE_inform( ) function. The slave processors 108, 110 are not interrupted by the message. The slaves occasionally look (once a macro row or once a frame) to see if there are any messages. The types of messages are as follows:

The message "Image Ready" informs the slave that a packed image is ready.

The "Clear Encoder Buffer" message tells the slave to clear its Ping-Pong bit buffers and restart the encoding process with the next video frame. The slave will respond after resetting its buffers by sending back an acknowledgment (Acknowledge Slave Encoder Buffer Cleared).

The "Still Image Request" message is used to tell the slave to encode the next frame as a still image.

The "Scene Change Information" message is used to respond to the slaves request to exchange scene change information.

The "Refresh Bits" message is used to respond to the slaves request to exchange refresh bit information.

The "Buffer Fullness" message is used to respond to the slaves request to wait until the size of the master's encoder encoded bit buffer has fallen below a certain level.

The master bit buffer interface is responsible for managing the encoder encoded bit buffer and the decoder encoded bit buffer on the master processor 102. The bit buffers are managed through a structure of type ChannelState. The bits are stored in the buffer in packets. A packet contains a bit count word followed by the encoded bits packed 32 bits per word. Bits are stored most significant to least significant. The important elements of this structure used for this purpose are:

wordsinBuffer

This contains the current number of words in the buffer. This includes the entire packet including the storage for the number of bits in the packet (see description of bit data buffers above)

BufferIndex

This is the offset in the buffer where the next word will be taken out.

BufferIntPtrindex

This is the offset in the buffer where the next word will be placed. If BufferintPtrindex is equal to Bufferindex there is no data in the buffer.

BufferFullness

This measures the number of bits currently in the buffer. This does not include unused bits in the last work of a packet or the bit count word itself. It only includes the actual bits that will be decoded. It does include any fill bits if they exist.

bitPos

This points to the current bit in the current word to be decoded. This is not used for the Encoder buffer.

bitsdLeftInPacket

This is used to indicate how many bits are left to be decoded in the decoder buffer. This is not used for the encoder buffer.

pastBits

This is used for keep track of the past bits when checking for unique picture start codes. This is not used otherwise.

buffer

This is a pointer to the beginning of the bit buffer.

There are two functions that can place data into the decoder buffer. They are putDecoderBits( ) and encoderToDecoder( ). The function putDecoderBits( ) is used to put bits from the host into the decoder buffer. The encoderToDecoder( ) function is used in the "pass-through" mode to move bits from the encoder buffer to the decoder buffer.

The getBits( ) function is used to extract or look at a specified number of bits from the current bit position in the buffer. The bitsInPacket( ) function is used to find how many bits are left in a packet. If there are no bits or only fill bits left in the packet the size of the next packet is returned. The skipToNextPacket( ) function is used when the decoder detects an error in the packet and wants to move to the next packet ignoring the current packet.

The moveEncoderBits( ) function is used to simulate a limited channel capacity channel when the system is in the "record" or "pass-through" mode.

The getEncoderBits( ) function is used to move encoder bits from the master processor 102 encoder encoded bit buffer to the host. This is used in the real-time mode when there is a real limited bit channel system (like a modem) requesting bits from the video encoder/decoder system.

The encoderToHost( ) function is used to build a host protocol buffer from the encoder buffer. The host protocol buffer can contain multiple protocol packets. This function is called by the moveEncoderBits( ) and getEncoderBits( ) functions.

The main( ) function and main processing loop, masterLoop( ) is responsible for coordinating a number of activities. First it initializes the video encoder/decoder 103 sub-systems and sends the initial status message to the host. It then enters a loop that is responsible for coordinating 6 things.

1. Filtering and transferring the input video image to the slaves.
2. Video input capture.
3. Transfer of selfview image to the host.
4. Transfer of YUV image to host.
5. Decoding and transfer of the decoding image to the host.
6. Transfer of encoder encoded bits to host under certain conditions.

If an input video frame is ready and the slave has requested a new frame, the main processing loop does the following. If the video encoder/decoder 103 status indicates that a selfview image should be sent to the host and the video encoder/decoder 103 is not currently sending a selfview frame, it will queue up the new frame to be sent to the host. It will then filter and transfer the new frame to the slave processors 108, 110. This process does not alter the input image so it does not effect the selfview image. If the host has requested that the frame be sent in YUV format, the YUV image will then be transmitted to the host in YUV format. Finally, the video input system will be restarted to collect the next frame.

If the decoder state is non-zero and the processing loop was entered with a non-zero flag, the DECODE_image( ) function is called to coordinate the decoding and transfer to the host of the next video frame.

The last part of the main processing loop checks to see if encoded bits can be sent to the host if any are pending to be sent. If the host had requested encoder encoded bits and the encoder buffer was emptied in the host interrupt processing function before the request was satisfied the interrupt routine must exit leaving some number of bits pending to be transmitted.

The DECODE_image( ) function is responsible for coordinating the decoding process on a frame by frame basis and the transmission of the decoded frames to the host. A flag is used to coordinate the decoding and transferring of decoded images. The flag is called OKtoDecode. It is not OK to decode if there is a decoded frame currently being transmitted to the host and the next frame has already been decoded. This is because the decoder needs the frame being transmitted to construct the next decoded frame.

Once that old frame has been completely transmitted to the host, the recently decoded frame is queued to be transmitted and the decoding process can continue. If the decoder bit buffer starts to back up (become full) the decoder will go on without queuing up the previously decoded image. This results in the currently transmitted image being overwritten with newly decoded data. This could cause artifacts in the frame being sent to the host.

The decoding process gets or looks at bits in the decoder buffer by calling the getBits( ) and bitsInPacket( ) function. If during the decoding process, the getBits( ) or the bitsInPacket( ) function finds the decoder buffer is empty, it waits for the buffer to be non-zero. While it waits it calls the masterLoop( ) function with a zero parameter value. This allows other tasks to be performed while the decoder is waiting for bits.

The slave processors 108, 110 are responsible for encoding video frames of data. This is their only responsibility, therefore there is not much system code associated with their function. The slave processors 108, 110 do not process any interrupts (except for the debugger interrupt for debugging purposes). There is a simple communication system that is used to request service from the master. All communication from the master to the slave is done on a polled basis.

The slave and the master communication through a common communication structure located at 0x400 in the slave address space. The structure is defined in the slave.h file as a typedef SLAVE_Request. The name of this structure for the slave processor is SLAVE_com. The master processor 102 accesses the communication area at offset 0x400 in the slave memory access window. For slave 1, the communication structure would reside at location 0xa00400 in the master processor 102. For slave 2, the communication structure would reside at location 0xc00400. In order for the master to gain access to this structure, it must first place the slave(s) into hold.

Every time the slave processor needs to request service from the master processor 102 it first checks to see if the master has processed the last request. It does this by checking the hardware bit SEx_THBE (where "x" indicates slave encoder processor is to be checked) that indicates that the slave is currently requiring service from the master. If the master has not processed the last request the slave waits until it has. When there is no pending service, the slave places a request or command in the communication structure element name "cmd". It also places any other data that the master will need to process the command in the communication structure. If the communication requires synchronization with the other slave or a response before the slave can continue, the slave also sets the communicationDone flag to FALSE. Then the slave sets the hardware request flag. If the slave needs a response before going on it will poll the communicationDone flag waiting for it to go TRUE. Once the flag is TRUE, any requested data will be available in the communication structure.

Video Bit Stream

This section describes the bit stream that is in use in the video encoder/decoder system when compiled with picture start code (PSC) equal to four. This section addresses the header information that precedes each macro row and the format of the bit stream for video, still, and refresh information.

FIG. 22 shows a high level example of a video bit stream where the video sequence includes the first frame coded by the still image coder and the second frame coded by the video coder followed by the refresh data for part of the macro row.

To accommodate macro rows that may be dropped by the supervisor instead of being sent to the decoder because of channel errors, the decoder can decode each macro row in a random order and independently from other macro rows. This flexibility is achieved by adding a macro row address (macro row number) and macro header information to each encoded macro row.

To support macro row independence, each of the motion caches must be reset before encoding and decoding each macro row. This modification results in a slightly lower PSNR (0.1 dB) for a number of file-io sequences, but it was seen to have no perceptual degradation in both the file-io and the real-time simulations. The motion vectors should be reset to some small and some large values to account for the high-motion frames (the latest source code resets to only small motion vectors). The still image encoder is also macro row addressable, and therefore the still image VQ cache should be reset before encoding and decoding each macro row.

There are four compiling options that affect how header information is added to the bit stream. These options are controlled by the compiler define switch PSC which is set in the master and slave make files. The meaning of the different values of PSC are detailed in FIG. 23. Referring to FIG. 23, the default configuration of the encoder/decoder is PSC=4.

Macro rows of data may have leftover bits that are used to align the macro rows to byte boundaries. There will always be fewer than eight fill bits and their value will be zero. They will be a part of the bit stream, but the decoder knows not to interpret them.

This use of fill bits and packetizing the macro rows has ramifications for detecting bit errors because it indicates (without decoding the data) the boundaries of the macro rows. This information can be used to skip to the next macro row packet in the event the decode becomes confused.

By aligning the macro row packets of encoded data on known boundaries such as, for example, byte boundaries, the decoder can determine whether it has left over bits, or too few bits, for decoding the given macro row. Once errors are detected, error concealment strategies of conditionally replenishing the corrupted macro rows can be performed and decoding can continue with the next macro row packet of data. This allows the detection of bit errors through the use of the macro row packetized bit stream.

The format of the encoded data depends on the type of encoding (video or still) and at which level of the hierarchy the bits are generated. Regardless of the type of data, each macro row of data begins with the macro header, defined as follows.

Video, still images, and refresh data are encoded on a macro row basis and packetized according to their macro row address. The header information for each macro row includes the fields shown in FIG. 24. The amount of overhead is 8 bits per macro row. The information is found in the bit stream in the order given in FIG. 24, i.e., the data type is the first two bits, the macro row address the next four bits, etc.

Referring to FIG. 24, the data type (DT) (2 bits) specifies what type of data is encoded: 00 means video data, 01 means still image data, 10 represents VQ refresh data, and 11 represents scala refresh data. The macro row address (MRA) (4 bits) specifies which of the nine (for QCIF) macro rows the encoded data corresponds to. The value in the bit stream is the macro row address plus five. The HVQ structure bit (HS) (1 bit) specifies whether the structure of the encoder hierarchy for the macro row has been modified to support the working set model (HS=1) or is using the 4×4 motion cache (HS=0). This bit is ignored by the still image decoder and the refresh decoder. The relative temporal reference (RTR) (1 bit) signifies whether the encoded macro row is part of the current frame or the next frame. The value toggles between 0 and 1 when the frame changes. All macro rows encoded from the same input frame will have the same RTR. It is important to note that the RTR is not the least significant bit of the absolute frame reference. The RTR is an independent flag that differentiates between this frame and the next frame.

In addition to the macro row header information, macro row zero (for video and still data types, not for refresh) contains the temporal reference information and once every 15 frames, frame rate information, and possibly other information as specified by a picture extended information (PEI) bit. The format of the extended macro row zero information is shown in FIG. 25.

Every macro row zero that contains either video or still encoded data has a 6 bit temporal reference that counts the absolute frame number, modulo 60. If the value of the PEI after the temporal reference is found to be 1, the next 6 bits correspond to the frame rate divisor. The decoder uses the frame rate information and the temporal reference information to synchronize the output display of the decoded images. The frame rate divisor is sent once every 15 frames by the encoder. The actual frame rate is calculated by dividing 30 by the frame rate divisor. The value of 0 is used to tell the decoder that it should not try to time synchronize the display of decoded images.

After the frame rate information, another PEI indicates whether there is other information available in the bit stream. The decoder will continue to read and throw away these 6 bit fields and then check for another PEI. The cycle continues until the value of the PEI is found to be 0.

Video images use a quad-tree decomposition for encoding. The format of the output bit stream depends on which levels of the hierarchy are used and consequently follows a tree structure. The bit stream is perhaps best described through examples of how 16×16 blocks of the image are encoded. Considering that a QCIF image is composed of 99 16×16 blocks. FIG. 26 shows several different decompositions for 16×16 blocks and the resulting bit stream. The notation of Flag$^c$ indicates the complement of the bit stream flag as defined in FIG. 27, which depicts the flags used to describe the video bit stream. There are three valid data items that have been added to the cache during the encoding process. Miss entries are entries to indicate that suitable entry was not found in the cache. Invalid entries are entries that do not contain valid data because they represent uninitialized values.

Referring to FIG. 26, part a., the 16×16 block is encoded as a background block. In part b., the 16×16 block is coded as an entry from the motion 16 cache. In part c., the 16×16 block is encoded as a motion block along with its motion vector. In part d., the 16×16 block is decomposed into 4 8×8 blocks which are encoded as (starting with the upper left block) as a background 8×8 block, another background 8×8 block, a hit in the motion 8 cache, and as an 8×8 motion block and the associated motion vector. In part e., the 16×16 block is divided into 3 8×8 blocks and 4 4×4 blocks. The upper left 8×8 block is coded as a motion 8 cache hit, the second 8×8 block is decomposed and encoded as a VQ block, a hit in the motion 4 cache, the mean of the block and finally as a VQ block. The third 8×8 block is encoded as an 8×8 motion block and its motion vector and the final 8×8 block is encoded as a motion 8 cache hit.

With respect to color information and flag bits, the color information is coded on a block by block basis based on the luminance coding. FIG. 28 shows some sample decompositions of color (chrominance) 8×8 blocks and descriptions of their resulting bit streams.

Figures 29, 30, 31, 32:
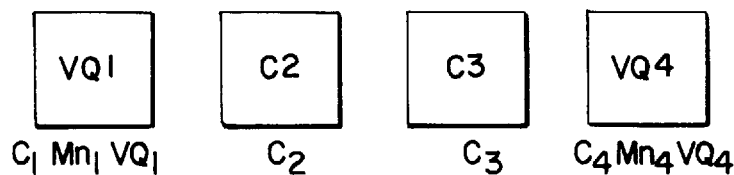
FIG. 29 depicts an example of encoding still image 4×4 blocks.
FIG. 30 shows refresh header information.
FIG. 31 is a table of the overhead associated with a bit stream structure.
FIG. 32 is a table of the fields of a picture header.

Still images are encoded in terms of 4×4 blocks. The coding is performed using a cache VQ technique where cache hits require fewer bits and cache misses require more bits to address the VQ codebook. Assuming that each 4×4 block is coded sequentially (there are a total of 1584 4×4 luminance blocks), FIG. 29 shows an example of coding 4 luminance blocks. Here, $Mn_1$ is the mean of the first block, $Mn_4$ is the mean of the fourth block, $VQ_1$ and $VQ_4$ are the VQ addresses of the first and fourth block, respectively, and $C_2$ and $C_3$ are the variable length encoded cache locations. $C_1$ and $C_4$ are invalid cache positions that are used as miss flags. The VQ addresses have one added to them before they are put into the bit stream to prevent the all-zero VQ address.

After every four 4×4 luminance blocks have been encoded, the corresponding 4×4 chrominance blocks (first U and then V) are encoded using the same encoding method as the luminance component. Different caches are used for the color and luminance VQ information.

Since the coder is lossy, the image must be periodically re-transmitted to retain a high image quality. Sometimes this is accomplished by sending a reference image called a "still." Other times the image can be re-translated piece-by-piece as time and bit rate permit. This updating of portions of the encoded image can be done through various techniques including scalar absolute refreshing, scalar differential refreshing, block absolute refreshing, and block differential refreshing.

Refresh is used to improve the perceptual quality of the encoded image. In the absence of transmission errors, the coded image is known to the transmitter along with the current input frame. The transmitter uses the latter to correct the former provided that the following two conditions are true: first, that the channel has extra bits available, and second that there is time available. Whether or not there are bits available is measured by the buffer fullness; refreshing is preferably performed only when the output buffer is less than ⅓ full. Time is available if no new input frame is waiting to be processed. The two independent processors also perform their refreshing independently and it is possible on some frames that one of the processors will perform refreshing while the other does not.

There are two levels of refreshing—block based or VQ (4×4) and pixel based refreshing. The refresh header information includes the fields shown in FIG. 30. Each of these levels is further divided into absolute and differential refresh mode with the mode set by a bit in the header.

Referring to FIG. 30, the refresh header information includes the field of the macro row header. Note that the extended macro row zero information does not apply to the refresher information, i.e., refresh macro rows do not contain extended information about the temporal reference and frame rate. The refresh address field specifies the starting 4×4 block that the refresher is encoding within the specified macro row. For QCIF images, there are 176 4×4 blocks in each macro row. The bit stream interface adds 31 to the refresh block address to prevent the generation of a picture start code. The decoder bit stream interface subtracts this offset.

The "number of 4×4 blocks" field enumerates the number of 4×4 blocks of the image that are refreshed within this macro row packet. This field removes the need for a refresh end code.

As discussed, the system uses both VQ or block and scalar refreshing. The absolute refresher operates on 8×8 blocks by encoding each of the four luminance 4×4 blocks and single U and V 4×4 blocks independently. This means that the refresh information will always include an integer multiple of four luminance 4×4 blocks and one U and one V 4×4 block.

This section describes the VQ refreshing that occurs on each 4×4 luminance block and its corresponding 2×2 chrominance blocks through the use of 2, 16, or 24 dimensional VQ codebooks.

For VQ refreshing, each 4×4 luminance block has its mean and standard deviation mean calculated. The mean is uniformly quantized to 6-bits with a range of 0 to 255 and the quantized 6-bit mean is put into the bit stream. If the standard deviation of the block is less than a threshold, a flag bit is set and the next 4×4 luminance block is encoded. If the standard deviation is greater than the threshold, the mean is removed from the block and the 255 entry VQ is searched.

The 8-bit address of the VQ plus one is placed into the bit stream (zero is not allowed as a valid VQ entry in a preferred embodiment—the decoder subtracts one before using the address).

The mean and standard deviation of the associated 4×4 U and V blocks are computed. If the maximum of the U and V standard deviations is less than a threshold then the U and V means are used to search a two-dimensional mean codebook that has 255 entries. The resulting 8-bit VQ address plus one is put into the bit stream. If the maximum of the U and V standard deviations is greater than the threshold a 16-dimensional 255-entry VQ is searched for both the U and the V components. The two resulting 8 bit VQ addresses plus one are put into the bit stream.

VQ refreshing may be absolute of differential. For absolute VQ refreshing (19 bits per 4×4 block), each 4×4 luminance block has its mean calculated and quantized according to the current minimum and maximum mean for the macro row, and the 5-bit quantized value is put into the bit stream. The mean is subtracted from the 4×4 block and the result is used as the input to the VQ search (codebook has 255 entries). The resulting 8-bit VQ address is placed into the bit stream. The means of the 2×2 chrominance blocks are used as a 2-dimensional input to a 63 entry VQ. The resulting 6-bit address is placed into the bit stream. The result is 19 bits per 4×4 block.

For differential VQ refreshing (8 bits per 4×4 block), each 4×4 luminance block and the associated 2×2 chrominance blocks are subtracted from their respective values in the previously coded frame. The difference is encoded as an 8-bit VQ address from a 24-dimensional codebook that has 255 entries. The result is 8 bits per 4×4 block.

Scalar refreshing is a mode that is reserved for when the image has had VQ refreshing performed on a large number of consecutive frames (for example, about 20 frames). This mode has been designed for when the camera is pointing away from any motion. The result is that the coded image quality can be raised to near original quality levels.

As with block refreshing, scalar refreshing may be either absolute or differential. For absolute scalar refreshing (168 bits per 4×4 block), the 4×4 luminance and 2×2 chrominance blocks are encoded pixel by pixel. These 24 pixels are linearly encoded with 7-bit accuracy resulting in 168 bits per 4×4 block.

For differential scalar refreshing (120 bits per 4×4 block), the 4×4 luminance and 2×2 chrominance blocks are encoded pixel by pixel. First the difference between the current block and the previously code block is formed and then the result is coded with 5 bits for each pixel (1 for the sign and 4 for the magnitude). The resulting 4×4 block is encoded with 120 bits.

The system selects one of the available methods of refreshing. The mode selected is based upon how many bits are available and how many times an image has been refreshed in a given mode. In terms of best image quality, one would always use absolute scalar refreshing, but this uses the most bits. The second choice is differential scalar refreshing, followed by absolute VQ, and finally differential VQ. In pseudo code the decision to refresh using scalar or VQ looks like this:

/* determine either scalar or vq refresh based on the cumulative refresh bits */ if (cumulative_refresh_bits>TOO_MANY_VQ_REFRESH_BITS)
SET_SCALAR_REFRESH=TRUE; else
SET_SCALAR_REFRESH=FALSE;

where cumulative_refresh_bits is a running tally of how many bits have been used to encode a given frame, TOO_MANY_VQ_REFRESH_BITS is a constant, also referred to as a refresh threshold, and SET_SCALAR_REFRESH is a variable which is set to let other software select between various refresh sub-routines.

The system allows different methods and the use of all, or some combination of these methods, to perform the refreshing based on bit rate and image quality factors.

FIG. 31 depicts the overhead associated with the bit stream structure.

Picture Header Description

With respect to the picture header, in the default configuration of the encoder/decoder (compiled with PSC=4), the picture header is not part of the bit stream. This description of the picture header is only useful for historical purposes and for the cases where the compile switch PSC is set to values 1 or 3.

The picture header precedes the encoded data that corresponds to each frame of image data. The format of the header is a simplified version of the H.261 standard, which can require up to 1000 bits of overhead per frame for the header information. A preferred picture header format only requires 23 bits (when there is no extended picture information) for each video and still image frame and includes the fields shown in FIG. 32 and described below. In an attempt to save bits, the code works whether or not there is a start code as part of the bit stream.

Referring the FIG. 32, the picture header includes a picture start code (PSC) (16 bits), a picture type (PTYPE) (1 bit) and a temporal reference (TR) (6 bits). With respect to the picture start code, a word of 16 bits with a value of 0000 0000 0000 0111 is a unique bit pattern that indicates the beginning of each encoded image frame. Assuming there have been no transmission bit errors or dropped macro rows the decoder should have finished decoding the previous frame when this bit pattern occurs.

The picture type bit specifies the type of the encoded picture data, either as still or video data as follows:
PTYPE='0': moving picture (encoded by the video coder)
PTYPE='1': still picture (encoded by the still image coder)

With respect to the temporal reference, a five bit word ranging from 000010 to 111110 indicates the absolute frame number plus 2 (modulo 60) of the current image based on the information from the video front end 104. The bit stream interface adds two to this number to generate 6-bit numbers between 2 and 61 (inclusive) to avoid generating a bit field that looks like the picture start code. The decoder bit stream interface subtracts two from this number. This is field is used to determine if the encoders have missed real-time and how many frames were dropped.

Error Concealment

There are three main decoding operations: decoding still image data, decoding video data, and decoding refresh data. This section discusses how undetected bit errors can be detected, and the resulting error concealment strategies.

Several bit error conditions may occur in both the video and still image decoding process. For an invalid macro row address error, the system ignores the macro row packet and goes to next macro row packet. For a duplicated macro row address error, a bit error is either in the macro row address or the next frame. The system uses the RTR (relative temporal reference) to determine if the duplicated macro row data is for the next frame or the current frame. If it is for the next frame, the system finishes the error concealment for this frame and sends the image to the YUV to RGB converter and begins decoding the next frame. If it is for the current frame, then the system assumes there is a bit error in the address and operates the same as if an invalid macro row address were specified.

For an error of extra bits left over after the macro row, the system overwrites the macro row with the PCI macro row data as if macro row had been dropped and never decoded. The system then continues with the next macro row of encoded bits. For an error of too few bits for decoding a macro row, the system overwrites the macro row with the PCI macro row data as if macro row had been dropped and never decoded. The system then continues with the next macro row of encoded bits. Another possible error is an invalid VQ address (8 zeros). In this case, the system copies the mean from a neighboring 4×4 block.

Another error is video data mixed with still data. In this case, the system checks the video data RTR. If it is the same as the still data RTR then there is an error condition. If the RTR indicates the next frame, then the system performs concealment on the current frame, sends image to the YUV to RGB converter and continues with decoding on the next frame. Another error is refresh data mixed with still data. This is most likely an undetected bit error in the DT field because the system doe not refresh after still image data. In this case, the macro row should be ignored.

There are also a number of bit errors that are unique to the video image decoder. One type of error is an invalid motion vector (Y,U,V). There are two types of invalid motion vectors: 1. Out of range motion value magnitude (should be between 0 and 224); and 2. Motion vector that requires PCI data that is out of the image plane. In this situation, the system assumes a default motion vector and continues decoding.

Another video image decoder error is refresh data mixed with video data. In this case, the system does the required error concealment and then decodes the refresh data.

With respect to refresh data error conditions, one error is an invalid refresh address. In this case, the system ignores the macro row data and skips to the next macro row packet.

Packetizing of the Encoded Data

It is desirable to transmit the encoded data as soon as possible. The preferred embodiment allows the encoding of images with small packets of data which can be transmitted as soon as they are generated to maximize system speed, independent of synchronization with the other devices.

For example, by macro-row addressing the image data, image areas can be encoded in arbitrary order. That is, no synchronization is required among processors during the encoding of their respective regions because the decoder can interpret the macro rows and decode in arbitrary order. This modular bit stream supports the merging of encoded macro-row packets from an arbitrary number of processors. The macro row packets are not the same size. The packets sent over the modem, which consist of 1 or more macro rows, are not the same size either.

In addition, it is often desirable to use a single transmission channel to transmit various data types (voice, video, data, etc.) simultaneously. The preferred embodiment uses variable length packets of video data which may be interleaved at the data channel with other types of data packets.

Software Interface Between Video Encoder/Decoder and Host

This section describes the software protocol between the host processor (PC) and the video encoder/decoder 103.

There are two phases of communication between the PC and the video encoder/decoder 103. The first phase is concerned with downloading and starting the video encoder/decoder microcode. This phase is entered after the video encoder/decoder 103 is brought out of reset. This is referred to as the initialization phase. After the initialization phase is complete, the communication automatically converts to the second phase known as the run-time phase. Communication remains in the run-time phase until the video encoder/decoder 103 reset. After the video encoder/decoder 103 is taken out of reset it is back in initialization phase.

The video encoder/decoder 103 is placed in the initialization phase by resetting the video encoder/decoder 103. This is accomplished by the following procedure:

1. Set bit 0 in the host control register (Offset 0x8) to one.
2. Reading the 16 bit exchange register (Offset 0x0) to make sure it is empty.
3. Reading the 8 bit master debug register (Offset 0x404) to make sure it is empty.
4. Set bit 0 in the host control register (Offset 0x8) to zero.
5. Wait (perhaps as much as a few milliseconds) for the video encoder/decoder 103 to set the MD_THBF (bit 0) in the debug port status register to one.
6. Send the microcode file 16 bits at a time to the video encoder/decoder through the 16 bit exchange register (Offset 0x0).

The data transfer must be coordinated with the FHBE (bit 1) in status and control register (Offset 0xC) (i.e., data can only be placed in the 16 bit exchange register when the FHBE flag is one).

After the last 16 bit word of the microcode is transferred to the video encoder/decoder 103, the video encoder/decoder 103 will automatically enter the run-time phase.

The run-time phase is signaled by the video encoder/decoder 103 when the video encoder/decoder 103 sends a status message to the host. All run-time data transmission between the Host and video encoder/decoder 103 is performed either through the 16 bit exchange register or RGB FIFO. All data sent from the host to the video encoder/decoder 103 is sent through the 16 bit exchange register.

Data transmitted from the video encoder/decoder 103 to the host can be broken down into two categories. One category is RGB image data and the other contains everything else. The RGB FIFO is used exclusively to convert YUV data to RGB data and transmit that data in RGB format to the host. Since the RGB FIFO has no interrupt capability on the host side, coordination of the RGB data is accomplished by sending a message through the 16 bit exchange register. The host does not need to acknowledge reception of the RGB data since the FIFO half full flag is connected to one of video encoder/decoder's master processor 102 interrupts.

All data transmission, other than RGB FIFO data, will take place in the context of a packet protocol through the 16 bit exchange register. The packets will contain a 16 bit header word and optionally some amount of addition data. The packet header contains two fields, a packet type (4 bits) and the size in bits (12 bits) of the data for the packet (excluding the header), as shown in FIG. 33.

If the packet only contains the header the data size will be zero. Data will always be sent in increments of 16 bits even if the header indicates otherwise. The number of optional 16 bit words is calculated from the optional data size field of the packet header as:

number of optional 16 bit words=int((optional_data_bits+15)/16)

It should be noted that the only case where the number of bits will not necessarily be a multiple of 16 is in the packets containing encoded bit stream data. In this case, if the header indicates the optional data (bit stream data) is not an increment of 16 bits, the last bits are transferred in the following format. If there are 8 or fewer bits, the bits are left justified in the lower byte of the 15 bit word. If there are more than 8 bits, the first 8 bits are contained in the lower byte of the 16 bit word and the remaining bits are left justified in the upper byte of the 16 bit word. All unused bits in the 16 bit word are set to zero. This provides the host processor with a byte sequential data stream.

FIG. 34 shows encoded data in C32 memory (Big Endian Format), FIG. 35 shows encoded data in PC memory for an original bit stream in the system, and FIG. 36 shows encoded data in PC memory for a video encoder/decoder system.

With respect to timing of packet transfers, from the video encoder/decoder 103's point of view, packet transfers occur in one or two phases depending on the packet. If the packet contains only the header, there is only one phase for the transfer. If the packet contains a header and data, there are two phases to the transfer. In both cases, the header is transferred first under CPU interrupt control (Phase 1). If there is data associated with the packet, the data is transferred under DMA control (Phase 2). Once the DMA is finished, CPU interrupts again control the transfer of the next header (Phase 1).

The video encoder/decoder 103 transfers the data portion of packets under DMA control in one direction at a time. For example, this means that if the video encoder/decoder 103 is currently transferring the data portion of a packet A to the host, the host will not be able to send the data portion of packet B to the video encoder/decoder 103 until the transfer of packet A from the video encoder/decoder 103 is done. This is not the case for transfers of packet headers. The host must be careful not to enter a dead lock situation in which the host is trying to exclusively read or write data from or to the video encoder/decoder 103 while the video encoder/decoder 103 is trying to DMA data in the other direction.

The rules for transferring data are as follows. There are three cases. The first case is when the host is trying to send or receive a packet with no data. In this case there is no conflict. The second case is when the host is trying to send a packet (call it packet A) containing data to the video encoder/decoder 103. In this case, the host sends the header for packet A, then waits to send the data. While the host waits to send the data portion of packet A, it must check to see if the video encoder/decoder 103 is trying to send a packet to the host. If the host finds that the video encoder/decoder 103 is trying to send a packet to the host, the host must attempt to take that packet. The third case is when the host is receiving a packet (call it packet B) from the video encoder/decoder 103. The host first receives the header for packet B, then waits for the data. If the host was previously caught in between sending a header and the data of a packet (call it packet C) going to the video encoder/decoder 103, it must check to see if the video encoder/decoder 103 is ready to receive the data portion of packet C. If so the video encoder/decoder 103 must transfer the data portion of packet C before proceeding with packet B.

This implies that the host interrupt routine will have three states for both receiving and sending packets (six states total). State one is idle, meaning no packet is currently being transferred. State two is when the header has been transferred and the host is waiting for the first transfer of the data to occur. State three is when the transfer of data is occurring. When the interrupt routine is in state two for the receiver or the transmitter, it must be capable switching between the receiver and transmitter portion of the interrupt routine based on transmit or receive ready (To Host Buffer Full and From Host Buffer Empty). Once in state three, the host can exclusively transfer data with only a video encoder/decoder 103 timeout loop.

Figure 37:
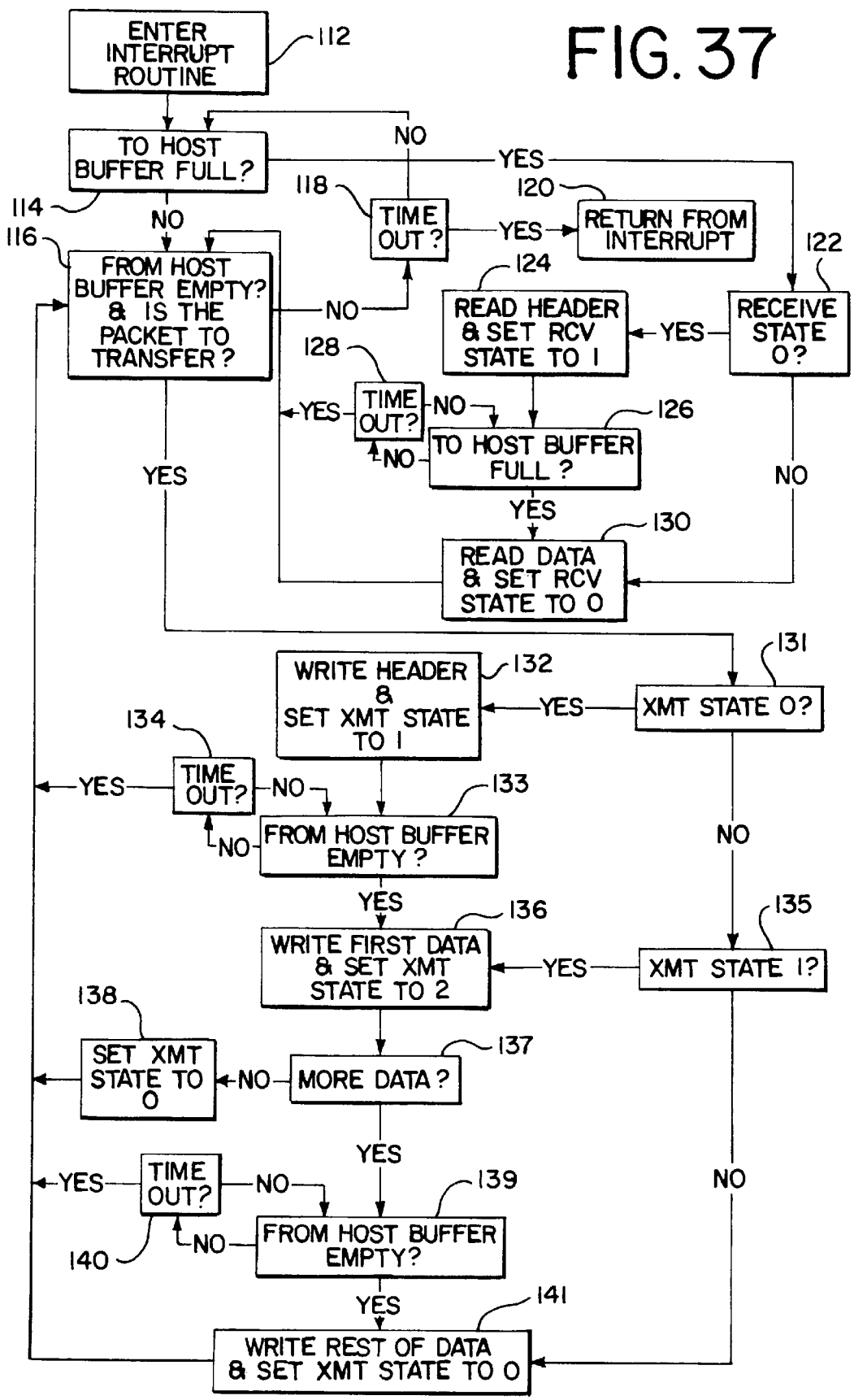
FIG. 37 is a block diagram of an interrupt routine.

FIG. 37 is a flow diagram of a host interrupt routine that meets the above criteria. For clarity, it does not contain a video encoder/decoder 103 died time out. Time outs shown in the flow diagram should be set to a value that is reasonable based video encoder/decoder 103 interrupt latency and on the total interrupt overhead of getting into and out of the interrupt routine (this includes system overhead).

As shown in FIG. 37, the video encoder/decoder 103 enters the host interrupt routine at step 112 and proceeds to step 114, where the routine checks for a transmit ready state (To Host Buffer Full). If the system is not in the transmit ready state, the routine proceeds to step 116, where the system checks for a receive ready state (From Host Buffer Empty) and a packet to transfer. If both are not present, the routine proceeds to check for time out at step 118 and returns from the host interrupt routine, at step 120, if time is out. If time is not out at step 118, the routine returns to step 114.

If the system is in the transmit ready state at step 114, the host interrupt routine proceeds to step 122, where the routine polls the receive state. If the receive state is "0" at step 122, then the routine reads a packet header and sets the receive state to "1" at step 124. The routine then proceeds to look for packet data at step 126 by again checking for a transmit ready state (To Host Buffer Full). If the buffer is full, the routine reads the packet data and resets the receive state to "0" at step 130, and then the routine proceeds to step 116. On the other hand, if the buffer is not full, the routine proceeds to step 128, where it checks for time out. If there is no time out, the routine returns to step 126, whereas if there is a time out at step 128 the routine proceeds to step 116. If the receive state is not "0" at step 122, then the routine proceeds directly to step 130, reads data, sets the receive state to "0" and then proceeds to step 116.

Referring again to FIG. 37, if the system is in the receive ready state and there is a packet to transfer at step 116, then the system proceeds to step 131, where the routine polls the transmit state. If the transmit state is "0" at step 131, the routine proceeds to step 132, where the routine writes the packet header and sets the transmit state to "1." The routine again checks whether the From Host Buffer is empty at step 133. If it is not, the routine checks for time out at step 134. If time is out at step 134, the routine returns to step 116, otherwise the routine returns to step 133.

When the From Host Buffer is empty at step 133, the routine proceeds to step 136, where the routine writes the first data and sets the transmit state to "2." The routine then proceeds to step 137, where it checks for more data. If more data is present, the routine proceeds to step 139 to again check whether the From Host Buffer is empty. On the other hand, if no more data is present at step 137, the routine sets the transmit state to "0" at step 138 and then returns to step 116.

If the From Host Buffer is empty at step 139, the routine proceeds to step 141, where it writes the rest of the data and resets the transmit state to "0," and the routine then returns to step 116. On the other hand, if the From Host Buffer is not empty at step 139, the routine checks for time out at step 140 and returns to step 139 if time is not out. If time is out at step 140, the routine returns to step 116.

At step 131, if the transmit state is not "0," then the routine proceeds to step 135, where the routine again polls the transmit state. If the transmit state is "1" at step 135, then the routine proceeds to write the first data and set the transmit state to "2," at step 136. If the transmit state is not "1" at step 135, then the routine proceeds to write the rest of the data and reset the transmit state to "0" at step 141. As noted above, the routine then returns to step 116 from step 141.

A control packet is depicted in FIG. 38. The control packet always contains at least 16 bits of data. The data is considered to be composed of two parts, a control type (8 bits) and required control parameter (8 bits) and optional control parameters (always a multiple of 16 bits). The control type and required parameter always follow the Control Packet header word. Any optional control parameters then follow the control type and required parameter.

A status request packet is depicted in FIG. 39. The status request packet is used to request that the video encoder/decoder 103 send a status packet. The status packet contains the current state of the video encoder/decoder 103.

An encoded bit stream request packet is depicted in FIG. 40. The encoded bits stream request packets request a specified number of bits of encoded bit stream data from the local encoder. The video encoder/decoder 103 will respond by sending back N macro rows of encoded bit stream data (through the packet protocol). N is equal to the minimum number of macro rows that would contain a number of bits equal to or greater than the requested number of bits. Only one request may be outstanding at a given time. The video encoder/decoder 103 will send each macro row as a separate packet. Macro rows are sent in response to a request as they are available. The requested size must be less than 4096 bits.

A decoder bits packages are shown in FIGS. 41 and 42. Encoded data is sent in blocks. There are two types of packets used to send these blocks. The packets about to be described are used to transmit encoded bit stream data to the local decoder. One type of packet is used to send less than 4096 bits of encoded data or to end the transmission of more than 4095 bits of encoded data. The other is used to start or continue the transmission of more than 4095 bits of encoded data. The video encoder/decoder 103 will respond by sending back RGB data of the decoded bit stream after sufficient encoded bit stream bits have been sent to and decoded by the video encoder/decoder 103.

A decoder bits end packet is depicted in FIG. 41 and a decoder bits start/continue packet is depicted in FIG. 42. If less than a multiple of 16 bits is contained in the packet, the last 16 bit word contains the bits left justified in the lower byte first, then left justified in the upper byte. Left over bits in the last 16 bit word are discarded by the decoder.

As the decoder decodes macro rows from the packet it checks to see if there are less than eight bits left in the packet for a given macro row. If there are less than eight and they are zero, the decoder throws out the bits and starts decoding a macro row from the next packet. If the "left over bits" are not zero, the decoder signals a level 1 error.

If a block contains less than 4096 bits it will be transmitted with a single decoder bits end packet. If the block contains more than 4095 bits, it will be sent with multiple packets using the start/continue packet and terminated with the end packet. The start/continue packet must contain a multiple of 32 bits. One way to assure this is to send the bits in a loop. If the bits left to send is less than 4095, send the remaining bits with the start/continue packet and loop.

Referring to FIG. 43, the YUV data for encoder packet is used to send YUV data to the encoder. It is needed for testing the encoder. It would also be useful for encoding YUV data off-line. For the purposes of the image transfer as well as the encoding process, a YUV frame contains 144 lines of 176 pixel/line Y data and 72 lines of 88 pixels/line of U and V data. Because the data size field in the packet header is only 12 bits, it will take multiple packets to transfer a single YUV image. Y data must be sent 2 lines at a time. U&V data are sent together one line at a time (One line of U followed by one line of V). All of the Y plane can be sent first (or last) or the Y and UV data may be interspersed (i.e., two lines of Y, one line of U&V, two lines of Y, one line of U&V, etc.).

Referring to FIG. 43, for the data type:
  0=Start New Frame
  1=Continue Transferring Frame, data is 2 lines of Y data
  2=Continue Transferring Frame, data is one line of U data followed by one line of V data.
  3=End frame A drop current RGB frame packet is depicted in FIG. 44. The drop current RGB frame packet is used to tell the video encoder/decoder 103 to drop the current RGB frame being transmitted to the host. The video encoder/decoder 103 may already put some of the frame into the FIFO and it is the responsibility of the host to extract and throw away FIFO data for any FIFO ready packets received until the next top of frame packet is received.

A status packet is depicted in FIG. 45. The status packet contains the current status of the video encoder/decoder system. This packet is sent after the microcode is downloaded and started. It is also sent in response to the status request packet.

The packet is formatted so that it can be used directly with the super control packet defined below in the control types and parameters section. The microcode revision is divided into two fields: major revision and minor revision. The major revision is located in the upper nibble and the minor revision is located in the lower nibble.

A decoder error packet is depicted in FIG. 46. The decoder error packet tells the host that the decoder detected an error in the bit stream.

The "error level" shown in FIG. 46 is as follows:
1. Decoder bit stream error, decoder will continue to decode the image.
2. Decoder bit stream error, decoder has stopped decoding the input bit stream. The decoder will search the incoming bit stream for a still image picture start code.
3. Column mismatch of the YUV data sent from the host.
4. Too many Y pixels sent from host for current YUV frame.
5. Too many UV pixels sent from host for current YUV frame.
5. Not enough YUV data sent from host for last YUV frame.

A decoder acknowledge packet is depicted in FIG. 47. The decoder acknowledge packet is only sent when the video encoder/decoder 103 is in store/forward mode. It would be assumed that in this mode the bit stream to be decoded would be coming from disk. Flow control would be necessary to maintain the specified frame rate and to not overrun the video encoder/decoder 103 computational capabilities. The acknowledge packet would signal the host that it could send another packet of encoded bit stream data.

The encoded bits from encoder packets are used to send a macro row of encoded bits from the local encoder to the host. These packets are sent in response to the host sending the encoded bit stream request packet or placing the encoder into record mode.

Referring to FIGS. 48 and 49, there are two types of packets used to send these macro rows. One type of packet is used to send less than 4096 bits of encoded macro row data or to end the transmission of more than 4095 bits of encoded macro row data. The other is used to start or continue the transmission of more than 4095 bits of encoded macro row data. FIG. 48 depicts encoded bits from encoder end packet. FIG. 49 depicts encoded bits from encoder start/continue packet. If fewer than a multiple of 16 bits are contained in the packet, the last 16 bit word contains the bits left justified in the lower byte first, then left justified in the upper. Unused bits in the last 16 bit word are set to zero.

If a macro row contains less than 4096 bits it will be transmitted with a single encoded bits from encoder end packet. If the macro row contains more than 4095 bits, it will be sent with multiple packets using the start/continue packet and terminated with the end packet. The start/continue packets will contain a multiple of 32 bits.

The encoded bits frame stamp packet, as depicted in FIG. 50, is used to send the video frame reference number from the local encoder to the host. This packet is send at the beginning of a new frame in response to the host sending the encoded bit stream request packet. The frame reference is sent modulo 30. The frame type is one if this is a still image or zero if a video image.

A top of RGB image packet, depicted in FIG. 51, is send to indicate that a new frame of video data will be transmitted through the RGB FIFO. The parameter indicates what type of image will be contained in the FIFO. This packet does not indicate that there is any data in the FIFO.

Frame Types:
0x01=Self view large
0x02=Self view small
0x04=Decoded image large

There are two image sizes. The large size is 176 columns× 144 rows (2 lines sent for every FIFO ready packet). The small size is 44 columns×36 rows (6 lines sent for every FIFO ready packet).

The frame number is the frame number retrieved from the decoded bit stream for the decoded image and the frame number from the video acquisition system for the self view image. The number is the actually temporal reference modulo 30.

Figure 52:
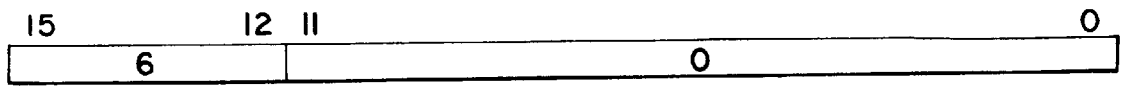

A FIFO ready packet, as depicted on FIG. 52, is sent when there is a block of RGB data ready in the FIFO. The block size is set by the type of video frame that is being transferred (see RGB top of frame packet).

Figure 53:

A YUV acknowledge packet, as depicted in FIG. 53, is sent to tell the host that it is ok to send another YUV frame. Control types and parameters for the control packet (Host to video encoder/decoder 103). Each control type has a default setting. The default settings are in place after the microcode had been downloaded to the video encoder/decoder 103 and until they are changed by a control packets.

Figure 54:
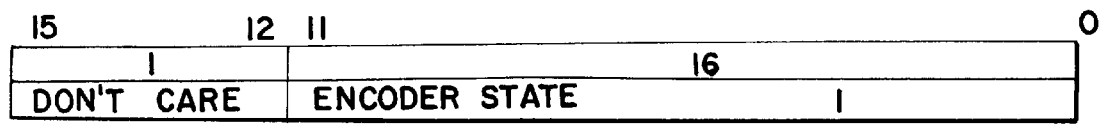

A control encoding packet is depicted in FIG. 54. This control is used to change the state of the encoding process (e.g. start, stop or restart). Re-start is used to force a still image. The default setting is encoding stopped and decoder in normal operation.

Referring to FIG. 54, for the encoder state parameter:
0=Stop encoding
1=Start encoding
2=Re-start encoding
3=Start encoding in record mode (bit rate enforced by video encoder/decoder 103)

If bit 3 of the encoder state parameter is set to one, the encoder buffer is cleared before the new state is entered.

Figure 55:
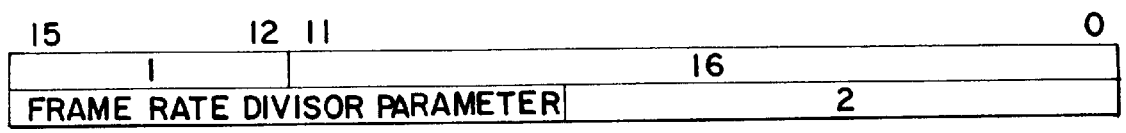

A frame rate divisor packet is depicted in FIG. 55. This control is used to set the frame rate of the video capture system. The default is 15 frames per second.

Referring to FIG. 55, for the frame rate divisor parameter:
2=15 frames per second
3=10 frames per second
4=7.5 frames per second
5=6 frames per second
6=5 frames per second
10=3 frames per second
15=2 frames per second; and
30=1 frame per second.

Figure 56:

An encoded bit rate packet is depicted in FIG. 56. This control is used to set the encoded bit stream rate for the local encoder. The default is 19.2 kbits per second (parameter value of 63). Referring to FIG. 56, with respect to the bit rate parameter:

If bit 7 of the bit rate parameter is 0

$$ActualBitRate=(BitRateParameter+1)*300 \text{ bits/sec}$$

else $$ActualBitRate=(BitRateParameter-0x7f)+1)*1000 \text{ bits/sec}$$

Figure 57:
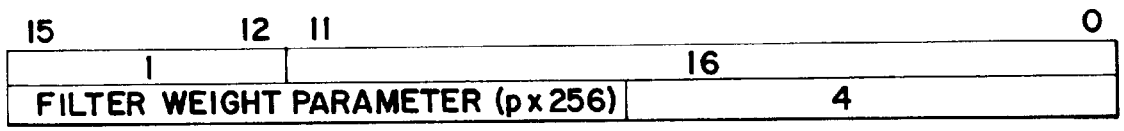

A post spatial filter packet is shown in FIG. 57. This control is used to set the post spatial filter. The filter weight parameter specifies effect of the filter. A parameter value of zero provides no filtering effect. A value 255 places most of the emphasis of the filter on adjacent pixels. The default value for this filter is 77. The spatial filter is implemented as two 3 tap, one dimensional linear filters. The coefficients for these filters are calculated as follows:

$$h[1] = 1 - \left(\frac{2}{3} p\right)$$

$$h[0] = h[2] = \frac{1 - h[1]}{2}$$

Where p is the value of the parameter divided by 256.

A pre spatial filter packet is shown in FIG. 58. This control is used to set the pre spatial filter.

A temporal filter packet is shown in FIG. 59. This control is used to set the temporal filter for the encoder. The filter weight parameter specifies effect of the filter. A parameter value of zero provides no filtering effect. A value 255 places most of the emphasis of the filter on the previous image. The temporal filter is implemented as:

$$y[t]=(1-p).33 \; y[t]+p \times y[t-1]$$

where p is the value of the parameter divided by 256.

A still image quality packet is shown in FIG. 60. This control is used to set the quality level of the still image coder. A quality parameter of 255 indicates the highest quality still image coder and a quality parameter of zero indicates the lowest quality still image coder. There may not be 256 different quality levels. The nearest implemented quality level is selected if there is no implementation for the specified level. The default is 128 (intermediate quality still image coder).

A video mode packet is depicted in FIG. 61. This control is used to set video input & output modes. The large and small self view may not be specified at the same time. It is possible that the PC's or the video encoder/decoder's bandwidth will not support both a large self view and a large decoded view at the same time. Large views are 176×144 and small views are 44×36. The default setting is no views enabled. The reserved bits should be set to zero. Referring to FIG. 61, for the video source:

0=Video source is the host interface through YUV packets; and

1=Video source is the video front end.

A video pan absolute packet is shown in FIG. 62. This control is used to set electronic pan to an absolute value. Because the video encoder/decoder system is not utilizing the complete video input frame, one can pan electronically (select the part of the video image to capture). Planning is specified in ½ pixel increments. The pan parameters are 8 bit signed numbers. The Y axis resolution is 1 pixel. The default pan is (0,0) which centers the captured image in the middle of the input video image. The valid range for the x parameters is about −100 to +127. The valid range for the y parameter is −96 to +96.

A brightness packet is show in FIG. 63. The brightness packet controls the video front end 104 brightness setting. The brightness value is a signed integer with a default value as zero.

A contrast packet is shown in FIG. 64. The contrast packet controls the video front end 104 contrast setting. The contrast value is an unsigned integer with a default setting of 128.

A saturation packet is shown in FIG. 65. The saturation packet controls the video front end 104 saturation setting. The saturation value is an unsigned integer with a default value of 128.

A hue packet is shown in FIG. 66. The hue packet controls the video front end 104 hue setting. The hue value is a signed integer with a default value of zero.

A super control packet is shown in FIG. 67. The super control packet allows all of the above defined control to be set all at once. See above for the various parameter definitions.

A control decoding packet is shown in FIG. 68. This control is used to change the state of the decoding process (e.g. look for still image or normal decoding). The default setting for the decoder is normal decoding. For the decoder state parameter:

0=Decoder not decoding

1=Decoder normal operation (decoding, decoder does not acknowledge encoded bit packets)

2=Decoder in playback mode (decoder acknowledges encoded bit packets); and

3=Decoder in bit stream pass through mode (decoder gets bits from local encoder).

If bit 3 of the decoder state parameters is set to one, the decoder buffer is cleared before the new state is entered.

The set motion tracking control is used to set the motion tracking state of the encoder. This parameter is used to trade frame rate for better quality video frames. A value of zero codes high quality frames at a slower rate with longer delay. A value of 255 will track the motion best with the least delay, but will suffer poorer quality images when there is a lot of motion. The default setting is 255. A motion tracking packet is shown in FIG. 69.

The request control setting packet is used to request the value of the specified control setting. The video encoder/decoder 103 will respond by send back a packet containing the requested value. The packet will be formatted so that it could be used directly to set control value. A request control setting packet is shown in FIG. 70.

An example of a request control setting packet is shown in FIG. 71. If the PC sent the request control setting packet of FIG. 71, the video encoder/decoder 103 would respond by sending back a frame rate divisor packet formatted, as shown in FIG. 72.

A request special status information packet is shown in FIG. 73. The request special status setting packet is used to request the value of the specified status setting. The video encoder/decoder 103 will respond by send back a packet containing the requested value. This will be used mainly for debugging.

Request for the following information types will result in the video encoder/decoder 103 sending back a packet as shown in FIG. 74, which depicts buffer fullness (type 0x81).

A request YUV frame (type 0x2) causes the video encoder/decoder 103 to send to YUV frames of data until the request is made a second time (i.e., the request is a toggle). The video encoder/decoder 103 will send back YUV frames through the packet protocol. There are four types of packets that will be sent. A packet indicating the top of frame, a packet containing two lines of Y data, a packet containing one line of U data followed by one line of V data and a packet indicating the end of the frame. A YUV top of frame is depicted in FIG. 75 and a Y data frame is depicted in FIG. 76. A UV data frame is depicted in FIG. 77 and a YUV end of frame is depicted in FIG. 78.

Means Squared Error (MSE) Hardware

As previously noted, the preferred architecture can calculate multiple pixel distortion values simultaneously and in a pipelined fashion so that entire areas of image may be calculated in very few clock cycles. Two accelerator algorithms may be used, the Mean Squared Error (MSE) and the Mean Absolute Error ("MAE"). In a preferred embodiment, the algorithm is optimized around the MSE calculations because the MSE results in the lowest PSNR. The amount of quantization or other noise is expressed as the ratio of peak-to-peak signal to RMSE expressed in decibels (PSNR).

Computing the MSE and MAE in digital signal processor (DSP) software takes about the same computer time. In a TMS320C31 digital signal processor manufactured by Texas Instruments, also referred to as a C31, the MSE takes 2 clock cycles and MAE takes 3 cycles. A TMS320C51 digital signal processor running at twice the clock speed can calculate the MSE and MAE in 5 clocks. The MSE accelerator requires multipliers whereas the MAE can be implemented with only adders, rendering the hardware implementation of the MAE easier.

Figures 79, 80, 81:
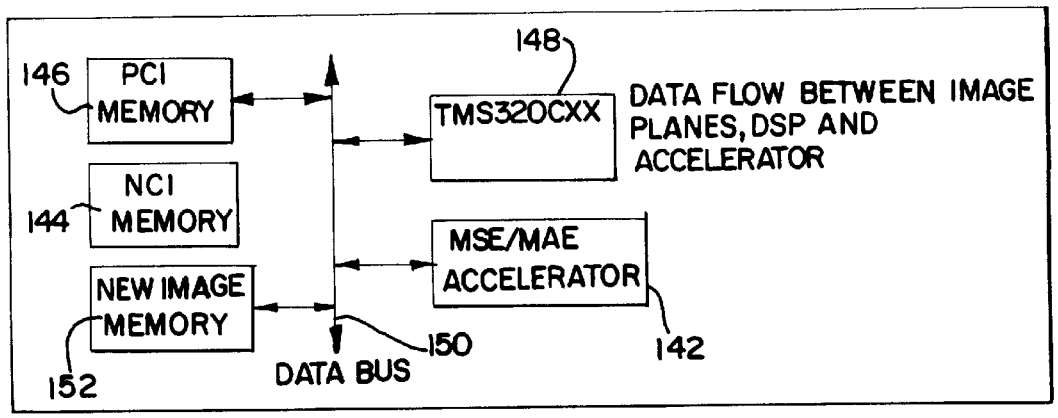
FIG. 79 depicts data flow between image planes, a digital signal processor and an accelerator.
FIG. 80 is table that represents formulas for calculating speed improvements with an accelerator.
FIG. 81 is table that shows speed improvement for various pipeline delay lengths used with an accelerator.

The accelerator connects to the slave encoder memory bus and receives control from the slave DSP as shown in FIG. 79. Preferably, the DSP fetches 32 bit words, 4 pixels, from memory and passes it to the accelerator. There are four accelerator modes. The first mode, MSE/MAE calculations, is the most used mode. This mode may be with or without motion. The second mode, scene change MSE/MAE calculation, is done once per field. This mode computes MSE/MAE on every 8×8 block and stores result in internal DSP RAM, compares the total error of a new field with the previous field's total error, and then software determines if still frame encoding is necessary. The third mode, standard deviation calculations, calculates the standard deviation for each block to be encoded to measure block activity for setting the threshold level. The fourth mode is a mean calculation. This is rarely computed, only when the algorithm is in the lowest part of hierarchy.

Referring to FIG. 79, a memory read takes one DSP clock, and therefore transfers four pixels in one clock. An MSE/MAE accelerator 142 requires four NCI (newly coded image) pixels from a NCI memory 144 and four PCI (previously coded image) pixels from a PCI memory 146 for processing by a DSP 148. In a preferred embodiment, the DSP 148 is a Texas Instruments TMS320C31 floating point DSP. A fixed point DSP or other digital signal processor may also be used. The DSP 148 reads the result from the accelerator 142 along the data bus 150, which takes one clock. For a 4×4 block without motion, it thus takes nine clocks plus any hardware pipeline delays, four clocks for NCI data, plus four clocks for PCI data, plus one clock to read the result, 4+4+1=9. FIG. 79 also includes a new image memory 152.

If a motion search is necessary, then a second set of four PCI pixels must be read from memory. The accelerator stores the first set of PCI data and uses part of the second PCI data. The DSP instructs the accelerator how to process (MUX) the appropriate pixels. For a 4×4 block with motion it takes 13 clocks plus pipeline delays, which is four clocks for NCI data, four clocks for PCI data, four clocks for the second set of PCI data, and one clock for reading the result, 4+4+4+1=13.

The 8×8 blocks are calculated in the same way. Without motion takes 33 clocks plus pipeline delay, and with motion it takes 49 clocks plus pipeline delay.

For the software to compute an MSE, first it reads a 16×16 block of NCI and PCI data into internal memory. Then it takes 2 clocks per pixel for either the MSE or MAE calculation, or a total of 128 clocks for an 8×8 block, or 32 clocks for a 4×4 block. For comparison purposes, only the actual DSP compute time of 128 or 32 clocks are compared. The hardware is not burdened with the overhead associated with transferring the 16×16 blocks, therefore the actual hardware speed up improvement is greater than the value calculated.

Other overhead operations not included in the calculations are: instruction cycles to enter a subroutine, instructions to exit a routine, time to communicate with the hardware, etc. The overhead associated with these operations represents only a small percentage of the total and they tend to cancel each other when comparing hardware to software methods, so they are not included in the calculations.

FIG. 80 is a table that represents the formulas for calculating speed improvements. The expression represents a ratio between total time taken by software divided by the time for implementing the calculations in hardware. "Pd" represents the hardware pipeline delay. Assuming a pipeline delay of 3 clocks, speed improvement is found. With respect to the worst case scenario, a 4×4 condition, assuming that motion is present 3 out of 4 times, then the average speed improvement is (32/12*1+32/16*3)4=2.167 times over the software only implementation. For the 8×8 case, assuming motion 3 out of 4 times, then the average improvement is (128/36*1+128/52*3)/4=2.74 times over the software only implementation.

Overall, assuming the hierarchy stays in the 8×8 mode 3 out of 4 times, then the total speed improvement would be (32/12*1+32/16*3)/4*1+(128/36*1+128/52*3)/4*3)14= 2.593 times over the software only implementation.

FIG. 81 shows the speed improvement for various pipeline delay lengths. Assuming a motion search is required 3:1 and that the 8×8 block is required 3:1 compared to 4×4 in the overall section.

With respect to programmable logic devices (PLDs), a preferred embodiment employs, for example, Altera 8000 Series, Actel ACT 2 FPGAs, or Xilinx XC4000 Series PLDs.

Figure 82:
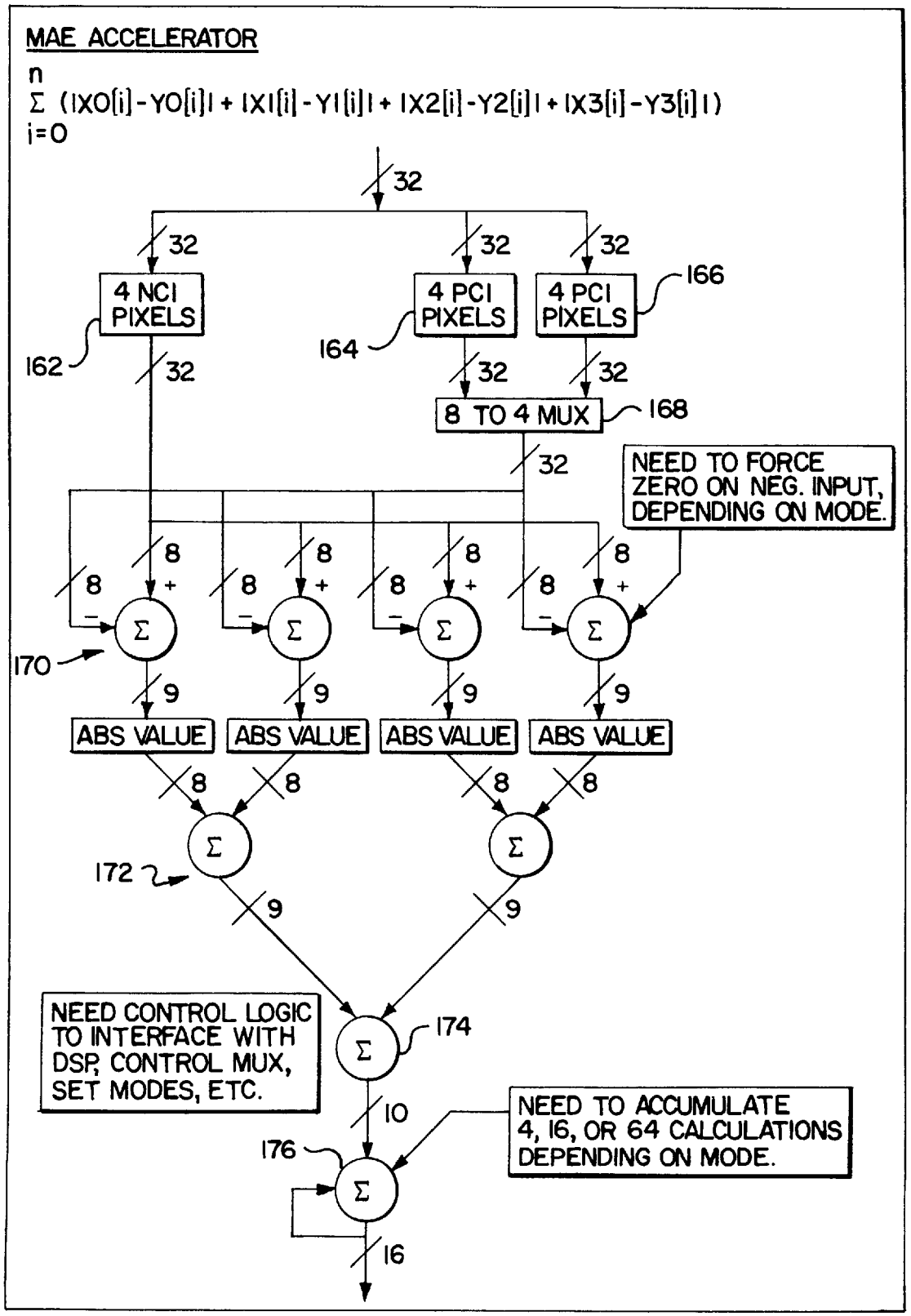
FIG. 82 depicts a mean absolute error (MAE) accelerator implementation in accordance with the equation shown in the Figure.

FIG. 82 depicts a mean absolute (MAE) accelerator implementation in accordance with the equation shown in the Figure. As shown at 162, the input is 4 newly coded image pixels (NCI), which is 32 bits, and, as shown at 164, 4 previously coded image pixels (PCI). As shown at 166, if a motion search is necessary, the system further requires an additional 4 PCI pixels. As seen at 168, the PCI pixels are multiplexed through an 8 to 4 bit multiplexer (MUX), which is controlled by a DSP (not shown). As shown at 170, a group of adders or summers, adds the newly encoded pixels and the previously encoded pixels and generates 9 bit output words. As seen at 172, the absolute value of these words, generated by removing a sign bit from a 9 bit word resulting in an 8 bit word, is then input into a summer 174, the output of which is a 10 bit word input into a summer 176. The summer 176 then accumulates the appropriate number of bits depending on the operation mode.

Figure 83:
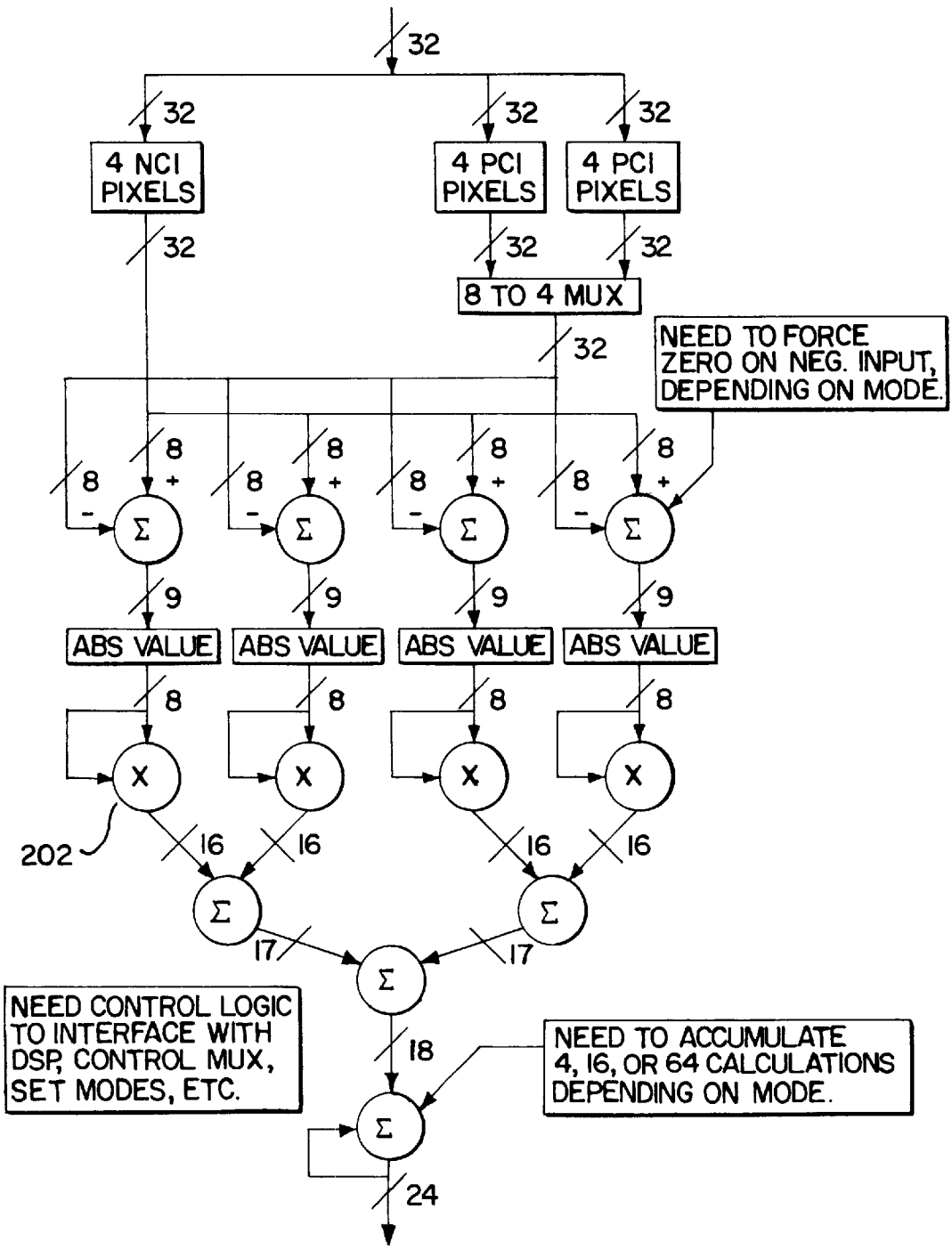
FIG. 83 depicts a mean absolute error (MSE) accelerator implementation in accordance with the equation shown in the Figure.

FIG. 83 depicts a mean absolute (MSE) accelerator implementation. The configuration of this implementation is similar to that shown in FIG. 82, and includes a group of multipliers 202.

Figure 84:
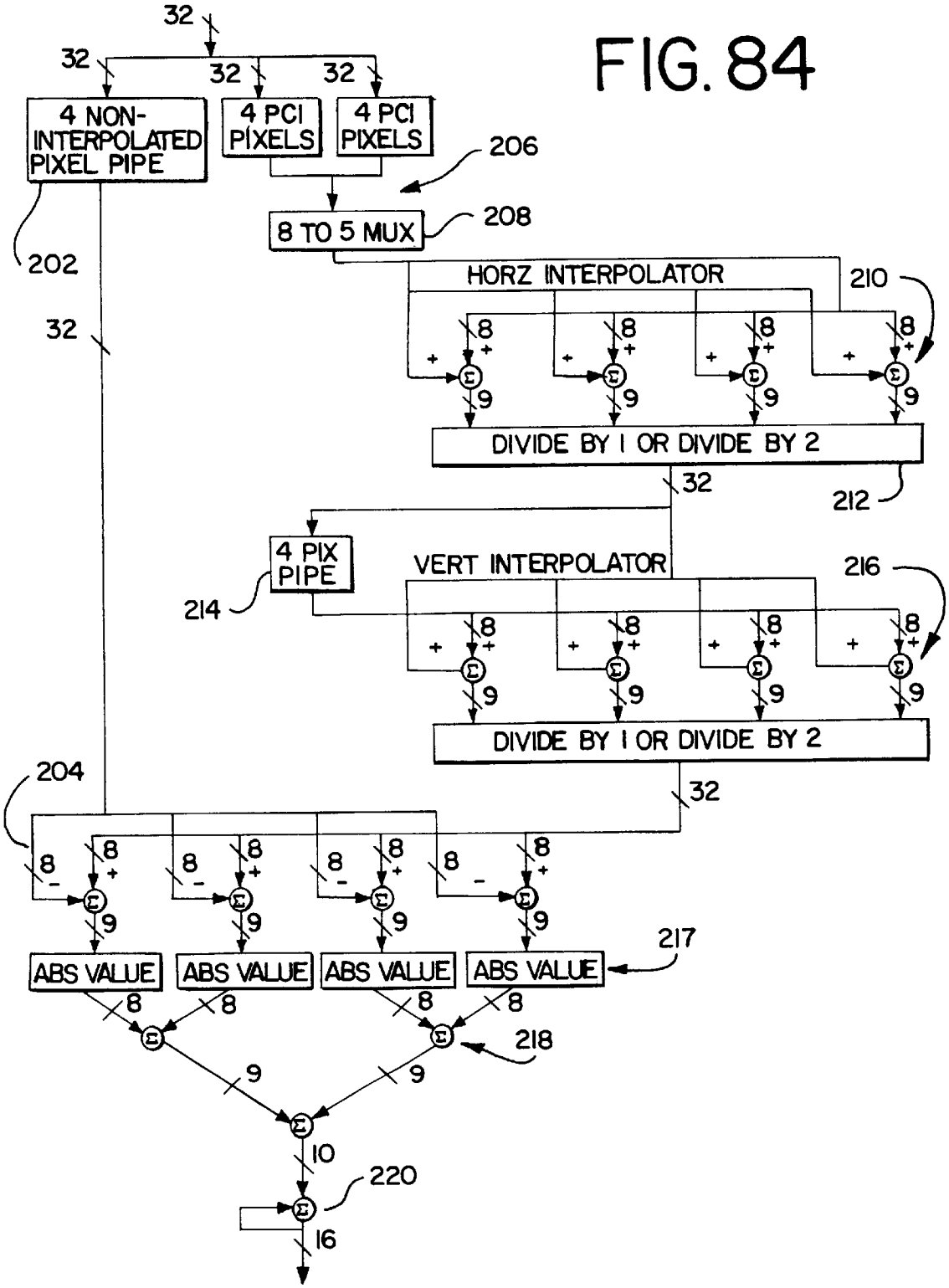
FIG. 84 illustrates an mean absolute error (MAE) implementation as in FIG. 82 with interpolation to provide ½ pixel resolution.

FIG. 84 illustrates an mean absolute error (MAE) implementation for calculating the MAE of up to four pixels at a time with pixel interpolation for sub-pixel resolution corresponding to the equation at the top of FIG. 84. The implementation includes a 32 bit input. As seen at 202, four non-interpolated pixels are transmitted via a pixel pipe to a series of summers or adders 204. At 206, four previously encoded pixels are input into a 8 to 5 multiplexer (MUX) 208. The output of the MUX 208 is horizontally interpolated with a series of summers or adders 210 and the output 9 bit words are manipulated as shown at 212 by the DSP (not shown). The resulting output is transmitted to a 4 pixel pipe 214 and is vertically interpolated with a series of summers or adders, as seen at 216. As seen at 217, the absolute value of the output of the adders 204 is input to adders 218, the output of which is provided to adder 220. The adder 220 accumulates the appropriate number of bits depending on the mode of operation.

Figure 85:
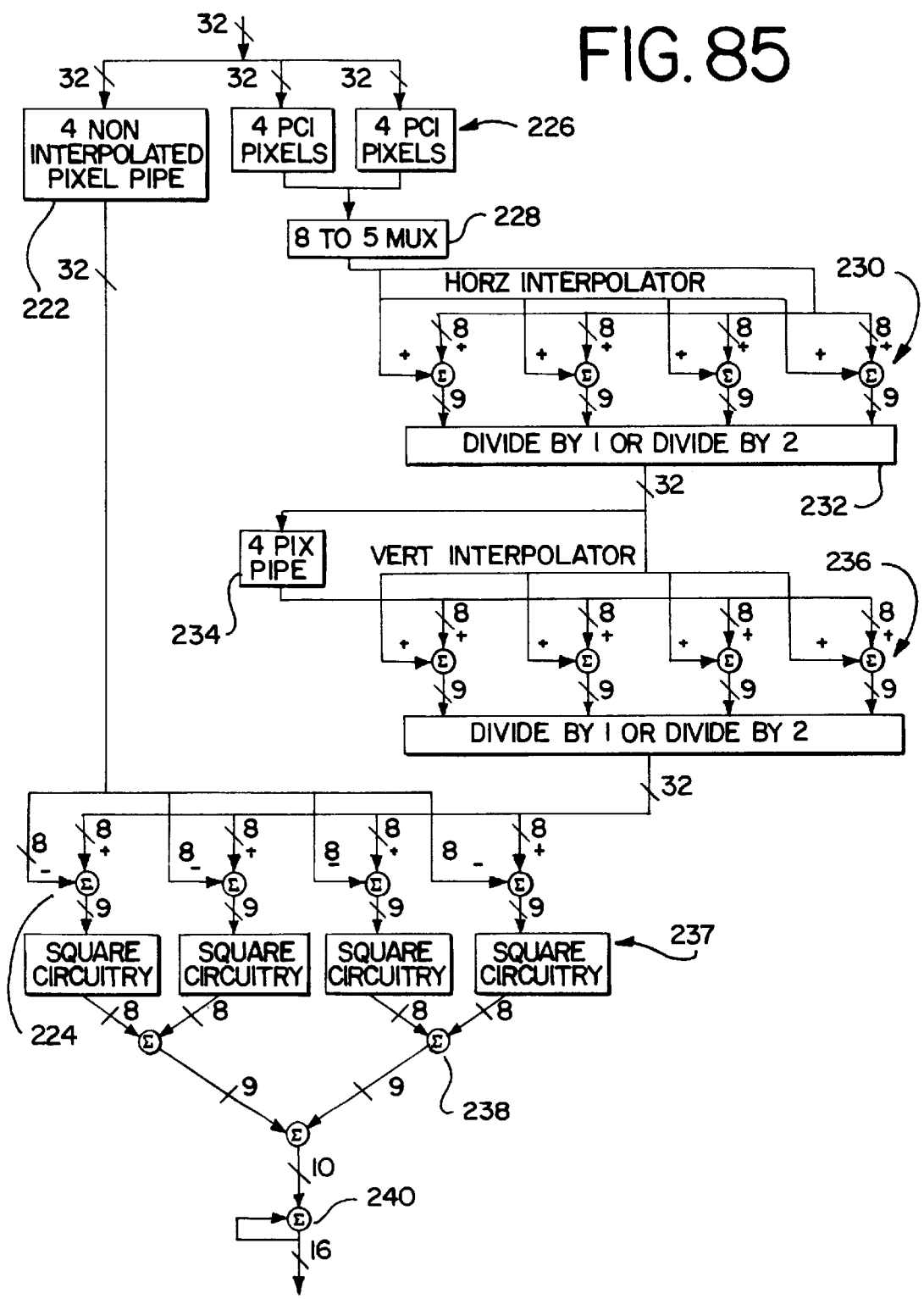
FIG. 85 illustrates a mean square error (MSE) implementation as in FIG. 83 with interpolation to provide ½ pixel resolution.

FIG. 85 illustrates a mean square error (MSE) implementation for calculating the MAE of up to four pixels at a time with pixel interpolation for sub-pixel resolution corresponding to the equation at the top of FIG. 85. The implementation includes a 32 bit input. As seen at 222, four non-interpolated pixels are transmitted via a pixel pipe to a series of summers or adders 224. At 226, four previously encoded pixels are input into a 8 to 5 multiplexer (MUX) 228. The output of the MUX 228 is horizontally interpolated with a series of summers or adders 230 and the output 9 bit words are manipulated as shown at 232 under the control of the DSP (not shown). The resulting output is transmitted to a 4 pixel pipe 234 and is vertically interpolated with a series of summers or adders, as seen at 236. As seen at 237, the squared value of the output of the adders 224 is input to adders 238, the output of which is provided to adder 240. The adder 240 accumulates the appropriate number of bits depending on the mode of operation.

Video Teleconferencing

Video teleconferencing allows people to share voice, data, and video simultaneously. The video teleconferencing product is composed of three major functions; video compression, audio compression and high speed modem. The video compression function uses the color space conversion to transform the video from the native YUV color space to the host RGB display format.

A color space is a mathematical representation of a set of colors such as RGB and YUV. The red, green and blue (RGB) color space is widely used throughout computer graphics and imaging. The RGB signals are generated from cameras and are used to drive the guns of a picture tube. The YUV color space is the basic color space used by the NTSC (National Television Standards Committee) composite color video standard. The video intensity ("luminance") is represented as Y information while the color information ("chrominance") is represented by two orthogonal vectors, U and V.

Compression systems typically work with the YUV system because the data is compressed from three wide bandwidth (RGB) signals down to one wide bandwidth (Y) and two narrow bandwidth signals (UV). Using the YUV color space allows the compression algorithm to compress the UV data further, because the human eye is more sensitive to luminance changes and can tolerate greater error in the chrominance information.

The transformation from YUV to RGB is merely a linear remapping of the original signal in the YUV coordinate system to the RGB coordinate system. The following set of linear equations can be used to transform YUV data to the RGB coordinate system:

$$R=Y+1.366*V-0.002*U$$

$$G=Y-0.700*V-0.334*U$$

$$B=Y-0.006*V+1.732*U$$

This type of transformation requires hardware intensive multipliers. Approximate coefficients can be substituted which simplifies the hardware design. Two-bit coefficients can be implemented in hardware with adders, subtractor and bit-shifts (no multipliers). The two-bit coefficient method requires no multiplier arrays. A simplified set of equations follow:

$$R=Y+1.500*V$$

$$G=Y-0.750*V31\ 0.375*U$$

$$B=Y+1.750*U$$

Coefficient errors due to this approximation range from 1.2% to 9%. The 9% error occurs in the U coefficient of the G equation. To implement the two-bit coefficients in hardware, the equations can be viewed where the multiplication is a simple bit shift operation. Shift operations do not involve logic. It is important to remember that the hardware must hard limit the RGB data range. Therefore, an overflow/underflow detector must be built into the hardware that implements this conversion.

The YUV to RGB matrix equations use two-bit coefficients which can be implemented with bit-shifts and adds. High speed adder structures, carry save and carry select, are used to decrease propagation delay as compared to a standard ripple carry architecture. The two types of high speed adders are described below.

Carry save adders reduce three input addends down to a sum and carry for each bit. Let $A=A_{n-1}\ldots A_1A_0$ and $B=B_{n-1}\ldots B_1B_0$ and $D=D_{n-1}\ldots D_1D_0$ be the addend inputs to an n-bit carry save adder. Let $C_i$ be the carry output of the ith bit position and $S_i$ be the sum output of the ith position. $C_i$ and $S_i$ are defined as shown in FIG. 86.

A sum and carry term is generated with every bit. To complete the result, the sum and carry terms must be added in another stage such as a ripple adder, carry select adder or any other full adder structure. Also note that the carry bus must be left shifted before completing the result. For instance, when the LSB bits are added, sum $S_0$ and carry $C_0$ are produced. When completing the result, carry $C_0$ is added to sum $S_1$ in the next stage, thus acting like a left bus shift.

Figure 87:
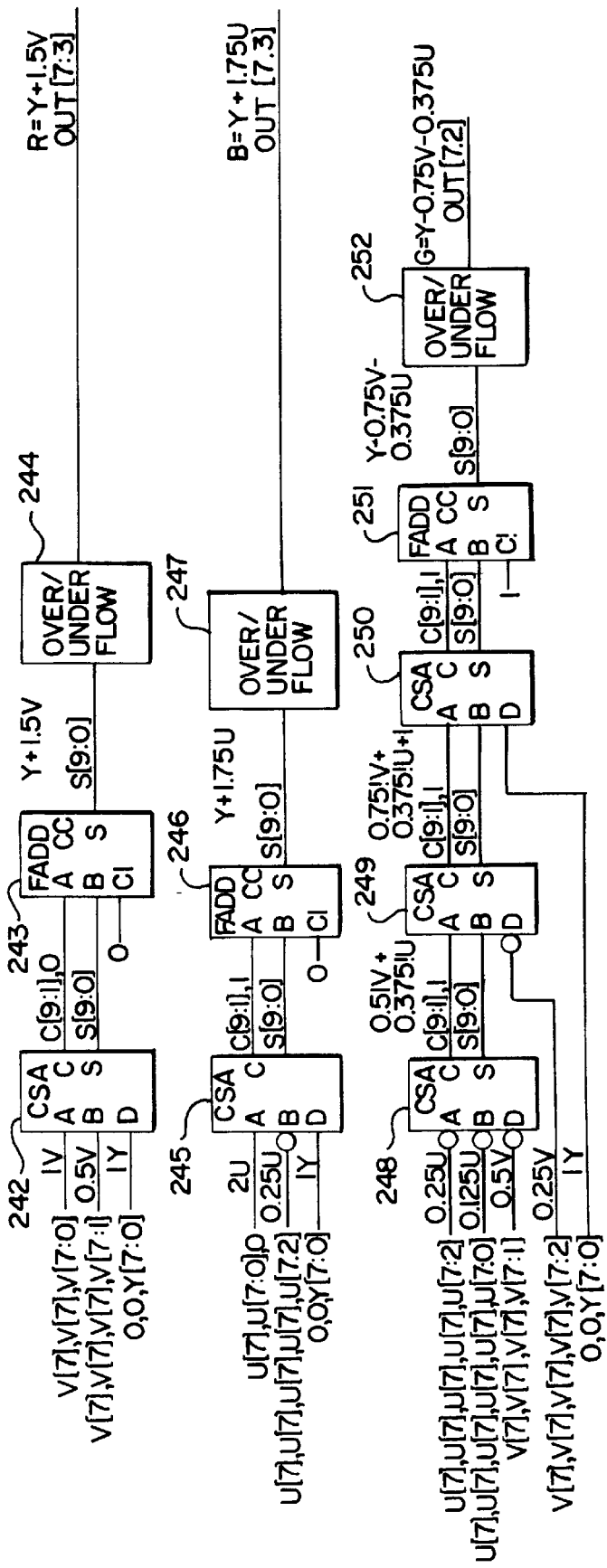
FIG. 87 is a block diagram of a circuit that converts a YUV signal to RGB format.

FIG. 87 is a block diagram of a color space converter that converts a YUV signal into RGB format. The R component is formed by coupling a 1V, a 0.5V and a 1Y signal line to the inputs of a carry save adder 242, as shown in FIG. 87. The carry and sum outputs from the carry save adder 242 are then coupled to the inputs of a full adder 243. The sum output of the full adder 243 is then coupled to an overflow/underflow detector 244, which hard limits the R data range.

The B component of the RGB formatted signal is formed by coupling a 2U, a –0.25U and a 1Y signal line to the inputs of a carry save adder 245. The carry and sum outputs of the carry save adder 245 are coupled to the inputs of a full adder 246, whose sum output is coupled to an overflow-underflow detector 247. The overflow-underflow detector 247 hard limits the B data range.

The G component of the RGB formatted signal is formed by coupling a –0.25U, a –0.125U and a –0.5V signal line to the inputs of a carry save adder 248. The carry and sum outputs of the carry save adder 248 are coupled, along with a –0.25V signal line, to the inputs of a second carry save adder 249. The carry and sum outputs of the carry save adder 249 are coupled, along with a 1Y signal line, to the inputs of a third carry save adder 250. The carry and sum outputs of the third carry save adder 250 are coupled to the inputs of a full adder 251, as shown in FIG. 87. The sum output of the full adder 251 is coupled to an overflow/underflow detector 252, which hard limits the data range of the G component.

In a preferred embodiment, the Y signal has eight data bits and the U and V signals have seven data bits and a trailing zero bit. U and V signals may therefore be processed by subtracting 128. In addition, the Y, U and V signals are preferably sign extended by two bits, which may be used to determine overflow or overflow state. For example, 00=OK, 01=overflow, 11=underflow and 10=indeterminant. Each of the adders shown in FIG. 87 is preferably, therefore, a 10 bit adder.

Figure 88:
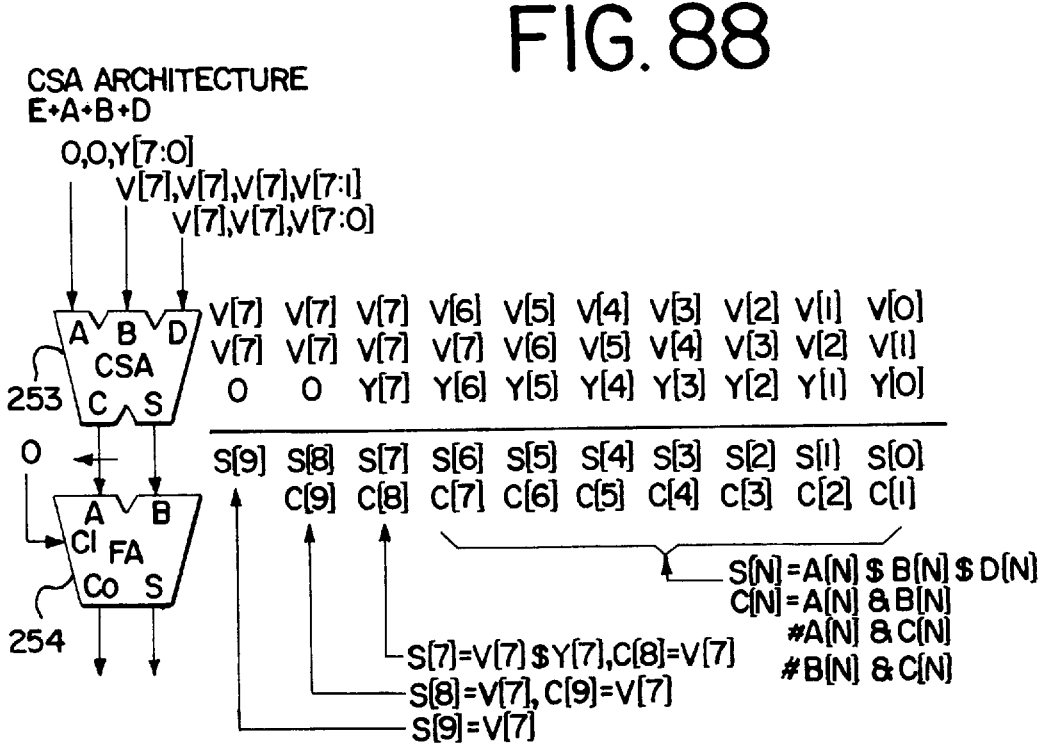
FIG. 88 depicts a logic adder and a related bit table for converting the YUV signal to RGB format.
Figure 89:
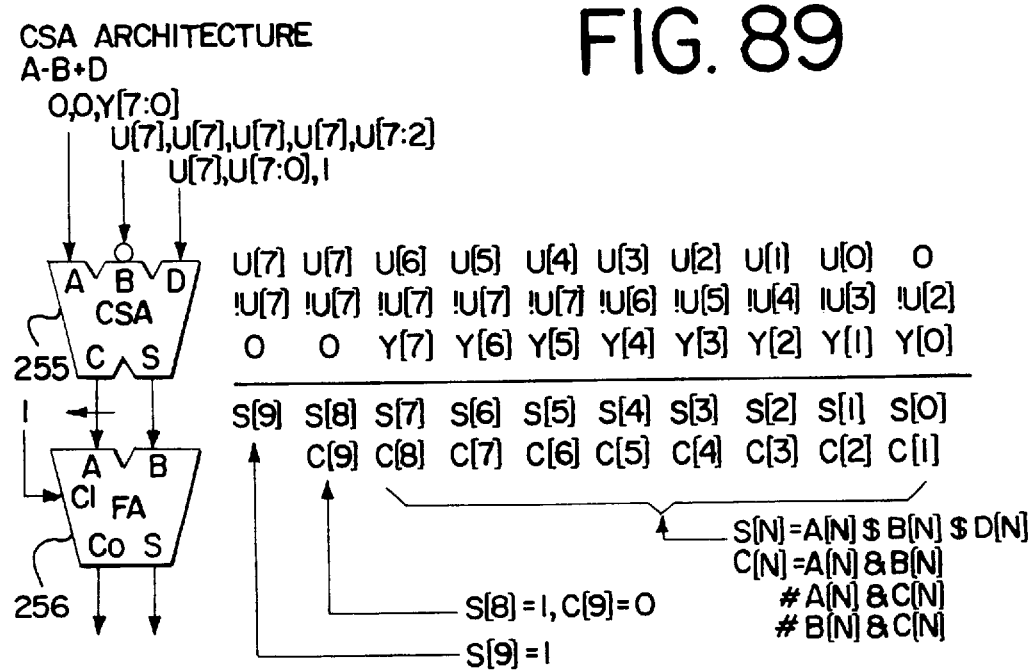
FIG. 89 depicts a logic adder and a related bit table for converting the YUV signal to RGB format.
Figure 90:
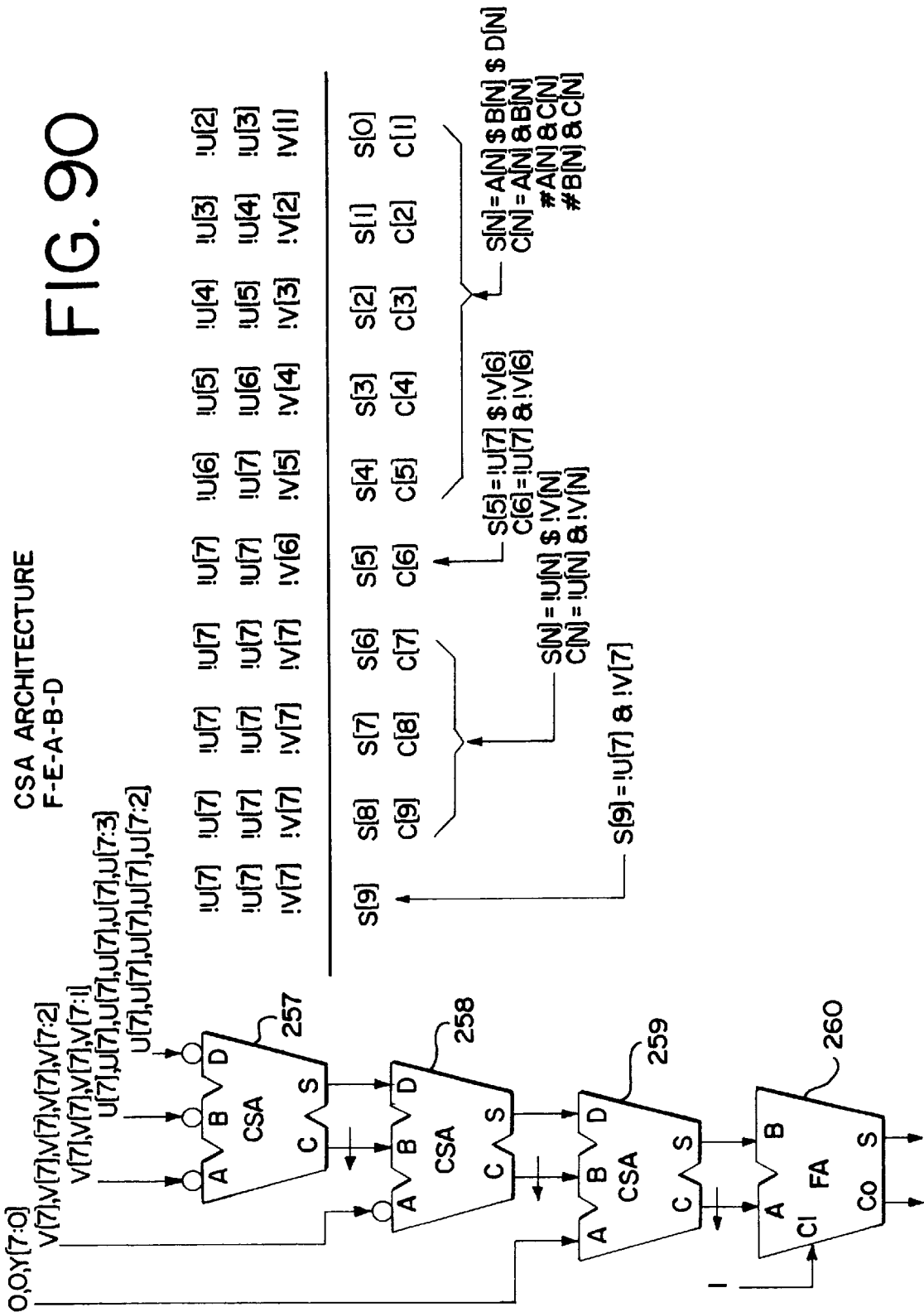
FIG. 90 depicts a logic adder and a related bit table for converting the YUV signal to RGB format.

FIGS. 88, 89 and 90 depict a carry select adder configuration related bit tables for converting the YUV signal to RGB format. FIG. 88 includes a carry select adder 253 coupled to a full adder 254 that generate the R component of the RGB signal. FIG. 89 includes a carry select adder 255 coupled to a full adder 256 that generate the B component of the RGB signal. FIG. 90 includes carry select adders 257, 258, 259 and a full adder 260 that generate the G component of the RGB signal.

Figure 91:
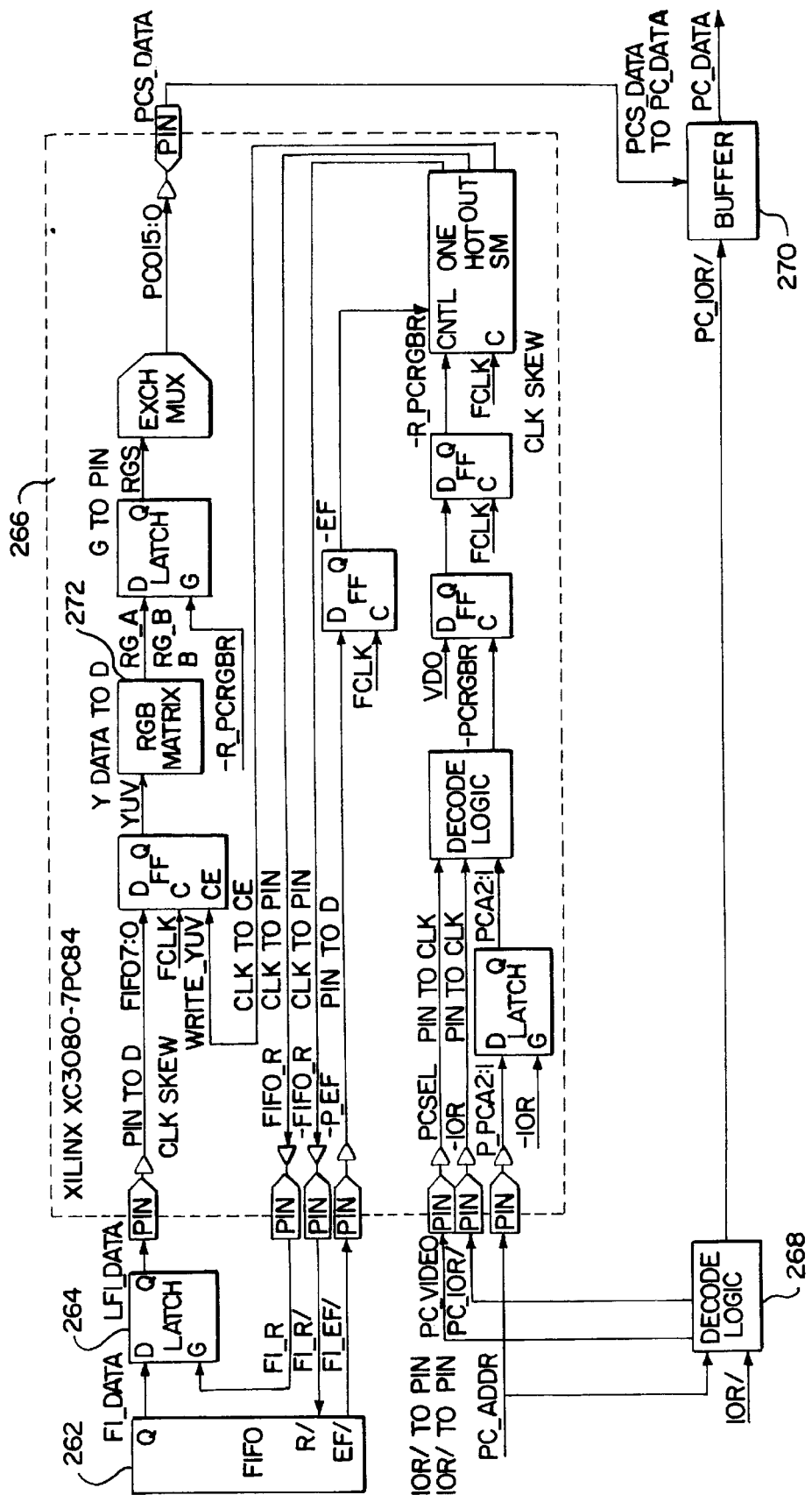
FIG. 91 is a block diagram timing model for the YUV to RGB conversion.

FIG. 91 is a block diagram timing model for an YUV to RGB color space converter. A FIFO 262 is coupled by a latch 264 to a state machine 266, such as the Xilinx XC3080-7PC84 field programmable gate array. The state machine 266 includes an RGB converter 272 that converts a YUV signal into a RGB formatted signal. The converter 272 is preferably a ten bit carry select adder having three levels of logic (as shown in FIGS. 87–90). The RGB formatted data is coupled from an output of the state machine 266 into a buffer 270. In accordance with the preferred embodiment, the state machine 266 is a memoryless state machine that simultaneously computes the YUV-to-RGB conversion while controlling the flow of data to and from it.

The carry select adder, as implemented in the Xilinx FPGA, adds two bits together and generates either a carry or a sum. Carry select adders are very fast because the propagation delays and logic levels can be kept very low. For instance, a ripple carry adder of 10 bits requires 10 level of logic to compute a result. A 10 bit carry select adder can be realized in only three levels of logic.

Sums and carries are generated, and in some cases, a carry is generated without completing the carry from lower order bits. For instance, carry four (C4) generates two carry terms, each based on the outcome of carry two (C2). Equation C_40 is based on C2 being zero, and C_41 is based on C2 being one. Once C2 is determined, then the appropriate signal, C_40 or C_41, can be selected in later logic levels.

Generating multiple carries allows for parallel processing, because the carries can be generated without waiting for earlier results. This idea greatly improves the speed of an adder as compared to ripple carry architecture.

Similarly, higher order bits will generate multiple carry types which will be completed in following levels of logic. As the lower order sums and carries are generated, the upper order results can be determined. The entire adder tree is completed in only three levels of logic. Appendix 6 contains code for implementing the carry select adder and the carry save adder.

Figure 92A:
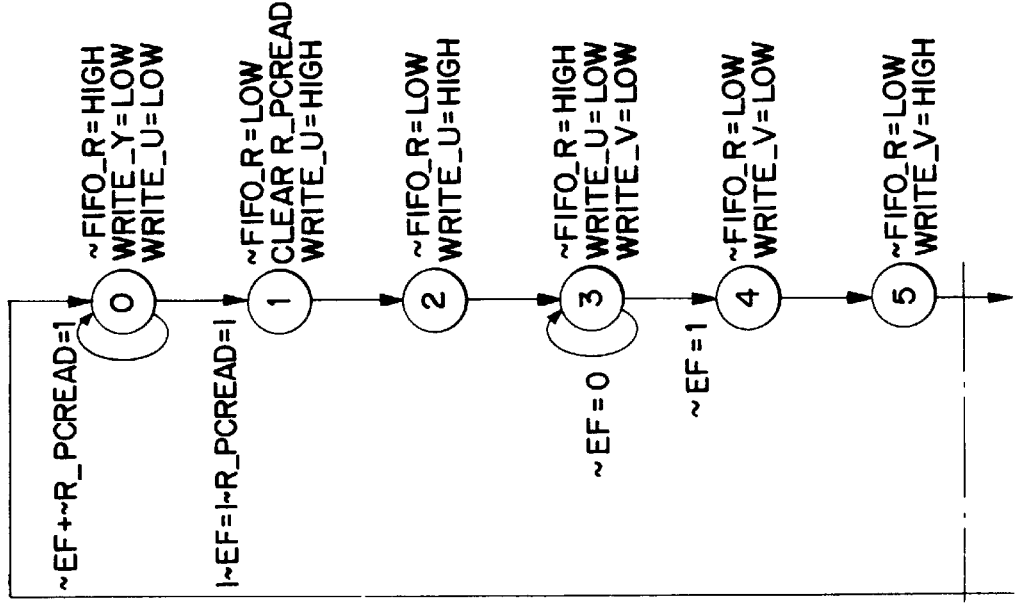
FIG. 92 is a state diagram relating to the conversion of the YUV signal to RGB format.

FIG. 92 is a state diagram relating to the conversion of the YUV signal to RGB format in accordance with the timing model shown in FIG. 91.

Since different platforms have different color space requirements, the output color space converter shown in FIG. 91 is in-circuit configurable. The application software queries the platform to determine what color space it accepts and then reconfigures the color space converter appropriately. In the preferred embodiment, YUV-to-RGB 565 color space conversion is performed. Nonetheless, the FPGA shown in FIG. 91 may perform RGB color space conversions to different bit resolutions or even to other color spaces.

Half-Pixel Motion Estimation Memory Saving Technique

In video compression algorithms, motion estimation is commonly performed between a current image and a previous image (commonly called the reference image) using an integer pixel grid for both image planes. More advanced techniques use a grid that has been upsampled by a factor of two in both the horizontal and vertical dimensions for the reference image to produce a more accurate motion estimation. This technique is referred to as half-pixel motion estimation. The motion estimation is typically performed on 8×8 image blocks, or on 16×16 image blocks (macro blocks), but various image block sized may be used.

Assume that 16×16 image blocks (macro blocks), as shown in FIG. 93, are used with a search range of approximately ±16 pixels in the horizontal and vertical directions and that the image sizes are QCIF (176 pixels horizontally by 144 pixels vertically) although other image sizes could be used. Further assume that each pixel is represented as one byte of data, and that motion searches are limited to the actual picture area. A 16 pixel wide vertical slice is referred to as a macro column and a 16 pixel wide horizontal slice is referred to as a macro row. An interpolated macro row of reference image data is 176×2 bytes wide and 16×2 bytes high. FIG. 94 shows a macro block interpolated by a factor two horizontally and vertically.

When designing video compression algorithms, there is a trade-off between computation power and memory usage. On the one hand, if one has more computational power and memory bandwidth, then one can save on memory space by performing the interpolation on a 3×3 macroblock portion of the reference image for each macro block of the current image to undergo motion estimation. On the other hand, if one can afford to use more memory to save computational power then one can interpolate the full reference image before any motion estimation is performed and therefore only interpolate each portion of the image once. This provides computational savings since one is only interpolating the image once instead of multiple times. This computational savings comes at the cost reference image memory size which must be four times the original reference image memory size (176×144×2×2=101,376 bytes). In a preferred embodiment, there are two methods of reducing the computation and the memory requirements simultaneously.

The first method involves using a memory space equivalent to three of the macro rows interpolated up by a factor of two in both the horizontal and the vertical directions in place of the whole reference image plane interpolated up in size. That is, the memory size is 3×176×16×2×2=33,792 bytes. This reduces the interpolated reference image memory requirement by approximately 67%. This interpolated reference image memory space is best thought of as being divided up into thirds with the middle third corresponding to roughly the same macro row (but interpolated up in size) position as the macroblock being motion estimated for the current image. The motion estimation using this memory arrangement can be implemented as follows:

1.) Copy the first three (top) interpolated macro rows of the reference image data into the previously described memory space (note: this is 3×176×16×2×2 bytes of video data) and calculate the motion estimation for the first two current image macro rows. FIG. 95 depicts the memory space after this step during the first iteration of the first method.

2.) Copy the second third of the interpolated macro row of the reference image data into the memory space where the first third of the interpolated macro row of the reference image data currently resides. (In the first iteration of the algorithm, interpolated macro row 2 is copied with memory holding interpolated macro row 1).

3.) Copy the last third interpolated macro row of the reference image data into the memory space where the second third of the interpolated macro row of the reference image data currently resides. (In first iteration of the algorithm, interpolated macro row 3 is copied into the old interpolated macro row 2 memory space).

4.) Copy the next interpolated macro row of the reference image data into the memory space where the last third of the interpolated macro row of the reference image data currently resides. (In first iteration of the algorithm, interpolated macro row 4 is copied into the old interpolated macro row 3 memory space). FIG. 96 depicts the memory space after this step after the first iteration of the first method.

5.) Calculate the motion estimation for the next current image macro row assuming that its reference position is centered in the middle third of the interpolated reference image memory space.

6.) Return to step 2.

This first method requires that additional time and memory bandwidth be spent performing the copies, but saves memory and computational power.

The second method, like the first method, involves using a memory space equivalent to three of the macro rows interpolated up by a factor of two in both the horizontal and the vertical directions. Unlike the first method, the second method uses modulo arithmetic and pointers to memory to replace the block copies of the first method. The second method is better than the first method from a memory bandwidth point of view, and offers the memory and computational power savings of the first method.

Three macro rows of interpolated reference image data corresponds to 96 horizontal rows of pixels. If, as in method 1, the memory space of the interpolated reference image is divided up into thirds, then the middle third of the memory space begins at the 33rd row of horizontal image data. A pointer is used to locate the middle third of the memory space. Assuming that a number system starts at 0, then the pointer will indicate 32. The motion estimation of the second method using this memory arrangement can be implemented as follows:

1.) Calculate and copy the first three (top) interpolated macro rows of the reference image data into the previously described memory space (3×176×16×2×2 bytes of video data) and calculate the motion estimation for the first two current image macro rows (pointer was initialized to 32).
2.) Set the pointer to 64 and copy the next interpolated macro row of reference image data into memory rows 0–31.
3.) Calculate the motion estimation for the next current image macro row assuming that its reference position is centered in the middle third of the interpolated reference image memory space.
4.) Set the pointer to 0 and copy the next interpolated macro row of reference image data into memory rows 32–63.
5.) Calculate the motion estimation for the next current image macro row assuming that its reference position is centered in the middle third of the interpolated reference image memory space.
6.) Set the pointer to 32 and copy the next interpolated macro row of reference image data into memory rows 63–95.
7.) Calculate the motion estimation for the next current image macro row assuming that its reference position is centered in the middle third of the interpolated reference image memory space.
8.) Return to step 2.

FIG. 97 depicts memory space addressing for three successive iterations of a second motion estimation memory saving technique. The numbers on the left indicate the horizontal memory space addresses. The "X" indicates the center interpolated macro row and pointer location. FIG. 97 gives a conceptual view of how using a pointer and modulo arithmetic makes the memory space appear to "slide" down an image.

The above two methods can be extended to cover extended motion vector data (~±32 pixel searches instead of just the ~±16 pixel searches described previously) by using a memory space covering five interpolated macro rows of reference image data. This larger memory space requirement will reduce the interpolated reference image memory requirement by approximately 45% instead of the 67% savings that using only three interpolated macro rows of reference image data gives. Of course the second method uses modulo 160 arithmetic.

Panning and Zooming

Traditional means of implementing a pan of a video scene is accomplished by moving the camera and lens with motors. The hardware in a preferred embodiment uses an electronic means to accomplish the same effect.

The image scanned by the camera is larger than the image required for processing. An FPGA crops the camera image to remove any unnecessary data. The remaining desired picture area is sent to the processing device for encoding. The position of the desired image can be selected and thus "moved" about the scanned camera image, and therefore has the effect of "panning the camera." The software tells the input acquisition system to change the horizontal and vertical offsets that it uses to acquire the image into memory. The application software provides the users with a wire frame diagram showing the total frame with a smaller wire frame inside of it which the user positions to perform the panning operation.

Traditionally, a zoom in a video scene is accomplished by moving the camera and lens with motors. In a preferred embodiment, electronics are used to accomplish the same effect.

For the preferred embodiment, the image scanned by the camera is larger than the image required for processing. Accordingly, the video encoder/decoder 103 may upsample or subsample the acquired data to provide zoom in/zoom out effects for a video conferencing environment. For example, every pixel in a given image area may be used for the most zoomed in view. A zoom out effect may then be achieved by decimating or subsampling the image capture memory containing the pixel data. These sampling techniques may be implemented in software or hardware. A hardware implementation is to use sample rate converters (interpolating and decimating filters) in the master digital signal processor or in an external IC or ASIC.

Sending High Quality Still Images

A video conferencing system employing the invention may also be used to send high quality still images for viewing and recording to remote sites. The creation of this still can be initiated through the application software by either the viewing or the sending party. The application then captures the image, compresses it, and transmits it to the viewer over the video channel and data channel for maximum speed. In applications using more than one processing device, the still image can be compressed by one of the processing devices while the main video conferencing application continues to run.

In a preferred embodiment, the still is encoded in one of two methods, depending upon user preference—1.) a HVQC still is sent, or ii.) a differential pulse code modulation (dpcm) technique using a Lloyd-max quantizer (statistical quantizer) with Huffman encoding. Other techniques that could be used include JPEG, wavelets, etc.

In applications using more than one processing device, the MD is used to actually do the stills encoding as a background task and then sends the still data with a special header to tell the receiving codec what the data is. The receiver's decoder would then decode the still on its end.

Stills and video conferencing frames are presented to the user in separate application windows. The stills can then be stored to files on the users system which can then be called up later using a software or hardware decoder.

In accordance with the present invention, a video sequence may be transmitted over an ordinary modem data connection, either with another party or parties, or with an on-line service. Upon connection, the modems exchange information to decide whether there is to be a two-way (or more) video conference, a single ended video conference, or no video conference. The modem may then tell the application software to automatically start up the video conference when appropriate. In addition, the system described herein provides the users the capability of starting an application at any point during their conversation to launch a data and/or video conference.

In addition, the video encoder/decoder 103 described herein may be used with a telephone, an audio compression engine and a modem to produce a video answering machine. For this embodiment, a DRAM may be used to store several minutes of data (multiple audio/video messages). The answering machine may play an audio/video message to the caller and may then record a like image. The caller may choose to send either a video sequence or a still image, such as by pushing appropriate buttons on the telephone. The caller may be given the option of reviewing the video sequence or still image by preventing the encoding and transmission of the video until the caller presses an appropriate button to signal its approval.

It is to be understood, however, that additional alternative forms of the various components of the described embodiments are covered by the full scope of equivalents of the claimed invention. Those skilled in the art will recognize that the preferred embodiment described in the specification may be altered and modified without departing from the true spirit and scope of the invention as defined in the following claims, which particularly point out and distinctly claim the subjects regarded as the invention.

Express Mail No.
EM487360442US

65

Dynamic memory:

bit_buf.c 5 1536 Encoder buffer size
 1536 Decoder buffer size master.c

```
        /*
            Allocate input image y, u and v buffers.

The input image will be two lines longer than the coded image.
            This allows us to filter the image with no edge effect on the top
            and bottom of the image. Side edge effects are taken care of by
            the filter function.
        */
10  25696/2     inputY = (Ulong*)malloc(((IMAGE_data.rowsY+2)*IMAGE_data.colsY)/2);
    25520/4     inputU = (Ulong*)malloc(((IMAGE_data.rowsUV+1)*IMAGE_data.colsUV)/4);
    25520/4     inputV = (Ulong*)malloc(((IMAGE_data.rowsUV+1)*IMAGE_data.colsUV)/4);
``` hvqinit.c

```
    6570    imgs.yc = (Ulong**)gmatrix( -1, dim.y, 0, (dim.x>>2)-1, sizeof(Ulong) ); /* current coded
    frame */
15
    6570    imgs.yp = (Ulong**)gmatrix( -1, dim.y, 0, (dim.x>>2)-1, sizeof(Ulong) ); /* prev. coded
    frame */

/* COLOR image planes */

1656    imgs.uc = (Ulong**)gmatrix( 0, dim.yc-1, 0, (dim.xc>>2)-1, sizeof(Ulong) );
    1656    imgs.vc = (Ulong**)gmatrix( 0, dim.yc-1, 0, (dim.xc>>2)-1, sizeof(Ulong) );

1656    imgs.up = (Ulong**)gmatrix( 0, dim.yc-1, 0, (dim.xc>>2)-1, sizeof(Ulong) );
    1656    imgs.vp = (Ulong**)gmatrix( 0, dim.yc-1, 0, (dim.xc>>2)-1, sizeof(Ulong) );
20
```

Total dynamically allocated memory 48444 32-bit words for image and bit buffers (193776 bytes)

Appendix 1:1

Statically allocated memory:

.text   11709 words  (program)
.bss    2304 words  (statically allocated arrays)
.const  636 words  (constants)
.data   3342 words  (nearly all is codebooks)

internal memory:

.itext   438 words  (internal program)
.idata   52 words  (internal data)
.cram1   531 words  (input spatial filter, input video buffer)
.ofilter 529 words  (post spatial filter)

Total external memory requirements of Decoder

48444 + 17991 = 66435 32-bit words

Slave Encoders
---------------

Dynamically allocated memory:

hvqinit.c (byte memory)

25488   imgs.y  = byteMatrix(0, dim.y-1, 0, dim.x-1,byteStart); /* original image */
25488   imgs.yc = byteMatrix(0, dim.y-1, 0, dim.x-1,byteStart); /* original image */
25488   imgs.yp = byteMatrix(0, dim.y-1, 0, dim.x-1,byteStart); /* original image */

/* Allocate the chominance signals out of byte-wide memory */

6408   imgs.u  = byteMatrix( 0, dim.yc-1, 0, dim.xc-1, byteStart);
6408   imgs.uc = byteMatrix( 0, dim.yc-1, 0, dim.xc-1, byteStart);
6408   imgs.up = byteMatrix( 0, dim.yc-1, 0, dim.xc-1, byteStart);
6408   imgs.v  = byteMatrix( 0, dim.yc-1, 0, dim.xc-1, byteStart);
6408   imgs.vc = byteMatrix( 0, dim.yc-1, 0, dim.xc-1, byteStart);
6408   imgs.vp = byteMatrix( 0, dim.yc-1, 0, dim.xc-1, byteStart);

Appendix 1:2

Total dynamically allocated memory:

114912   8-bit bytes for images on each slave encoders.

PingPong.c

512 = 2x256   32-bit words for ping pong buffers

Statically allocated memory:

```
.bss     10983 words  (slave/MD communication and packed Y, U, and V plane recv'd from
master)
.const     992 words  (constants)
.data       12 words
.text    35766 words  (includes program and codebooks:
                              luminance mean removed: 10689
                              color mean:              3563
                              color vq                10689)

.itext     280 words  (program in internal memory)
```

Total memory required by Encoder:

48265  32-bit words + 114912  8-bit bytes

Appendix 1:3 biterror.c

This file contains pseudo code/flow charts of how the decoder may handle bit errors. The bit errors may be missing macro-row packets of video data, or they may be undetected bit errors that the supervisor does not find.

After the decoder pseudo code, a similar presentation of the encoder operation is made. This is done to make it easier to understand how the encoder operates.

```
**************************************************************/ define BIT_ERROR 1
define NO_ERROR  0

/**************************************************************
```

Appendix 2:1

```
/***************************************************************
 ***************************        *****************************
 ************************* Decoder Code ************************
 *************************         ****************************
 ***************************************************************
 **************************************************************/

/**************************************************************** hvq_decoder()

The main program for decoding video bits

****************************************************************/ void hvq_decoder()
{
        initialize data structures and read in codebooks;

/* Look ahead is a non-desctructive look at the bit stream,
                i.e., it does not advance buffer pointers, ... */ look ahead for picture start code (psc);

while (1)
        {
        bit_error_flag = NO_ERROR;

/* Check to see if there is a single psc in the bit stream */
                if (single psc present in the bit stream)
                {
                        /* Remove picture header information such as temporal
                                reference, min and max means of the image, picture type */ extract picture header information;

/* Look for consistent mean information, valid temporal
                                reference, picture extended information, etc... */
                        if (picture header information is consistent)
                        {
                                bit_error_flag = frame_decoder();
                        }
                        else
                                bit_error_flag = undetected_bit_error();
```

Appendix 2:2

```
            if (bit_error_flag == NO_ERROR)
            {
                    send the decoded data to the PC for display;
            }
            else {
                    do      not update the display;
            }
    }

/* If there was a problem while decoding the image, or
            there is no psc waiting in the bit stream */
    if ((bit_error_flag == BIT_ERROR) OR not single psc present in the bit stream)
    {
            /* Wait until a still image is sent to the decoder */
            while (last 16 bits read are not equal to single psc and still image psc)
            {
                    read a bit from the bit stream;
            }
    }
    }
}

/************************************************************************* frame_decoder()

The program for reading the bit stream, and decoding
one frame of actual video data, either still or video.

*************************************************************************/ int frame_decoder()
{
        /* Tell the decoder that no macro-rows have been decoded */
        reset which macro-rows have been decoded;

/* Check for valid macro row address in the bit stream */
        look ahead in the bit stream;
```

Appendix 2:3

```
        while (there is another macro-row video packet or still image encoded data packet)
        {
                get macro row address;

if (duplicated macro row address)
                {
                        Undetected bit error or lost macro-row packet that had psc info;

undetected_bit_error();
                        return BIT_ERROR;
                }
                else
                {
                        if (still image encoded data)
                        {
                                local_error_flag = still_macro_row_decoder();

}
                        else if (video image encoded data)
                        {
                                local_error_flag = video_macro_row_decoder();
                        } if (local_error_flag)
                        {
                                return BIT_ERROR;
                        }
                        else if (interleaving video and still macro row within a frame)
                        {
                                /* Interleaving of video and still data is not currently
                                        allowed, but may be allowed at some time in the future */ return BIT_ERROR;
                        }
                        else
                        {
                                /* If there are fill bits, they should be zero and should
                                        be less than 8 of them before the next macro-row address */
                                remove fill bits if there are any;
                        }

}
                look ahead at next 16 bits in the bit stream;
        }
```

Appendix 2:4

```
     if (there are macro-rows that have not been decoded)
     {
             /* The supervisor has indicated that there was a bit error */
             if (video encoded data)
5            {
                     /* Perform error concealment which currently is thought
                             to be copying the macro-rows from the previously coded
                             image, but could be other techniques as well */ copy missing macro-rows from previously coded image;
             }
             else
             {
                     /* still image encoded data can't have missing macro-row data
                             retransmit missing macro-rows or encode another still image? */
10                   undetected_bit_error();
                     return BIT_ERROR;
             }
     } if (look ahead data indicates a new single psc)
     {
             return NO_ERROR;
     }

15   else if (look ahead data indicates refresh data)
     {
             /* refresh the image */ return (refresh_decoder());
     }
     else
     {
             /* Unknown field in the bit stream */
             undetected_bit_error();
             return BIT_ERROR;
     }
20   }
```

Appendix 2:5

```
/*********************************************************************** undetected_bit_error()

Routine that is called when something unexpected appears in the
bit-stream that is not recoverable.

***********************************************************************/ int undetected_bit_error()
{
        signal remote encoder to send a new still image;
        return BIT_ERROR;
}

/*********************************************************************** refresh_decoder()

The routine for refreshing the image.

***********************************************************************/ int refresh_decoder()
{
        while (!psc in look ahead data)
        {
                /* EXPAND into vq, scalar, diff. or absolute */
                get macro row address of the data;
                get encoded data;
                if (not valid encoded data)
                {
                        undetected_bit_error();
                        return BIT_ERROR;
                }
        }
}
/*********************************************************************** video_macro_row_decoder()

The routine for decoding a macro-row of video encoded data.

***********************************************************************/
```

Appendix 2:6

```
int video_macro_row_decoder()
{
        /* Determine if you are scanning from top to bottom or bottom to top */
        get scan direction;
        for (each of the 11 16x16 blocks)
        {
                local_error_flag = hierarchical_decoder( one 16x16 block );

if (local_error_flag implies invalid huffman symbol OR invalid vq address)
                {
                        return (undetected_bit_error());
                }
        }

}
/***************************************************************************** still_macro_row_decoder()

The routine for decoding a macro-row of still encoded data.

*****************************************************************************/ int still_macro_row_decoder()
{
        for (each of the 176 4x4 blocks)
        {
                local_error_flag = still_vq_decoder (one 4x4 block);

if (local_error_flag == invalid huffman symbol OR invalid vq address)
                {
                        return (undetected_bit_error());
                }
        }

}
/***************************************************************************** hierarchical_decoder()

The routine for hierarchically decoding each 16x16 block. if necessary,
```

Appendix 2:7

```
        each 16x16 is iteratively decomposed into four sub-blocks until the
        block size is 4x4.

5       **********************************************************************/ int hierarchical_decoder()
        {
                local_hit16_flag = decoder16 (one 16x16 block);

if (!local_hit_flag)
                {
                        decompose into four 8x8 blocks;
                        for (each 8x8 block)
                        {
10                              local_hit8_flag = decoder8 (one 8x8 block);
                                if (!local_hit8_flag )
                                {
                                        decompose into four 4x4 blocks;
                                        for (each 4x4 block)
                                        {
                                                decoder4 (one 4x4 block);
                                        }
                                }
                        }
                }
15      }

/********************************************************************** decoder16()

This routine decodes a 16x16 block using the different 16x16 coders.

**********************************************************************/

20      decoder16()
        {
                hitFlag = read a bit from the bit stream;
                if (hitFlag)
                {
                        copy 16x16 Y block from previously coded image;
                        copy 8x8 U and V blocks from previously coded color planes;
                        return (NO_ERROR);
```

Appendix 2:8

```
            }
            else
            {
                    hitFlag = read a bit from the bit stream;

if (hitFlag)
                    {
                            look for a valid huffman code for the motion vector cache position;

if (cache hit)
                            {
                                    update the cache;
                                    extract the Y motion vector from the cache;
                            }
                            else
                            {
                                    update the cache;
                                    extract the motion vector from the bit stream;
                            }
                            form the U,V motion vectors from the Y motion vector;
                            copy the blocks from the previously coded data at the motion vector offset;
                    }
            }
    }

/* Decoder8 and decoder4 are not specified here yet */

/*****************************************************************
     *****************************************************************
     *************************        *******************************
     *************************  Encoder Code  ************************
     *************************        *******************************
     *****************************************************************
     ****************************************************************/

/**************************************************************** hvq_encoder()

****************************************************************/
```

Appendix 2:9

```
void hvq_encoder()
{
        initialize data structures and read in codebooks;

program the video A/D with frame rates and filter options;

synchronize the master and slave vortex encoders;

while (1)
        {
                both master and slave get images;

exchange frame numbers;

if (master frame number not equal to slave frame number)
                {
                        determine who needs to drop frames and acquire new frames to catch up;
                } both the master and slave compute the scene change mean square error;

if (master vortex or slave vortex indicates a scene change occurred)
                {
                        tell both encoders to use the still image encoder;

reset boundary to 5/4 macro-rows for master/slave, respectively;

put picture header information into the bit stream;

still_frame_encoder();
                }
                else
                {
                        exchange master and slave scene change mean square error;

determine if boundary needs to be adapted;

if (boundary needs to be adapted)
                        {
                                exchange previously coded macro-row data;
                                exchange scene change mse array for use with background detector;
                        }
```

Appendix 2:10

```
                    put picture header information into the bit stream;

video_frame_encoder();

5                   if (there are extra bits are left over)
                    {
                            refresh_encoder();

}
                    else
                    {
                            reset the scalar refresher state;
                    }
            }

10          }

}

/************************************************************************** video_frame_encoder()

The routine for encoding a frame of video image.

15  **************************************************************************/ int video_frame_encoder()
    {
            for (each macro-row)
            {
                    reset the caches;
                    put macro-row address into the bit stream;

for (each 16x16 block)
                    {
20                          hierarchical_encoder (one 16x16 block);
                    }
            }

Update threshold information based on buffer fullness;

}
```

Appendix 2:11

```
/********************************************************************* still_frame_encoder()

The routine for encoding a frame of still image.

*********************************************************************/ int still_frame_encoder()
        {
                for (each macro-row)
                {
                        reset the caches;
                        put macro-row address into the bit stream;

/* the codebooks used for Y, U and V can be different */
                        for (each 4x4 Y block)
                        {
                                still_vq_encoder (one 4x4 block);

}
                        for (each 4x4 U block)
                        {
                                still_vq_encoder(one 4x4 block);
                        }
                        for (each 4x4 V block)
                        {
                                still_vq_encoder(one 4x4 block);
                        }

}

}
/********************************************************************* still_vq_encoder()

The routine for encoding one 4x4 block of a still image.

*********************************************************************/
```

Appendix 2:12

```
still_vq_encode()
{
        if (4x4 block is found in the stack cache)
        {
                encode 4x4 block with the cache entry;
                return ( TRUE );
        }
        else
        {
                encode this 4x4 block with a given codebook;
        }
}

/***************************************************************** refresh_encoder()

The routine for refreshing a fraction of an image frame
to avoid buffer underflow.

*****************************************************************/ refresh_encoder()
{
        if (scalar refresh state active)
        {
                invoke the slow (but high quality) scalar refresher;
        }
        else
        {
                invoke the fast vq refresher;
                update the state transition threshold for the scalar refresher;
        }
}

/***************************************************************** hierarchical_encoder()
The routine for hierarchically encoding each 16x16 block. if necessary,
each 16x16 is iteratively decomposed into four sub-blocks until the
block size is 4x4.

*****************************************************************/
```

Appendix 2:13

```
int hierarchical_encoder()
{
        local_hit16_flag = encoder16 (one 16x16 block);

if (!local_hit16_flag)
        {
                decompose into four 8x8 blocks;
                for (each 8x8 block)
                {
                        local_hit8_flag = encoder8 (one 8x8 block);
                        if (!local_hit8_flag )
                        {
                                decompose into four 4x4 blocks;
                                for (each 4x4 block)
                                {
                                        encoder4 (one 4x4 block);
                                }
                        }
                }
        }
}

/*********************************************************************** encoder16()
The routine for encoding one 16x16 block. It returns the status of the
encoding process (hit/miss flag).

***********************************************************************/ int encoder16()
{
        if (background_test( 16x16 ))
        {
                encode this block as a background block;
                encode the color components (U and V) also as background blocks;
                return (TRUE);
        }
        else
        {
                if ( MOTION_CACHE16 = motion_cache_test(16x16) )
                {
                        found a motion vector in the cache that passes the threshold test;
                        update the cache content;
```

```
}
else if ( BLOCK_MATCH16 = block_match_test(16x16) )
{
        /*      block_match_test can be full-search ot 3-step search */ found a motion in the cache that passes the threshold test;
        update the cache content;

} if (MOTION_CACHE16 || BLOCK_MATCH16)
{
        /*
                at this point, it is certain that the luminance component
                can be coded with the motion vector. But we need to test
                for the color componenets with the same motion vector
        */ encode the 16x16 block with the resulting motion vector (MV);

/* COLOR components: both U and V have block size of 8x8 */ if (U and V share the MV of Y)
        {
                /* do nothing */
        }
        else if (U shares the MV of Y and V does not)
        {
                find the motion vector of V starting at the MV of Y;
        }
        else if (V shares the MV of Y and U does not)
        {
                find the motion vector of U starting at the MV of Y;

}
        else /* both U and V do not share MV with Y */
        {
                find the motion vector of U starting at the MV of Y;
                find the motion vector of V starting at the MV of Y;
        } encode U and V with the resulting motion vectors;

return (TRUE);
```

Appendix 2:15

```
                }
                else
                {
                        encoder16 fails to encode this 16x16 block;
                        return (FALSE);
                }
        }
}

/*************************************************************************** encoder8()
The routine for encoding one 8x8 block. It returns the status of the
encoding process (hit/miss flag).

***************************************************************************/ int encoder8()
{
        if (background_test( 8x8 ))
        {
                encode this block as a background block;
                encode the color components (U and V) also as background blocks;
                return (TRUE);
        }
        else
        {
                if ( MOTION_CACHE8 = motion_cache_test(8x8) )
                {
                        found a motion vector in the cache that passes the threshold test;
                        update the cache content;

}
                else if ( BLOCK_MATCH8 = block_match_test(8x8) )
                {
                        /*      block_match_test can be full-search ot 3-step search */
                        found a motion in the cache that passes the threshold test;
                        update the cache content;

} if (MOTION_CACHE8 || BLOCK_MATCH8)
                {
                        /*
```

Appendix 2:16

```
                                at this point, it is certain that the luminance component
                                can be coded with the motion vector. But we need to test
                                for the color componenets with the same motion vector
                            */
5                           encode the 8x8 block with the resulting motion vector (MV);

/* COLOR components: both U and V have block size of 4x4 */ if (U and V share the MV of Y)
                            {
                                    /* do nothing */
                            }
                            else if (U shares the MV of Y and V does not)
                            {
                                    find the motion vector of V starting at the MV of Y;
10                          }
                            else if (V shares the MV of Y and U does not)

{
                                    find the motion vector of U starting at the MV of Y;

}
                            else /* both U and V do not share MV with Y */
                            {
                                    find the motion vector of U starting at the MV of Y;
                                    find the motion vector of V starting at the MV of Y;
15                          } encode U and V with the resulting motion vectors;

return (TRUE);

}
                    else
                    {
                            encoder8 fails to encode this 8x8 block;

20                          encode each 4x4 U and 4x4 V using a 16-dim VQ;

/* So this is the last level the the
                                    U and V components needed to be tested */ return (FALSE);
                    }
            }

}
```

Appendix 2:17

```
/**************************************************************** encoder4()
The routine for encoding one 4x4 block. It always returns TRUE.

****************************************************************/ int encoder4()
{
        if ( MOTION_CACHE4 = motion_cache_test(4x4) )
        {
                found a motion vector in the cache that passes the threshold test;
                update the cache content;

}
        else if ( BLOCK_MATCH4 = block_match_test(4x4) )
        {
                /*      block_match_test can be full-search or 3-step search */
                found a motion in the cache that passes the threshold test;

update the cache content;

}
        if (MOTION_CACHE4 || BLOCK_MATCH4)
        {
                encode the 4x4 block with the resulting motion vector (MV);
                return (TRUE);

}
        else
        {
                encode each 4x4 block with a mean-removed VQ;
                return (TRUE);

}

}
```

Appendix 2:18

```
                    found a motion in the cache that passes the threshold test;
                    update the cache content;

} if (MOTION_CACHE16 || BLOCK_MATCH16)
            {
                    /*
                            at this point, it is certain that the luminance component
                            can be coded with the motion vector. But we need to test
                            for the color componenets with the same motion vector
                    */ encode the 16x16 block with the resulting motion vector (MV);

/* COLOR components: both U and V have block size of 8x8 */ if (U and V share the MV of Y)
                    {
                            /* do nothing */
                    }
                    else if (U shares the MV of Y and V does not)
                    {
                            find the motion vector of V starting at the MV of Y;
                    }
                    else if (V shares the MV of Y and U does not)
                    {
                            find the motion vector of U starting at the MV of Y;
                    }
                    else /* both U and V do not share MV with Y */
                    {
                            find the motion vector of U starting at the MV of Y;
                            find the motion vector of V starting at the MV of Y;
                    } encode U and V with the resulting motion vectors;

return (TRUE);

}
            else
            {
                    encoder16 fails to encode this 16x16 block;
                    return (FALSE);
            }
    }
```

Appendix 2:19

```
/************************************************************************ encoder8()
The routine for encoding one 8x8 block. It returns the status of the
encoding process (hit/miss flag).

*************************************************************************/ int encoder8()
{
        if (background_test( 8x8 ))
        {
                encode this block as a background block;
                encode the color components (U and V) also as background blocks;
                return (TRUE);
        }
        else
        {
                if ( MOTION_CACHE8 = motion_cache_test(8x8) )
                {
                        found a motion vector in the cache that passes the threshold test;
                        update the cache content;

}
                else if ( BLOCK_MATCH8 = block_match_test(8x8) )
                {
                        /*      block_match_test can be full-search ot 3-step search */
                        found a motion in the cache that passes the threshold test;
                        update the cache content;

} if (MOTION_CACHE8 || BLOCK_MATCH8)
                {
                        /*
                                at this point, it is certain that the luminance component
                                can be coded with the motion vector. But we need to test
                                for the color componenets with the same motion vector
                        */
                        encode the 8x8 block with the resulting motion vector (MV);
```

Appendix 2:20

```
                    /* COLOR components: both U and V have block size of 4x4 */ if (U and V share the MV of Y)
                    {
 5                          /* do nothing */
                    }
                    else if (U shares the MV of Y and V does not)
                    {
                            find the motion vector of V starting at the MV of Y;
                    }
                    else if (V shares the MV of Y and U does not)

{
                            find the motion vector of U starting at the MV of Y;

10                  }
                    else /* both U and V do not share MV with Y */
                    {
                            find the motion vector of U starting at the MV of Y;
                            find the motion vector of V starting at the MV of Y;
                    } encode U and V with the resulting motion vectors;

return (TRUE);

}
15          else
            {
                    encoder8 fails to encode this 8x8 block;

encode each 4x4 U and 4x4 V using a 16-dim VQ;

/* So this is the last level the the
                            U and V components needed to be tested */ return (FALSE);
            }
20    }
    }
```

Appendix 2:21

```
/************************************************************************* encoder4()
The routine for encoding one 4x4 block. It always returns TRUE.

*************************************************************************/ int encoder4()
{
        if ( MOTION_CACHE4 = motion_cache_test(4x4) )
        {
                found a motion vector in the cache that passes the threshold test;
                update the cache content;
        }
        else if ( BLOCK_MATCH4 = block_match_test(4x4) )
        {
                /*      block_match_test can be full-search ot 3-step search */
                found a motion in the cache that passes the threshold test;

update the cache content;

}
        if (MOTION_CACHE4 || BLOCK_MATCH4)
        {
                encode the 4x4 block with the resulting motion vector (MV);
                return (TRUE);

}
        else
        {
                encode each 4x4 block with a mean-removed VQ;
                return (TRUE);
        }

}
```

Appendix 2:22

Express Mail No.
EM487360442US

```
/* This is psuedo code for the HVQC encoder.  It outlines the basic steps
        involved in the encoding process without going into the actual HVQC
    subroutines.

encodeImage(){
        while (!codingDone)
        {
/*
test to see if the previously coded image (pci) takes up too much channel capacity to be
immediately followed by another image.

The capacity or bits per frame is calculated from the bits/sec and
frames/sec.  In the capacity calculation there is a divide by 2 is
because there are two processors, each of which gets half the bits.
Therefore, each of the capacity multiplies in the following section
have an addition multiplication factor of 2 (i.e., ranges are 1.5 to
2.5, 2.5 to 3.5, and greater than 3.5

*/

/* Skip is an integer.  The -1.0 is to downward bias the number of frames
to be skipped.
*/

Skip=(rd.yuv_rate/(2*capacity))-1.0;

if ( Skip > NumFramesToSkip)
            NumFramesToSkip=Skip;

/* Get the bit rate so that the Capacity can be appropriately
                computed once per frame per processor */
```

Appendix 3:1

```
        /* Compute the capacity or bits per frame from the bits/sec and
frames/sec.
        Recall that the frame rate is given in terms of a divisor into 30
fps.
        The divide by 2 is because there are two processor, each of
which gets half
        the bits.
        */

/* Update the buffer size based on the capacity and frame rate: divided
                the bit rate by two because there are two encoders */

/* Force the buffer size to be determined by the capacity so that it will
                always be able to hold 4 1/2 frame pictures.  At 15 fps and 19200
this
                becomes 2560 bits.  This is a test to see if the buffer should be
increased
                as the frame rate is reduced
        */

BufferSize = 3.75*capacity;

/* Determine the number of bits per frame */
        /***** reset counters to zero after each video or still frame ****/
        /****** scene change test based on a MSE thresholds *******/
        /* If a scene change is being forced by the remote decoder then
                adjust the scene_mse_per_pixel so that the other slave
                will also be forced to scene change.  This is a precaution
                just in case the other slave encoder did not  receive the
                force scene change message from the MD processor
        */

/* Exchange of scene change mse/pixel values */

/* Force both master/slave scene change at the same time */

/* Start the timer encoding the frame */ if(scene_change)    /* if_123 */
        {
```

Appendix 3:2

```
                        /* encode image as a still image */ cumulative_refresh_bits = 0; /* set back to use vq refresh */

/*
 5                                      Reset the adaptible boundary to be 80/64 split.
        The
                                        parameter passed here should be the same as the
        one in
                                        initEncoderState.
                                */

/* Communication to synchronize the se1 and se2 processors,
10                              no real information is exchanged. This makes sure the
                                picture start code is sent first before any other macro row
        data
                        */
                        /* Wait until the buffer fullness equals buffersize before encoding
        again */

/* Skip two frames because the one old frame is already packed
        in the
                                slave memory and the MD has a second old frame in its
15      memory. Dropping
                                two will get us a new frame
                        */
                }/* if_123: if scene_change */
                else
                {
                        /* encode image as a moving image */

/*************************************************************/
                        /* Compute New Image Boundary based on mse/pixel values */
20
        /*************************************************************/
```

Appendix 3:3

```
                    /* the two slave encoders, se1 & se2, are set with compile
        switches
                    during the make process to be a MASTER and a SLAVE.  Do
        not
                    confuse this with the master decoder and the slave encoder
5                   terminology */
                    #if MASTER /* i.e., se1 */

/* Exchange of cumulative_refresh_bits */
                    /* DO NOT adapt boundary when SCALAR refresh is active */
                    if( cumulative_refresh_bits <
        TOO_MANY_VQ_REFRESH_BITS )
                            {
                                    #if AWS /* adaptive working model at high motion frame
10      */

/* set to use AWS if overall scene_mse > 600 */
                                    /* NOTE: The Slave should have the same status on
        SET_AWS */ if( ((scene_mse_per_pixel+otherMsePerPixel)*0.5) >
        400 )
15                                  {
                                            /* use AWS in bit stream */
                                            SET_AWS = 1;
                                    }
                                    else
                                    {
                                            /* do not use AWS in bit stream */
                                            SET_AWS = 0;
                                    }

20                                  #endif /* AWS */

/* Compute boundary adaptation */ mseRatio = scene_mse_per_pixel/(otherMsePerPixel +
        scene_mse_per_pixel);
```

Appendix 3:4

```
                                        /*
                                            By putting in extra test in the OR statement if (mseRatio < = MAX_MSE && GEncoderState-
    5        > macroRows < 5), the boundary can be slowly INCREASED back to
             the
                                            center (i.e., 5 macroRows for       the master and
             4
                                            for the slave for QCIF format).

For QCIF image:

10                                            DISP_ROWS > > 4 = 9    |
                                                 DISP_ROWS > > 5 = 4    | = = >  9 - 4 =
             5

For 128x96 image:

DISP_ROWS > > 4 = 6    |
                                                 DISP_ROWS > > 5 = 3    | = = >  6 - 3 =
             3
   15                                   */

/*

By putting in extra test in the OR statement else (mseRatio > = MIN_MSE &&
        GEncoderState- > macroRows > 5),
   20
                                            the boundary can be slowly DECREASED
             back to the
                                            center (i.e., 5 macroRows for        the
             master and 4
                                            for the slave).
                                        */
                                        /* Otherwise, don't adapt the boundaries */
```

Appendix 3:5

```
                    } /* if cumulative_refresh_bits */ else        /* if se2 */

/* exchange scene change flags */
5
                    /* SLAVE:
                          In order for the master and slave not adapting
                          the boundary at the same time when SCALAR refresh is
            active.
                          The individual processor must know the cumulative bits
                          of the other processor
                    */

10                  /* recieve and send cumulative_refresh_bits */

/* DO NOT adapt boundary when SCALAR refresh is active */
                    if( cumulative_refresh_bits <
          TOO_MANY_VQ_REFRESH_BITS )

#if AWS /* adaptive working model at high motion frame
            */

/* set to use AWS if overall scene_mse > 600 */
15                       /* NOTE: The Slave should have the same status on
            SET_AWS */
                         if( ((scene_mse_per_pixel+otherMsePerPixel)*0.5) >
            400 )
                         {
                              /* use AWS in bit stream */
                              SET_AWS = 1;
                         }
                         else
20                       {
                              /* do not use AWS in bit stream */
                              SET_AWS = 0;
                         } endif /* AWS */
```

Appendix 3:6

```
/* Compute boundary adaptation */

/*
        By putting in extra test in the OR statement
    if (mseRatio <= MAX_MSE && GEncoderState->macroRows < 5),
        the boundary can be slowly INCREASED back to the
        center (i.e., 5 macroRows for the master and 4
        for the slave for QCIF format).

For QCIF image:

DISP_ROWS>>4 = 9   |
            DISP_ROWS>>5 = 4  |  ==>  9 - 4 = 5

For 128x96 image:

DISP_ROWS>>4 = 6   |
        DISP_ROWS>>5 = 3   |  ==>  6 - 3 = 3
*/

/*
        By putting in extra test in the OR statement
    else (mseRatio >= MIN_MSE && GEncoderState->macroRows > 5),
        the boundary can be slowly DECREASED back to the
        center (i.e., 5 macroRows for the master and 4
```

Appendix 3:7

```
                              for the slave).
                  */
                  /* Otherwise, don't adapt the boundaries */ endif /* #if MASTER at IF_666 */

/************ NOT a scene change ===> video
************************/

/* Communication to synchronize the se1 and se2 processors,
                          no real information is exchanged.  This makes sure the
                          picture start code is sent first before any other macro row
         data
                   */ requestSceneChangeInfo(0);

if ADAPT_ALPHA /* this is to adapt alpha (see thr.h) to
         control buffer fullness */ overall_scmse =
         (scene_mse_per_pixel+otherMsePerPixel)*0.5;

if (overall_scmse > 300.0 )
                                  alpha = 0.7;
                          else if (overall_scmse > 200.0 )
                                  alpha = 0.6;
                          else if (overall_scmse > 150.0 )
                                  alpha = 0.5;
                          else if (overall_scmse > 100.0 )
                                  alpha = 0.4;
                          else if (overall_scmse > 75.0 )
                                  alpha = 0.3;
                          else
```

Appendix 3:8

```
                                    alpha = 0.2;

beta = 1.0 - alpha;

5                              #endif
                                timvideo = get_time(); /* start timer to see how long encode
            takes */
                                video_encode( coder, &mac_hdr ); /* call subroutine to encode
            the video */ timvideo = get_time()-timvideo; /* stop timer for encode, this
            will tell us
                                if we have enough time to refresh */
10
                                /****** post processing, book keeping, update buffer, refresh,
            *******/

/*** update buffer fullness based on the current bit rate ***/

/************************** refresh ********************/

/* Amount we could refresh is determined by the difference of
                                        the allowed bits per frame and the number of bits we used
15                                      to sencode the frame
                                */
                                        /* If a new frame is available then do not refresh */
                                        /* If there is no time for refresh and this occurs
                                                three times in a row, then decrement the
            cumulative_refresh_bits
                                                because we don't want to continue with scalar
            refresh in this case,
                                                but would rather continue refreshing with vq
            refresh
20                                      */

/* If there is no time to refresh more than three
            times than reset cumulative refresh bits to 0
                                                and start from beginning with vq refresh
                                        */
                                } /* if_123: else of if scene_change */
```

Appendix 3:9

```
        /* Determine the number of RT frames to skip based on the bit-rate
           to avoid buffer overflow */

/* Swap the coded and the previously coded images */

} /* WHILE !codingDone */

/****************** end of encoding ******************/
} /* encodeImage */
```

Appendix 3:10

Express Mail No.
EM487360442US

```
/************************************************************
Title: Compute threshold, std, and mean of an image block.
float computeMseTx2d( uchar **img, int r, int c, VEC_SIZ *wrd,
              float gamma, float alpha, float beta, float *mean, float *std )

img is the image in which std and mean will be extracted.

r and c are the image indices.

wrd specifies the image block size mean and std are the returned values

Returned Value: the threshold

Description:
     This routine computes the threshold to encode a given image block
     This threshold is s functional of the standard dev. of the image block
     and a number of other variables (see thr.h section later in this file
     for detailed description of these variables).
This routine is called by the still encoder and by the video encoder for
all levels of the hierarchy.
************************************************************/

/* computeMsetx2d : compute the threshold for ach block being encoded */ float computeMseTx2d( uchar **img, int r, int c, VEC_SIZ *wrd,    float gamma,
float alpha, float beta, float *mean, float *std )
{
          /* compute the mean and std of x */
          int i, j;
          Uint x;
          Uint imean=0,istd=0;

for(i=r; i<r+wrd->p; i++)
          {
                    for(j=c; j<c+wrd->p; j++)
                    {
                              x = (Uint) img[i][j];
                              imean += x;
                              istd += x*x;
```

Appendix 4:1

```
                    }

*std = istd;

/* Divide by the block size (multiple by 1/blocksize) */
                    std[0] = std[0]*wrd->1_1;

/* Divide by the block size (multiple by 1/blocksize) */
                    mean[0] = mean[0]*wrd->1_1;

std[0] = sqrt( (double) (std[0] - (mean[0]*mean[0])) );

if( std[0] < 1.0 )
                            std[0] = 1.0;

/* now calculate threshold for the block and return */
                    /* gamma is adjusted each macro block in intra_adapt subroutine */
              return( wrd->1 * gamma * (std[0]*alpha+beta) );
              }

/*******************************************************************
              Title:  Intra-frame threshold adaptation @Prototype:

void intra_adapt( int tRate, int blockCount )

tRate is the cumulative bit-rate to encode a fractional frame. This
                    value is reset to 0 after each frame.

blockCount is the total number of blocks encoded in a frame. This
                    value is also reset after each frame.

Description:

This routine adapt the thresholds for encoding a video frame based on
                    the buffer fullness, defined as <buffer_mode> in this program.
```

Appendix 4:2

(1) Compute buffer fullness <buffer_mode>:
   The buffer fullness is based on three parameters:
   (1) the real-time buffer (defined as BufferFullness)
   (2) the measured frame time up to encode the current block (defined as deltaTime).
   (3) the estimated frame time up to current block (defined as fractional_frame_time).

The EFFECTIVE buffer fullness is computed based on 5 cases:
   case 1: based on bits only, with a focus switch (motion tracking) for trading quality and frame-rate.
   case 2: based on max of bits and time
   case 3: based on sum of bits and time
   case 4: based on time only The default is case 1.

(2) Compute the threshold based on buffer fullness <buffer_mode>:
   The thresholds bgth16[0,1,2] (as shown in Figure below) are
   the ranges of thresholds that are used with buffer fullness to
   determine a meaningful threshold value for encoding the current
   macro-row or current block depending on whether the thresholds are
   adapted once per macro-row or once per block.

THRESHOLD

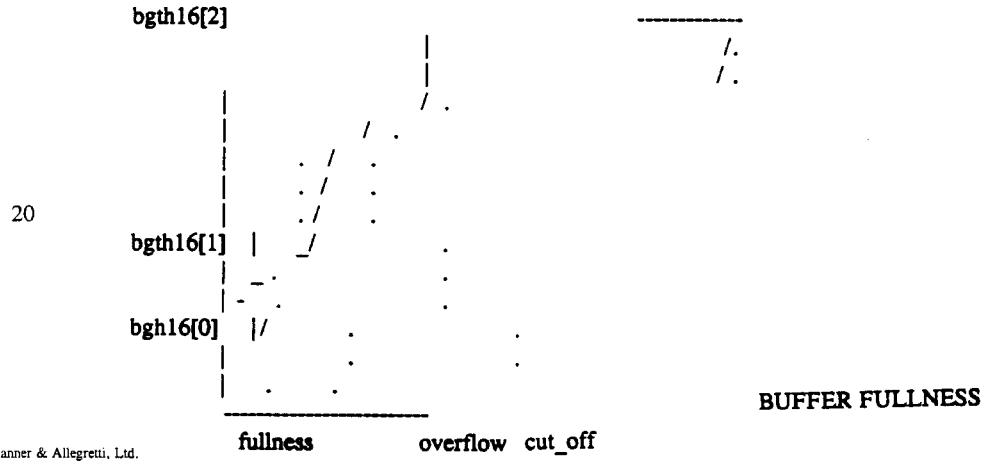

Appendix 4:3

```
bgth16[0,1,2] are used to encode motion and background blocks
at different levels of the coder, where as s_m4[0,1,2] are used
for encoding the 4x4 spatial background blocks.

for a given bufferfullness <buffer_mode>, there are three cases:

case 1: Small threshold
        bufer_mode < fullness_cutoff (this value is typically 0.75)
        find a threshold between bgth16[0] and bgth16[1].

case 2: Large threshold
        fullness_cufoff < buffer_mode < overflow
        find a threshold between bgth16[1] and bgth16[2].

case 3: Overflow threshold
        buffer_mode > overflow (this value is typically 0.95)
        set threshold = buffer_overflow_th;
*******************************************************************/
volatile float ext_buffer_mode;   /* bufferfullness used by the pingpong buffer (see pingpong.c) */
void intra_adapt( int tRate, int blockCount)
{
        volatile float time_factor;                     /* processor time
bufferfullness */
        volatile float bit_rate_factor;                 /* bit-rate bufferfullness */
        volatile float buffer_mode;                     /* effective bufferfullness */
        volatile float deltaTime;                       /* cumulative
processor time */
        volatile float fractional_capacity;             /* estimated capacity at block i */
        volatile float fractional_frame_time;  /* estimated processor time at block i */
        static float old_buffer_mode=0.5;
        float modifiedBufferFullness;
        float expectedBits;    /* The average number of bits to have encoded after
blockCount */
        float cumulativeBits;  /* Number of bits that have been used */
        float bitScale=.50;
```

Appendix 4:4

```
/*------ Find buffer fullness -----------*/
modifiedBufferFullness = BufferFullness ;
modifiedBufferFullness = BufferFullness + rd.yuv_rate;

/********* Real-time buffer_mode computation **********/

/* Create a buffer fullness based on bit-rates */
bit_rate_factor = ((float) modifiedBufferFullness )*inv_BufferSize;

/* Create another buffer fullness based on the timing */
fractional_frame_time = (1.0/(frame_rate*GEncoderState-
    >numBlocks))*blockCount;

/** measured frame time up to block i (in sec) */
deltaTime = ((float) (get_time() - sTimeN)) * 0.0000001;

time_factor = 0.1*deltaTime / fractional_frame_time;

/* determine how to find the effective buffer fullness */
switch (bufferMode)
{
    case 1:
            /* Look at bits only: tmodeScale defaults to 1.0 and is
               changeable with the focus command line parameter
            */
        /*      buffer_mode = tmodeScale*bit_rate_factor; */
        /*      buffer_mode = bitScale + tmodeScale*bit_rate_factor;
        */

/*      buffer_mode = bit_rate_factor; */
                buffer_mode = bit_rate_factor;
                buffer_mode *= tmodeScale;
                break;
    case 2:
            /* Look at max of bits and time */
            buffer_mode = MAX(bufferRateScale*bit_rate_factor,
bufferTimeScale*time_factor);
            break;
```

Appendix 4:5

```
                    case 3:
                        /* Look at sum of bits and time */
                        buffer_mode = bufferRateScale*bit_rate_factor +
        bufferTimeScale*time_factor;
                        break;
                    case 4:
                        /* Look at time only */
                        buffer_mode = bufferTimeScale*time_factor;
                        break;
                    default:
                        /* Look at bits only: tmodeScale defaults to 1.0 and is
                        changeable with the focus command line parameter */
                        buffer_mode = tmodeScale*bit_rate_factor;
                        break;
                }

/*------ Find threshold based on buffer fullness ------------*/
        /* check over and under limit (FILE-based only) */
        if (buffer_mode < 0.0 )
                buffer_mode = 0.0;

/* Case 1: small threshold */
        if ( buffer_mode <= fullness_cutoff ) /* slow adaptation */
        {
                float tmp = (1.0 - buffer_mode*fullness_cutoff_inv);
                gamma[BG16] =    (bgth16[0] - bgth16[1])*tmp + bgth16[1];
                gamma[SBG4] = (s_m4[0] - s_m4[1])*tmp + s_m4[1];
                /*
                        SBG4, BG16 are id numbers for each specific predictors
                        (see constant.h section at end of this file).
                */
        }

/* Case 2: overflow threshold */
        else if (buffer_mode >= buffer_overflow )
        {
                buffer_mode = buffer_overflow;
                gamma[BG16] = bgth16_overflow;
        }
```

Appendix 4:6

```
        /* Case 3: large threshold */
        else /* rapid adaptation */
        {
                float tmp=1.0 - buffer_mode/buffer_overflow;
                gamma[BG16] = (bgth16[1] - bgth16[2])*tmp + bgth16[2];
                gamma[SBG4] = (s_m4[1] - s_m4[2])*tmp + s_m4[2];
        } ext_buffer_mode = buffer_mode;
        /* Save buffer_mode */
        old_buffer_mode = buffer_mode;
} /* intra_adapt */

/*********************************************************************
**********************************************************************
**********************************************************************
*/

/* *****************************************************************
CONSTANT.H SECTION
*/

/*
        The followings are CODER16, CODER8, CODER4 are index ID's used
        to reference the variables (e.g, caches, vector sizes) that associated
        three different block sizes: 16x16, 8x8, 4x4.
*/
#define CODER16  0
#define CODER8   1
#define CODER4   2

/*
        The followings are index ID's to reference variables
        associated with different predictors.  For example, Thr[STILL4] is
        the threshold to code each still image 4x4 block.
```

Appendix 4:7

```
*/
#define    BG16    0        /* background coder 16x16 */
#define    M16     1        /* motion coder 16x16 */
#define    BG8     2        /* background coder 8x8 */
#define    M8              3           /* motion coder 8x8 */
#define    M4              4           /* motion coder 4x4 */
#define    VQ4     5                   /* vq coder 4x4 for moving images */
#define    STILL4  6                   /* still image coder 4x4 (both cache and
VQ) */
#define    SBG4    7                   /* spatial backgroung coder 4x4 (only the mean
                                           is used to code each vq block
*/
```

```
/* **************************************************************** */
/* **************************************************************** */
/* **************************************************************** */
/* THR.H SECTION
```

Title: Pre-defined thresholds for encoding video and images
Description:
        This file contains all the thresholds to encode video and images.
        Some thresholds are used in conjunction with intra_adapt() and
        buffer-fullness to simulate a fixed-rate/variable-quality coder.
        Smaller (larger) threshold results better (poorer) image/video quality
        and higher (lower) bit-rates.
Parameter definition:
▲▲▲▲▲▲▲▲▲▲▲▲▲▲▲▲▲▲▲▲▲▲ thbg16[0,1,2]:
        -----------

The thresholds bgth16[0,1,2] (as shown in Figure below) are
            the ranges of thresholds that to be    used with buffer fullness to
            come up with a meaningful threshold value for encoding the
current macro-row or curren block depend on whether the thresholds are adapted once a macro-row or once a block. See intra_adapt() on how the threshold is adapted.

The resulting threshold computed with thbg16[0,1,2] are used in BG16, M16. BG8, M8, M4 (see constant.h for definition of these terms).

THRESHOLD

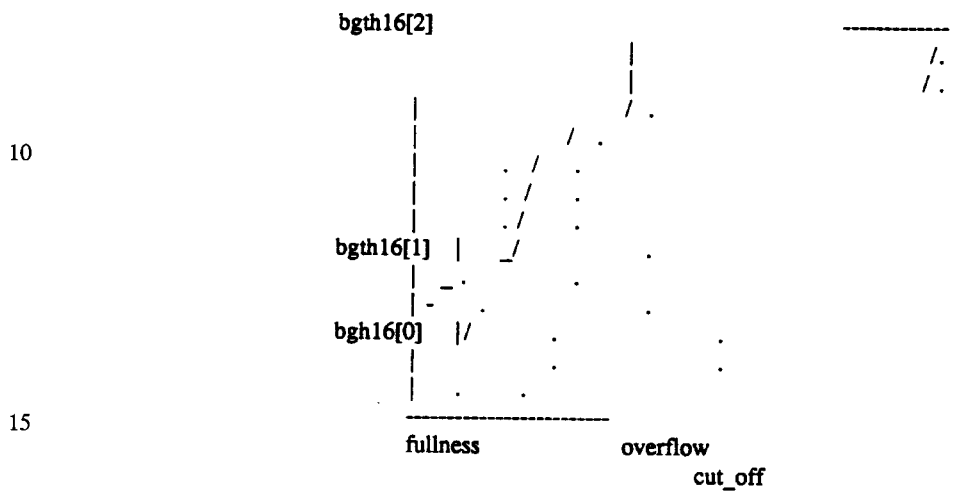

s_m4[0,1,2]:

Same as bgth16[0,1,2], but the rerulting threshold is used for SBG4 (spatial background) coder only (and SBG8, SBG16 if exist).

bgth16_overflow:

Threshold used when the buffer is full. This value is at least the same as bgth16[2].

gamma[BG16,M16,BG8,M8,M4,VQ4,STILL4,SBG4]:

```
                          This array contains the instantaneous thresholds computed from
         either
                          bgth16[], or s_m4[] by intra_adapt().
                          gamma[VQ4] is not used at this time.
 5
                          gamma[STILL4] is fixed at all time.
                          gamma[BG16,M16,BG8,M8,M4] are based on bgth16[].
                          gamma[SBG4] is based on s_m4[].

beta, alpha:
                       -----------
                               Threshold used to bias the high/low activity image block
                               (they will be defined shortly).
                               Constraint on these values is that alpha + beta = 1.
10
                       blocksize_bias[CODER16,CODER8,CODER4]:
                       -------------------------------------
                               It is known that larger block size can perceptually more
                               annoying than smaller block size at a given mse.
                               Thus these threshold attempts to exploit this advantage by
                               biasing the smaller block size coder (CODER4) with a
                               larger threshold.

r_std4y, r_std4uv:
15                     ------------------
                               These are thresholds used for low activity block in the
         absolute
                               refresher.

Threshold definition for coders BG16, M16, BG8, M8, M4:
                    ^^^^^^^^^^^^^^^^^^^^^^^^^^^^^^^^^^^^^^^^^^^^^^^^^^^^^^^
                            For a given gamma[i] where i=BG16, M16, BG8, M8, or M4, the threshold
                            is defined as
20                                    Tx = gamma[i] * blocksize * (std * alpha + beta)
                            where std is the standard deviation of the 16x16, 8x8, or 4x4 image block,
                            and blocksize is 256, 64, or 16.
```

Appendix 4:10

```
Tx here is the threshold at each level of the coder to determine whether
a give image block passes the threshold test or not.

For coder SBG4, the threshold gamma[SBG4] is compared directly with
the std of the 4x4 block.
***************************************************************************/
float alpha  =    0.2;
float beta   =    0.8;

float bgth16[3]={10.0, 15.0, 18.0};
        float bgth16_overflow = 20.0;
        /*
                blocksize_bias[CODER16=0], blocksize_bias[CODER8=1],
                blocksize_bias[CODER4=2]
        */ float blocksize_bias[3] = {1.0, 1.2, 3.0};

float s_m4[3]={3.0, 10.0, 15.0};

/* types of coders : BG16=0, M16=1, BG8=2, M8=3, M4=4, VQ4=5,
STILL4=6, SBG4=7 */
        volatile float gamma[8] ={14.0,14.0,16.0,16.0,18.0,80.0,80.0,4.0};

/* thresholds for low activity blocks in vq abs. refresher */
float r_std4y  = 3.0;
float r_std4uv = 3.0;
```

Appendix 4:11

Express Mail No.
EM487360442US

Encoder/Decoder Flowchart

This file contains a pseudo-code listing of the video encoder and decoder source code. This listing provides a concise summary of the code and defines where the subroutines are located.

Encoder main loop

```
encodeImage()                                                   /* encode.c */
{
        init_cwsize( );                                         /* hvqinit.c */
        init_mem();                                             /* hvqinit.c */
        init_vq_vec();                                          /* hvqinit.c */
        init_rate();                                            /* hvqinit.c */
        init_buff();                                            /* hvqinit.c */
        initEncoderState();                                     /* hvqinit.c */
        init_pic_hdr();                                         /* hvqinit.c */
        init_mac_hdr();                                         /* hvqinit.c */
        /****************** entering the video coding loop ***************/
        while (1){
                getNextVideoFrame();                            /* slave.c */
                scene_change = scene_change_test();             /* videouti.c */
                if (force-scene-change-is-needed)
                        force-scene-change = TRUE;
                requestSceneChangeInfo();                       /* slave.c */
                if(scene_change OR force-scene-change)
                {
                        resetEncoderState();                    /* encode.c */
                        requestSceneChangeInfo();               /* slave.c */
                        still_encode();                         /* hvqutils.c */
                        waitUntilBufferFullness();              /* slave.c */
                }
                else{
                        if (my-scene-mse-is-very-small)
                                rcvPCI(16);                     /* encode.c */
                        else if (my-scene-mse-is-very-large)
                                sendPCI(16);                    /* encode.c */
                        requestSceneChangeInfo();               /* slave.c */
                        video_encode();                         /* hvqutils.c */
                        if(left-over-bits and not-miss-real-time)
                                refresh_encode();               /* refresh.c */
                } /* scene_change */
                /* currently coded become previously coded by swapping image planes */
        } /* WHILE 1*/
```

Appendix 5:1

```
} /* encodeImage */ still_encode()
{
    stack();                                        /* hvqutils.c */
}/* still_encode */                                 /* stack.c */

Still Image encoder
stack()                                             /* stack.c */
{
    for(each-macro-row-in-image){
        reset_cache();                              /* hvqinit.c */
        for(each 4x4-block in macro-row){
            newmemblock(Y)                          /* membloc1.s30 */
            computeMseTx2d(Y);                      /* videouti.c */
            icheckLRUCache(Y);                      /* cache.c */
            if( cache-hit ){
                pack_word(cache-hit)                /* bitPack() in pingpong.c
*/
                newmemblock(Y)                      /* membloc1.s30 */
            }
            else{
                check_scalar_cache(Y);              /* cache.c */
                pack_word(cache-miss);              /* pingpong.c */
                ihlimit(Y-mean)                     /* vlib.c */
                pack_word(Y-mean);                  /* pingpong.c */
                vsubm(Y);                           /* vmse.s30 */
                ibinSearchNode(Y);                  /* treevq.c */
                bvmove(Y);                          /* vmse.s30 */
                vsubm(Y);                           /* vmse.s30 */
                ihlimit(Y)                          /* vlib.c */
                iupdateLRUCache(Y);                 /* cache.c */
                pack_word(vq-address);              /* pingpong.c */
                newmemblock(Y);                     /* membloc1.s30 */
            }
            if( every-four-Y-block ){
LOOP1:
                newmemblock(U);                     /* membloc1.s30 */
                computeMseTx2d(U);                  /* videouti.c */
                icheckLRUCache(U);                  /* cache.c */
                if( cache-hit ){
                    pack_word(cache-hit)            /* pingpong.c */
                    newmemblock(U)                  /* membloc1.s30 */
                }
```

Appendix 5:2

```
                    else{
                            check_scalar_cache(U);             /* cache.c */
                            pack_word(cache-miss);             /* pingpong.c */
                            ibinSearchNode(U);                 /* treevq.c */
                            bvmove(U);                         /* vmse.s30 */
                            iupdateLRUCache(U);                /* cache.c */
                            pack_word(vq-address);             /* pingpong.c */
                            newmemblock(U);                    /* membloc1.s30 */
                    }
                    END LOOP1:
                    repeat LOOP1 for V.
                }/* every-four-Y-block */
            }/* for each 4x4 block */
            sendToMD(0);                                       /* pingpong.c */
        } /* for mac_row */
    } /* stack */

Video encoder routines
    video_encode()                                             /* hvqutils.c */
    {
            for(each macro-row in an image)
            {
                    reset_cache();                             /* hvqinit.c */ put_mra();                                 /* hvq_hdr.c */ for(each 16x16 block in a macro-row)
                    {
                            newmemblock();                     /* membloc1.s30 */
                            code_rec();                        /* hvqutils.c */

} /* for each 16x16 block */ sendToMD();                                /* pingpong.c */
                    intra_adapt();                             /* adapt.c */

}/* for each macro-row */

} /* video_encode */

/* coder[0] = e_w16(), coder[1] = e_w8(), coder[2]=e_w4() */
    code_rec(l, coder[])
    {
      coding_status = (*coder[l])();                           /* e_w16.c, e_w8.c,
    e_w4.c */
```

Appendix 5:3

```
                if (coding_status == DONE)
                        return(0);
                else
                {
                        l++;
                        for(four quadrant)
                                code_rec(l, coder);
                } /* else */
        }/* code_rec */ e_w16()                                                              /* e_w16.c */
        {
                computeMseTx2d();                                            /* videouti.c */
                Get background-mse from scene-change mse;
                if( background-mse < threshold )
                {
                        pack_word( bg16-hit );                               /* pingpong.c */
                        newmemblock( Y , U, and V);                          /* membloc1.s30 */
                        return(1);
                }
                pack_word( bg16-miss );                                      /* pingpong.c */
                bm_cache( Y );                                               /* videouti.c */
                if( cache-mse >= threshold ){
                        if( current-block-inside-image )
                                threestep_inside() OR threestep();           /* threestep.c */
                }
                if( (cache-mse < threshold) OR (threestep-mse < threshold) )
                {
                        pack_word();                                         /* pingpong.c */
                        newmemblock(Y);                                      /* membloc1.s30 */
                        compute_mse_blk(U and V);                            /* videouti.c */
                        if( u-needs-new-mv AND v-needs-new-mse)
                                threestep_color( U and V);                   /* threestep.c */
                        if( cache-mse < threshold )
                                pack_word();                                 /* pingpong.c */
                        else
                        {
                                check_scalar_cache();                        /* cache.c */
                                pack_word();                                 /* pingpong.c */
                                iupdateLRUCache( new-mv );                   /* cache.c */
                                pack_word( new-mv );                         /* pingpong.c */
                        }
                        pack_word(color-mv-flag);
                        pack-word(color-mv);
                        newmemblock( U and V);
                        return(1);
```

Appendix 5:4

```
        }
        pack_word( m16-miss );
        return(0);
    }/* e_w16 */ e_w8()                                              /* e_w8.c */
    {
        computeMseTx2d();                               /* videouti.c */
        Get background-mse from scene-change mse;
        if( background-mse < threshold )
        {
            pack_word( bg8-hit );                       /* pingpong.c */
            newmemblock( Y , U, and V);                 /* membloc1.s30 */
            return(1);
        }
        pack_word( bg8-miss );
        bm_cache( Y );                                  /* videouti.c */
        if( cache-mse >= threshold )
            threestep_inside() OR threestep();          /* threestep.c */
        if( (cache-mse < threshold) OR (threestep-mse < threshold) )
        {
            pack_word(m16-hit);
            newmemblock(Y);
            compute_mse_blk(U and V);                   /* videouti.c */
            if( u-needs-new-mv AND v-needs-new-mv)
                threestep_color( U and V);   /* threestep.c */
            if( cache-mse < threshold )
                pack_word(cache-hit);
            else
            {
                check_scalar_cache();                   /* cache.c */
                pack_word();
                iupdateLRUCache( new-mv );              /* cache.c */
                pack_word( new-mv );                    /* pingpong.c */
            }
            pack_word(color-mv-flag and color-mv);
            newmemblock( U and V);
            return(1);
        }
        pack_word( m8-miss );
        computeMseTx2d( std-of-U-and-V );               /* videouti.c */
        if( U-and-V-low-activity-block )
        {
            pack_word(hit-std);
            ibinSearchNode2(2-dim-vq);                  /* treevq.c */
            pack_word(vq-address);                      /* pingpong.c */
            mcput_vbyte(U and );                        /* mput_vby.s30 */
```

Appendix 5:5

```
            }
            else
            {
                pack_word(miss-std);
                newmemblock(U and V);
5               ibinSearchNode(U and V);                    /* treevq.c */
                bvmove( U and V);                            /* vmse.s30 */
                newmemblock(U and V);                        /* membloc1.s30 */
                pack_word(U and V);
            }
            return(0);
        }/* e_w8 */ e_w4()                                               /* e_w4.c */
        {
                computeMseTx2d();                            /* videouti.c */
10              if (!SET_AWS){
                    bm_cache();                              /* videouti.c */
                    if( cache-mse >= threshold )
                        threestep_inside() OR threestep();   /* threestep.c */
                    if( (cache-mse < threshold) OR (threestep-mse < threshold) )
                    {
                        pack_word(m4-hit);                   /* pingpong.c */
                        newmemblock(Y);                      /* membloc1.s30 */
                        if( cache-mse < threshold )
                            pack_word(cache-hit);
                        else
                        {
15                          check_scalar_cache();            /* cache.c */
                            pack_word();
                            iupdateLRUCache( new-mv );       /* cache */
                            pack_word( new-mv );
                        }
                        return( 1 );
                    }
                }/* !SET_AWS */
                else
                {
                    bm_current();                            /* videouti.c */
20                  if( ws-mse < threthold )
                    {
                        newmemblock();                       /* membloc1.s30 */
                        pack_word(flag and address);
                        return( 1 );
                    }
                } /* else AWS */
```

Appendix 5:6

```
            newmemblock();
            pack_word(mean);
            if( y-low-activity )
            {
 5                  pack_word(std-hit);
                    mput_vbyte();                                       /* mput_vby.s30 */
            }
            else
            {
                    pack_word(std-miss);
                    vsubm();
                    ibinSearchNode();
                    vsubm();                                            /* vmse.s30 */
                    ihlimit();                                          /* vlib.c */
                    newmemblock();
                    pack_word(vq-address);
10          }
            return(1);
    } /* e_w4() */

Encoder refresh routines
    refresh_encode();                                                   /* refresh.c */
    {
            if (refresh_rate < refresh-overhead)
                    return(0);
            if( cumulative_refresh_bits > TOO_MANY_BITS )
15                  SET_SCALAR_REFRESH = TRUE;

else
                    SET_SCALAR_REFRESH = FALSE;
            while(there is still bits for refresh){
                    if( !SET_SCALAR_REFRESH )
                            encode_abs_vq_refresh();                    /* refresh.c */
                    else
                            encode_abs_scalar_refresh();                /* refresh.c */

Update indices to make sure that all blocks;
20                  in the image will be refreshed sequentially;
                    if (new-picture-arrived)
                            break;
            } /* while */

UpdateRefreshHeader();                                      /* pingpong.c */
            sendToMD();                                                 /* pingpong.c */
    } /* refresh_encode */
```

Appendix 5:7

```
    encode_abs_scalar_refresh()                        /* refresh.c */
    {
        newmemblock(4x4 Y);                            /* membloc1.s30 */
        newmemblock(2x2 U);
5       newmemblock(2x2 V);
        for(16 Y-pixels, 4 U-pixels, and 4 V-pixels){
            Quantize each pixel;
            pack_word( each pixel );                   /* bit_buf.c */
        }
        newmemblock(Y);
        newmemblock(U and V);

} /* encode_abs_scalar_refresh */ encode_abs_vq_refresh()                            /* refresh.c */
10  {
        for( four 4x4 blocks within an 8x8 block){
            computeMseTx2d(Y-mean);                    /* videouti.c */
            bitPack(Y-mean and std);                   /* bit_buf.c */
            if( low-activity-block ){
                bitPack(std-hit);                      /* bit_buf.c */
                mput_vbyte(Y);                         /* mput_vby.s30 */
            }
            else
            {
                newmemblock(Y);                        /* membloc1.s30 */
                vsubm(Y);                              /* vmse.s30 */
15              bitPack(std-miss);                     /* bit_pack.c */
                ibinSearchNode(Y);                     /* treevq.c */
                bitPack(vq-address);                   /* bit_buf.c */
                vsubm( Y );                            /* vmse.s30 */
                ihlimit( Y );                          /* vlib.c */
                newmemblock(Y);                        /* membloc1.s30 */
            }

}/* for */
        computeMseTx2d( U );                           /* videouti.c */
        computeMseTx2d( V );                           /* videouti.c */
20      if( color-low-activity-block){
            bitPack(color-std-hit);                    /* bit_buf.c */
            ibinSearchNode2(2-dim-vq);                 /* treevq.c */
            bitPack(2-dim-vq-address);
            mcput_vbyte(U and V );                     /* mput_vby.s30 */
        }
        else{
```

Appendix 5:8

```
                bitPack(color-std-miss);
                newmemblock(U and V);                   /* membloc1.s30 */
                ibinSearchNode(16-dim-U and V);         /* treevq.c */
                bvmove( U and V);                       /* vmove.s30 */
5               newmemblock( U and V );                 /* membloc1.s30 */
                bitPack(U-vq-address and V);            /* bit_buf.c */
            }
        } /* encode_abs_vq_refresh () */

Decoder main loop
        int decodeImage()                               /* decodei.c */
        {
            if(bit-error)
            {
10              skipToNextPacket();                     /* bit_buf.c */
                VSA_error();
                Get relative-temporal-reference;
                if (incorrect-temporal-reference)
                    goto concealment;
            }
            get_mra();                                  /* hvq_hdr.c */
            /*************** Entering video decoding loop ****************/
            while(1)
            {
                switch (data-type)
15              {
                    case VIDEO_DATA_FLAG:
                        reset_cache (video-cache);      /* hvqinit.c */
                        videoImageDecodeMacroRow();     /* decodei.c */
                        break;
                    case STILL_DATA_FLAG:
                        reset_cache (all-cache);        /* hvqinit.c */
                        stillImageDecodeMacroRow();     /* decodei.c */
                        break;
                    case VQ_REFRESH_DATA_FLAG:
                    case SCALAR_REFRESH_DATA_FLAG:
                        if (missing-macro-row)
20                          ConcealMissingMacroRow();   /* decodei.c */
                        refresh_image();                /* refresh.c */
                        break;
                    default:
                        goto concealment;
                        break;
                } /* switch */
```

Appendix 5:9

```
AfterDecoding:
        if (unique-psc-found))
                break;
        Get macro-row-header;
5       if ( invalid-macro-row-address )
                longjmp();
        if ( incorrect-temporal-reference ){
                goto concealment;
                break;
        }
        get_mra();                                              /* hvq_hdr.c */
    } /* while(1) */
concealment:
        if (not-all-macro-rows-decoded)
            for (each macro-row)
10              if (any-missing-macro-row)
                    ConcealMissingMacroRow(missing-macro-row);  /* decodei.c */
        return(0);
}/* decodeImage() */

Video decoder routines
    videoImageDecodeMacroRow()                                  /* d_utils.c */
    {
        Set SET_AWS according to macro-row-header;
        for( each 16x16 block in a macro-row)
15              decode_rec( level, decoder );                   /* d_utils.c */
        return (OK);
    } stillImageDecodeMacroRow()                                  /* d_utils.c */
    {
        d_stack_row();                                          /* d_stack.c */
        return (OK);
    }

/* decoder[0] = d_w16(), decoder[1] = d_w8(), decoder[2]=d_w4() */
    decode_rec(l, decoder)
20  {
        coding_status = (*decoder[l])( r, c );                  /* d_utils.c */
        if( coding_status = DONE )
                return (0);
        else
        {
                l++;
                for(four quaddrant)
                decode_rec(l, decoder);
```

Appendix 5:10

```
    }
} refreshImageDecode()                                /* decodei.c */
{
    refresh_decode();                               /* refresh.c */
    return(NO_ERROR);
} d_w16()                                             /* d_utils.c */
{
    getBits(bg-flag);                               /* bit_buf.c */
    if( background-hit )
    {
        image16x16move( Y );                        /* imove.s30 */
        image8x8move( U );                          /* imove.s30 */
        image8x8move( V );
        return(DONE);
    }
    getBits( motion-flag );                         /* bit_buf.c */
    if( motion-hit )
    {
        dehuff(cache-entry);                        /* huff.c */
        Get cache-content;
        iswapTwo(update-content);                   /* cache.c */
        if ( not-cache-hit )
        {
            getBits(motion-vector);
            iupdateLRUCache(new-motion-vector);     /* cache.c */
        }
        getBits(color-motion-flag);                 /* bit_buf.c */
        if (need)
        {
            getBits( U-motion-vector );             /* bit_buf.c */
            getBits( V-motion-vector );
        }
        image8x8move(U);                            /* imove.s30 */
        image8x8move(V);                            /* imove.s30 */
        return(DONE);
    }/* M16 hit */
    return(NOT-DONE);
/* d_w16 */
```

Appendix 5:11

```
d_w8()                                              /* d_utils.c */
{
    getBits(background-flag);                       /* bit_buf.c */
    if( background-hit )
    {
        image8x8move(Y);                            /* imove.s30 */
        image4x4move(U and V);                      /* imove.s30 */
        return(1);
    }
    hitFlag = getBits(motion-flag);                 /* bit_buf.c */
    if( motion-hit )
    {
        dehuff(cache-entry)                         /* huff.c */
        Get cache-content;
        iswapTwo();                                 /* cache.c */
        if( motion-cache-miss )
            getBits(motion-vector);                 /* bit_buf.c */
        getBits(color-motion-flag);
        if (needed)
        {
            getBits(U-motion-vector);
            getBits(V-motion-vector);
        }
        image4x4move(U and V);                      /* imove.s30 */
        image8x8move(Y);                            /* imove.s30 */
        return(1);
    }/* if motion-hit */ getBits(color-std-flag);
    if( color-std-coded )
    {
        getBits(2-dim-vq-address);
        chrominanceMean4x4(U and V)                 /* cmean.s30 */
    }
    else
    {
        getBits(16-dim-vq-address);                 /* bit_buf.c */
        vector16move(U);                            /* vmove.s30 */
        getBits(16-dim-vq-address);
        vector16move(V);
    }
    return(0);
}/* d_w8 */
```

Appendix 5:12

```
     d_w4()                                                    /* d_utils.c */
     {
         if( !SET_AWS )
         {
             getBits(motion-flag);                              /* bit_buff.c */
 5           if( motion-hit )
             {
                 dehuff(cache-entry);                           /* huff.c */
                 Get cache-content;
                 iswapTwo();                                    /* cache.c */
                 if( cache-miss );
                 {
                     getBits(motion-vector);
                     iupdateLRUCache(new-motion-vector);        /* cache.c */
                 }
                 image4x4move(Y);                               /* imove.s30 */
10               return(DONE);
             }/* if motion-hit */
         }/* if !SET_AWS */
         else
         {
             getBits(aws-flag);                                 /* bit_buf.c */
             if( aws-hit )
             {
                 getBits(aws-entry);                            /* bit_buf.c */
                 Convert aws-entry to motion vector;
                 image4x4move(Y);                               /* imove.s30 */
                 return(DONE);
15           }
         } /* SET_AWS */ dehuff(mean-enry);                                    /* huff.c */
         Reconstruct mean;
         getBits(std-flag);                                    /* bit_buf.c */
         if (not-std-coded);
         {
             getBits(vq-address);
             luminanceMeanRemovedVQtoImage(Y);                 /* lmrvq.s30 */
         }/* if hitFlag == !HIT_SBG4 */
20       else
         {
             luminanceMean4x4();                               /* cmean.s30 */
         }
         return(DONE);
     } /* d_w4 */
```

Appendix 5:13

Still image decoder

```
       d_stack_row()
       {
           for( each-macro-row ){
               for( each 4x4 block in a macro-row ){
                   dehuff(cache-entry);                          /* huff.c */
 5                 Get the cache-content;
                   if( cache-hit ) {
                       vector16move(Y);                          /* vmove.s30 */
                       iswapTwo(Y);                              /* cache.c */
                   }
                   else
                   {
                       iswapTwo(Y);                              /* cache.c */
                       dehuff(block-mean);                       /* huff.c */
                       Reconstruct mean;
                       getBits(vq-address);                      /* bit_buf.c */
10                     luminanceMeanRemovedVQtoVector(Y);        /* lmrvq.s30 */
                       vector16move(Y);                          /* vmove.s30 */
                       iswapTwo(new-vq-block);
                   }/* else miss */
                   if( every-four-Y-block )
                   {
                       dehuff(U-cache-entry);
                       Get the cache-content;
                       if( cache-hit ){
                           vector16move(U);
                           iswapTwo(U);
15                     }
                       else
                       {
                           iswapTwo(U);
                           getBits(U-vq-address);
                           vector16move(U);
                           iswapTwo(new-U-vq-block);
                       }
                       dehuff(V-cache-entry);
                       Get the cache-content;
                       if( cache-hit ){
                           vector16move(V);
20                         iswapTwo(V);
                       }
                       else{
                           iswapTwo(V);
                           getBits(V-vq-address);
                           vector16move(V);
                           iswapTwo(new-V-vq-block);
```

Appendix 5:14

```
                    }
                }/* if( every-four-Y-block) */
            }/* each 4x4 block */
        }/* for each macro-row */
5   }/* d_stack_row */

Decoder refresh routines
    refresh_decode()                                                /* refresh.c */
    {
        for (given-number-of-refresh-blocks){
            if(scalar-refresh)
                decode_abs_scalar_refresh();                        /* refresh.c */
            else
                decode_abs_vq_refresh();                            /* refresh.c */
            Update indices to make sure that all blocks;
10          in the image will be refreshed sequentially;
        } /* for loop */
    } /* refresh_decode */ decode_abs_vq_refresh()                                         /* refresh.c */
    {
        for(four 4x4 blocks within an 8x8 block){
            getBits(y-mean);                                        /* bit_buf.c */
            getBits(std-flag);
            if( std-hit )
                luminanceMean4x4(Y);                                /* cmean.s30 */
15          else
            {
                getBits(vq-address);
                luminanceMeanRemovedVQtoImage(Y);                   /* lmrvq.s30 */
            }
        }
        getBits(color-std-flag)                                     /* bit_buf.c */
        if( color-std-hit )
        {
            getBits(2-dim-vq-address);
            chrominanceMean4x4(U and V);                            /* cmean.s30 */
        }
20      else
        {
            getBits(U-vq-address);                                  /* bit_buf.c */
            vector16move(U);                                        /* vmove.s30 */
            getBits(V-vq-address);
            vector16move(V);
        } /* decode_abs_vq_refresh */
```

Appendix 5:15

```
decode_abs_scalar_refresh()                                    /* refresh.c */
{
    Get 16 absolute coded pixel values into word for Y;
    Copy pixels into Y-coded image;

Get 4 absolute coded pixel values into word for U;
    Copy pixels into U-coded image;

Get 4 absolute coded pixel values into word for V;
    Copy pixels into V-coded image;

} /* decode_abs_scalar_refresh */
```

Appendix 5:16

```
// *********************************************************************
// Function:   Carry Select Adder adds two number, (A + B) and
//                           returns result Sum.
// ********************************************************************* int CarrySelect( int Addend1, int Addend2, int CarryIn )
{
        // Declare variables and arrays int A[10], B[10], S[10], i;
        int C2, C_40, C_41, C_60, C_61, C_80, C_81;
        int S_50, S_51, C6, C_90, C_91;
        int Sum;

// Create single bit numbers by shifting and masking for (i=0; i<=9; i++)
        {
                A[i]    = ( Addend1 >> i ) & 0x1;
                B[i]    = ( Addend2 >> i ) & 0x1;
        }

// Calculate first level of logic for Carry Select topology

S[0]    = A[0]^B[0]^CarryIn;          //    A exor B exor CarryIn
        S[1]    = ( ( A[0]&B[0] ) | ( CarryIn&( A[0]|B[0] ) ) )^A[1]^B[1];
        C2      = ( ( A[1]&B[1] ) | ( ( A[0]&B[0] ) | ( CarryIn&( A[0]|B[0] ) ) ) ) & ( A[1]|B[1] );

C_40    = ( A[3]&B[3] ) | ( ( A[2]&B[2] ) & ( A[3]|B[3] ) );
        C_41    = ( A[3]&B[3] ) | ( ( A[2]|B[2] ) & ( A[3]|B[3] ) );

C_60    = ( A[5]&B[5] ) | ( ( A[4]&B[4] ) & ( A[5]|B[5] ) );
        C_61    = ( A[5]&B[5] ) | ( ( A[4]|B[4] ) & ( A[5]|B[5] ) );

C_80    = ( A[7]&B[7] ) | ( ( A[6]&B[6] ) & ( A[7]|B[7] ) );
        C_81    = ( A[7]&B[7] ) | ( ( A[6]|B[6] ) & ( A[7]|B[7] ) );

// Calculate Second level of logic
```

Appendix 6:1

```
         S[2]  = A[2]^B[2]^C2;
         S[3]  = ( ( A[2]&B[2] ) | ( C2 & ( A[2]|B[2] ) ) )^A[3]^B[3];
         S[4]  = ( ~C2 & ( A[4]^B[4]^C_40 ) ) | ( C2 & ( A[4]^B[4]^C_41 ) );

5        S_50  = ( ( A[4]&B[4] ) | ( C_40 & ( A[4]|B[4] ) ) )^A[5]^B[5];
         S_51  = ( ( A[4]&B[4] ) | ( C_41 & ( A[4]|B[4] ) ) )^A[5]^B[5];

C6    = ( C_60&~( ( ~C2&C_40 ) | ( C2&C_41 ) ) )
                 | ( C_61& ( ( ~C2&C_40 ) | ( C2&C_41 ) ) );

C_90  = ( A[8]&B[8] ) | ( C_80&( A[8]|B[8] ) );
         C_91  = ( A[8]&B[8] ) | ( C_81&( A[8]|B[8] ) );

10       // Calculate Third level of logic

S[5]  = ( ~C2&S_50 ) | ( C2&S_51 );

S[6]  = C6^A[6]^B[6];
         S[7]  = ( ( A[6]&B[6] ) | ( C6&( A[6]|B[6] ) ) )^A[7]^B[7];

S[8]  = ( ~C6&( A[8]^B[8] ^ C_80 ) ) | ( C6&( A[8]^B[8]^C_81 ) );
         S[9]  = ( ~C6&( A[9]^B[9] ^ C_90 ) ) | ( C6&( A[9]^B[9]^C_91) );

15       // Create Sum, shift bit from lsb to appropriate position and add for ( Sum=0, i=9; i>=0; i-- )
             Sum |= S[i] << i;

return Sum;

}

20
```

Appendix 6:2

```
// ***********************************************************************
// Function:   Carry Save Adder. Adds three numbers (A + B + D)
//                               and returns a sum and carry.
// ***********************************************************************
void CarrySave(    int Addend1, int Addend2, int Addend3, int *pSum,
                                             int *pCarry )
{

// Declare variables and arrays int A[10], B[10], D[10], S, C, i;
        int Sum=0, Carry=0;

// Create single bit numbers by shifting and masking for (i=0; i< =9; i++)
        {
                A[i]    = ( Addend1 > > i ) & 0x1;
                B[i]    = ( Addend2 > > i ) & 0x1;
                D[i]    = ( Addend3 > > i ) & 0x1;

// Calculate sum and carry

S       = A[i]^B[i]^D[i];                               // Sum
                C       = ( A[i]&B[i] ) | ( D[i]&( A[i]|B[i] ) );       // Carry // Create Sum and Carry, shift bit from lsb to appropriate position and or Sum     |= S < < i;
                Carry   |= C < < i;
        }
        *pSum           = Sum;
        *pCarry         = Carry;
}
```

Appendix 6:3

We claim:

1. A method for generating a compressed video signal, comprising the steps of:

converting an input image signal into a predetermined digital format;

transferring said digital format image signal to at least one encoder processor;

generating a measurement of the amount of motion present in said digital format image;

filtering said input image signal to reduce artifacts, wherein the strength of said filter is varied in response to said measurement to provide a filtered digital format image; applying, at said at least one encoder processor, a hierarchical vector quantization compression algorithm to said filtered digitized image signal; and collecting a resultant encoded bit stream generated by said application of said algorithm.

2. A method as claimed in claim 1, wherein said artifacts comprise at least one of a random camera noise, a sharp image transition and minor motion artifacts.

3. A method as claimed in claim 1, wherein said step of filtering said input image signal comprises passing said input image signal through at least one of a spatial filter, a median filter and a temporal filter.

4. A method as claimed in claim 1, wherein said step of filtering is performed using two, one-dimensional filters.

5. A method as claimed in claim 1, wherein said predetermined digital format comprises a plurality of rectangular image blocks.

6. A method as claimed in claim 1, wherein said filtering step is preceded by the step of:

formatting said input image into data words, said data words comprising two pixel bytes.

7. A method for generating a decompressed video signal, comprising the steps of:

receiving an encoded image signal in a predetermined compressed digital format;

transferring said received encoded image signal to at least one decoder processor;

applying, at said at least one decoder processor, a hierarchical vector quantization decompression algorithm to said encoded image signal; and collecting a resultant decoded image signal generated by said application of said algorithm; and filtering said decoded image signal with a variable filter, wherein the strength of said variable filter varies in accordance with a ratio of predictor hits to predictor misses.

8. A method as claimed in claim 7, wherein said step of filtering said decoded image signal comprises passing said decoded image signal through at least one of a spatial filter, a median filter and a temporal filter.

9. A method as claimed in claim 7, wherein said step of filtering is performed using two, one-dimensional filters.

10. A method as claimed in claim 7, wherein said filtering step is preceded by the step of:

formatting said input image into data words, said data words comprising two pixel bytes.

* * * * *